(12) United States Patent
Lim et al.

(10) Patent No.: US 11,269,487 B2
(45) Date of Patent: Mar. 8, 2022

(54) METHOD AND APPARATUS FOR RECOMMENDING CONTENT BASED ON ACTIVITIES OF A PLURALITY OF USERS

(71) Applicant: Samsung Electronics Co., Ltd., Suwon-si (KR)

(72) Inventors: Su-jeong Lim, Suwon-si (KR); Min-seok Kim, Suwon-si (KR); Ho-jun Lee, Osan-si (KR); Jung-kih Hong, Seoul (KR); Cheol-ju Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 15/044,725

(22) Filed: Feb. 16, 2016

(65) Prior Publication Data

US 2016/0239547 A1    Aug. 18, 2016

(30) Foreign Application Priority Data

Feb. 17, 2015  (KR) ........................ 10-2015-0024313

(51) Int. Cl.
*G06F 16/2457* (2019.01)
*G06F 16/23* (2019.01)
(Continued)

(52) U.S. Cl.
CPC ........ *G06F 3/0482* (2013.01); *G06F 3/04842* (2013.01); *G06F 16/2358* (2019.01);
(Continued)

(58) Field of Classification Search
CPC ........... G06F 17/3082; G06F 17/30828; G06F 3/0482; G06F 16/9535; G06F 16/9536;
(Continued)

(56) References Cited

U.S. PATENT DOCUMENTS 7,716,220 B2   5/2010  Michelitsch et al.
9,883,349 B2   1/2018  Zhang
(Continued)

FOREIGN PATENT DOCUMENTS

CN    1799052 A    7/2006
CN    103518216 A    1/2014
(Continued)

OTHER PUBLICATIONS

European Office Action dated Feb. 20, 2020, issued in European Patent Application No. 16752680.5.
(Continued)

*Primary Examiner* — Tamara T Kyle
*Assistant Examiner* — Berhanu Mitiku
(74) *Attorney, Agent, or Firm* — Jefferson IP Law, LLP

(57) ABSTRACT

A recommendation server is provided. The recommendation server includes a communicator configured to receive, from a first device, when a first user's input for communicating with a second user is received by the first device of the first user, a transmission request with respect to a list of a plurality of items of content related to an operation of the first device which was performed when the first user and the second user met each other; and a controller configured to determine a time when the first user and the second user met each other, based on at least one of first user's activity information of the first user and second user's activity information of the second user, and to provide, to the first device, a list of a plurality of items of content related to an operation of the first device which was performed at the determined time.

17 Claims, 48 Drawing Sheets

(51) Int. Cl.
  *G06F 16/435* (2019.01)
  *G06F 16/93* (2019.01)
  *G06F 3/0482* (2013.01)
  *G06F 3/04842* (2022.01)
  *G06Q 30/02* (2012.01)
  *G06Q 30/08* (2012.01)
  *G06F 16/9535* (2019.01)
  *G06F 16/957* (2019.01)
  *G06F 16/9537* (2019.01)

(52) U.S. Cl.
  CPC .. *G06F 16/24573* (2019.01); *G06F 16/24575* (2019.01); *G06F 16/24578* (2019.01); *G06F 16/435* (2019.01); *G06F 16/9535* (2019.01); *G06F 16/9577* (2019.01); *G06Q 30/0205* (2013.01); *G06Q 30/08* (2013.01); *G06F 16/9537* (2019.01)

(58) Field of Classification Search
  CPC .. G06F 16/9537; G06F 16/9538; G06F 16/41; G06F 16/435; G06F 16/71; G06F 16/735; G06F 16/9566; G06Q 30/0631; G06Q 30/0201
  See application file for complete search history.

(56) References Cited

U.S. PATENT DOCUMENTS

| | | | |
|---|---|---|---|
| 2005/0021420 A1* | 1/2005 | Michelitsch | G06F 16/9535 707/736 |
| 2008/0091786 A1* | 4/2008 | Jhanji | G06Q 30/0259 709/206 |
| 2012/0214456 A1 | 8/2012 | Cho et al. | |
| 2013/0013683 A1* | 1/2013 | Elliott | H04L 51/10 709/204 |
| 2013/0031162 A1* | 1/2013 | Willis | H04L 65/1069 709/203 |
| 2014/0059040 A1* | 2/2014 | Cha | G06F 16/3347 707/722 |
| 2014/0068017 A1 | 3/2014 | Lee | |
| 2014/0125757 A1 | 5/2014 | Lee et al. | |
| 2014/0258850 A1 | 9/2014 | Carey | |
| 2014/0279626 A1 | 9/2014 | Joo et al. | |
| 2014/0337697 A1 | 11/2014 | Ryu et al. | |
| 2014/0351336 A1 | 11/2014 | Yeo et al. | |
| 2015/0039761 A1 | 2/2015 | Patil et al. | |
| 2015/0234939 A1* | 8/2015 | Aharony | G06F 16/9535 707/737 |
| 2015/0262617 A1* | 9/2015 | Jaime | H04L 67/06 386/241 |
| 2018/0300379 A1 | 10/2018 | Cha et al. | |

FOREIGN PATENT DOCUMENTS

| | | |
|---|---|---|
| CN | 103631851 A | 3/2014 |
| CN | 104252518 A | 12/2014 |
| JP | 2012-015917 A | 1/2012 |
| KR | 10-2012-0074883 A | 7/2012 |
| KR | 10-2012-0096264 A | 8/2012 |
| KR | 10-2013-0089819 A | 8/2013 |
| KR | 10-2014-0031452 A | 3/2014 |
| KR | 10-1363609 B1 | 3/2014 |
| KR | 10-2014-0057036 A | 5/2014 |
| KR | 10-2014-0072381 A | 6/2014 |

OTHER PUBLICATIONS

Chinese Office Action dated Apr. 14, 2020, issued in Chinese Patent Application No. 201680022180.0.
Korean Office Action dated Jun. 25, 2021, issued in Korean Patent Application No. 10-2015-0024313.
European Summons to Attend Oral Proceedings dated Jul. 26, 2021, issued in European Patent Application No. 16 752 680.5.
Indian Office Action dated Dec. 23, 2020, issued in Indian Patent Application No. 201727030820.

* cited by examiner

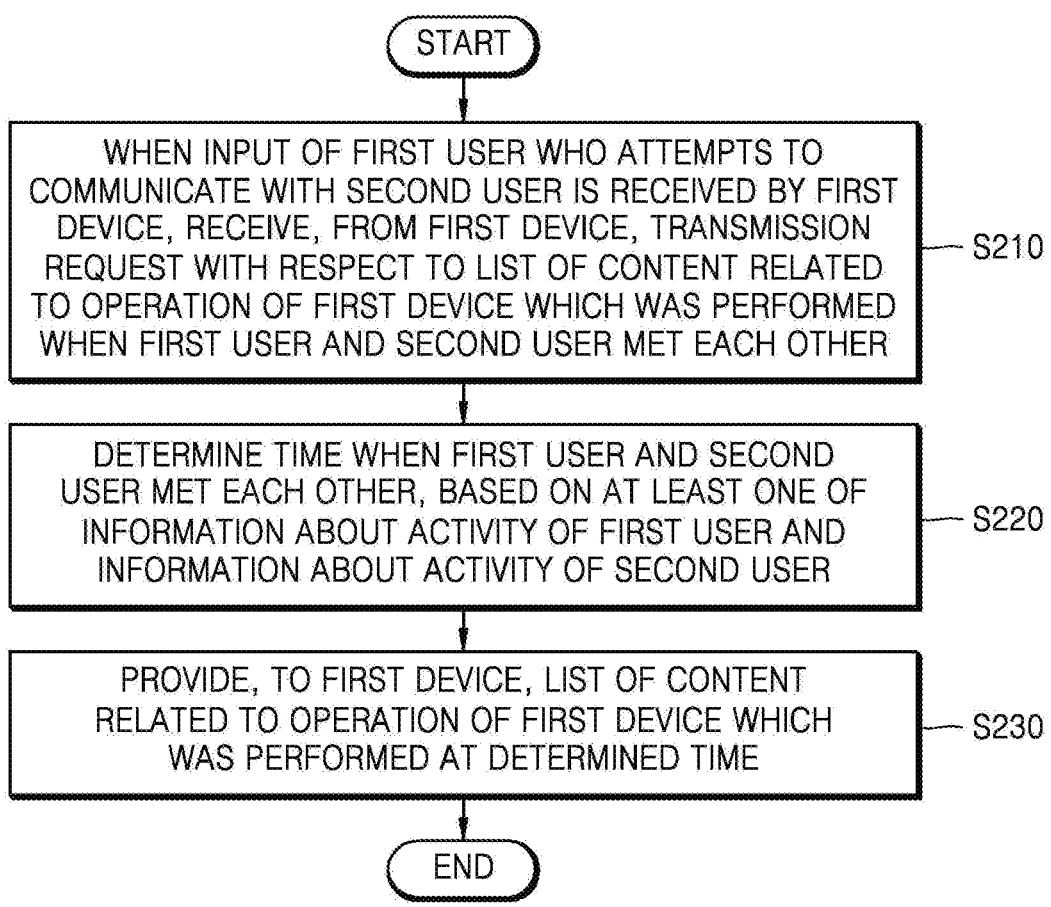

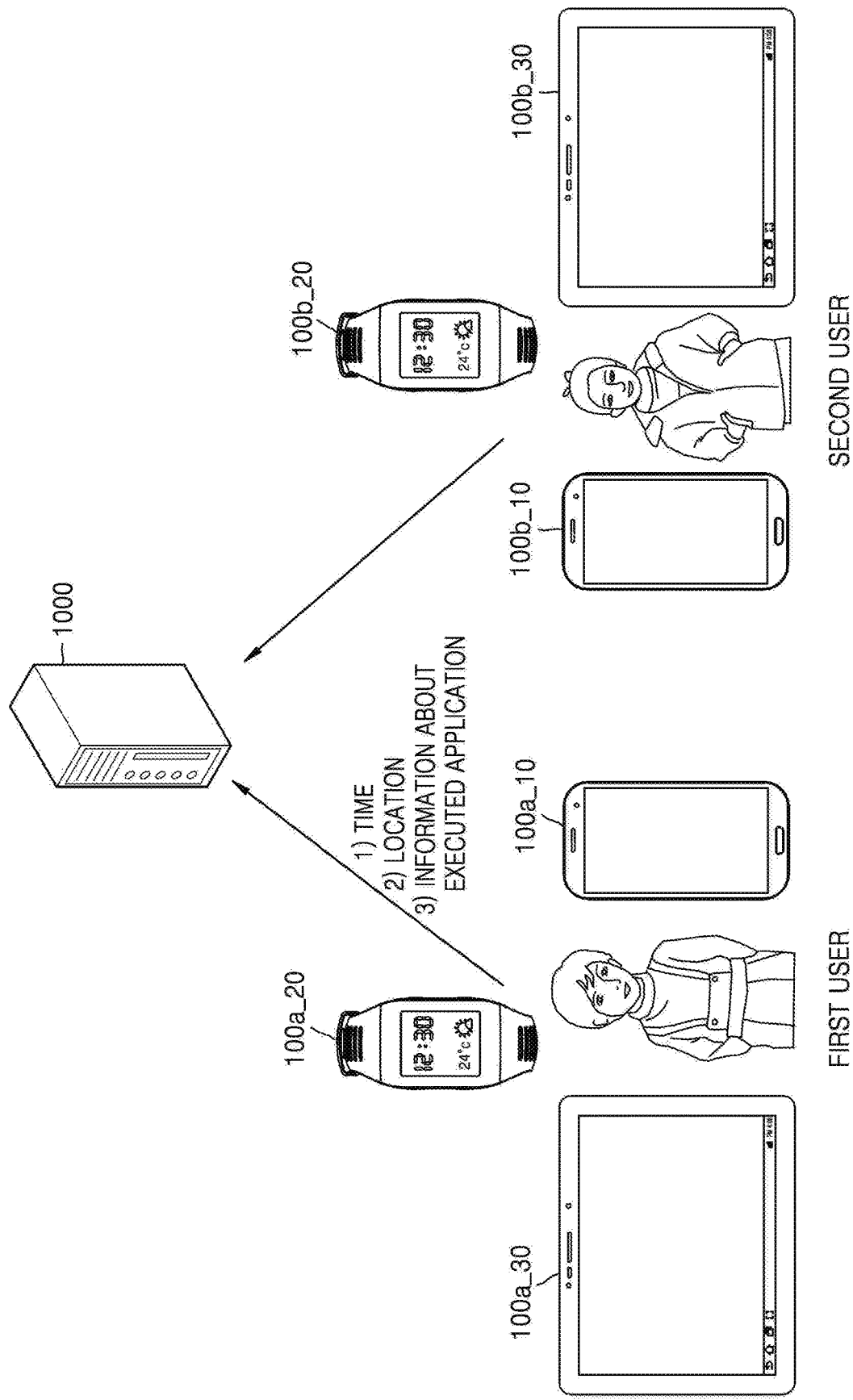

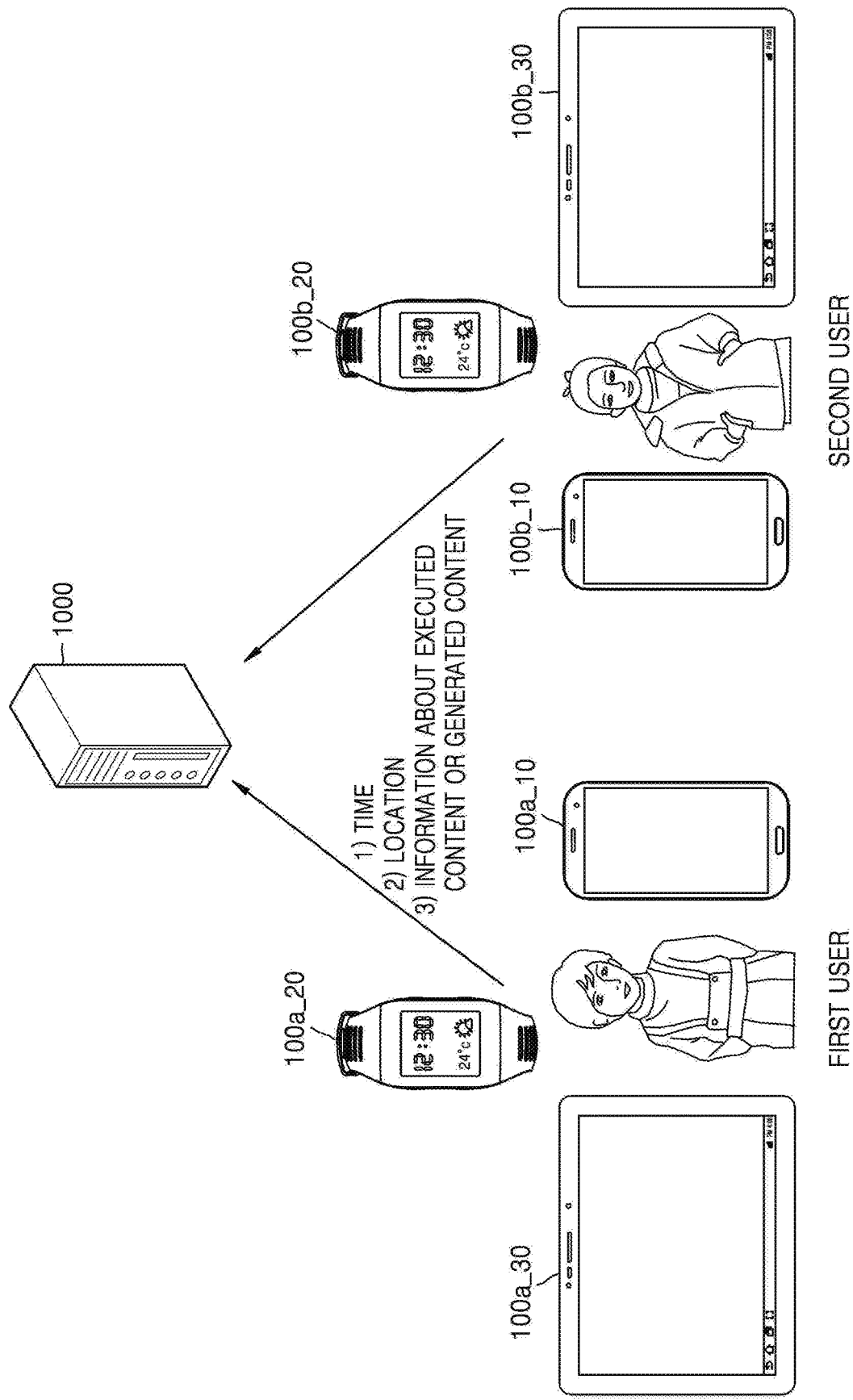

FIG. 4C

| USER IDENTIFICATION INFORMATION (410a) | USER'S ACTIVITY INFORMATION (400a) | | | | |
|---|---|---|---|---|---|
| | TIME (422a) | LATITUDE (424a) | LONGITUDE (426a) | APPLICATION (427a) | CONTENT (428a) |
| | ⋮ | ⋮ | ⋮ | ⋮ | ⋮ |
| FIRST USER ID | 2014/11/17/13:00 | N 50 DEGREES 70 MINUTES 96 SECONDS | E 111 DEGREES 11 MINUTES 74 SECONDS | WEB BROWSER | http://item2.gmarket.co.kr/Lotte/detailview/Item.aspx?goodscode=6370 65800&sid=120915 |
| | 2014/11/17/13:30 | N 50 DEGREES 70 MINUTES 96 SECONDS | E 111 DEGREES 11 MINUTES 74 SECONDS | WEB BROWSER | http://item2.gmarket.co.kr/Lotte/detailview/Item.aspx?goodscode=6359 40097 |
| | 2014/11/17/14:00 | N 50 DEGREES 70 MINUTES 96 SECONDS | E 111 DEGREES 11 MINUTES 74 SECONDS | X | |
| | 2014/11/17/14:30 | N 50 DEGREES 70 MINUTES 96 SECONDS | E 111 DEGREES 11 MINUTES 74 SECONDS | X | |
| | ⋮ | ⋮ | ⋮ | ⋮ | |
| | ⋮ | ⋮ | ⋮ | ⋮ | |

| USER IDENTIFICATION INFORMATION | USER'S ACTIVITY INFORMATION ||||||
|---|---|---|---|---|---|---|
| | TIME | LATITUDE | LONGITUDE | APPLICATION | CONTENT |
| | ⋮ | ⋮ | ⋮ | ⋮ | ⋮ |
| | ⋮ | ⋮ | ⋮ | ⋮ | ⋮ |
| SECOND USER ID | 2014/11/17/13:00 | N 50 DEGREES 70 MINUTES 90 SECONDS | E 111 DEGREES 11 MINUTES 73 SECONDS | X | X |
| | 2014/11/17/13:30 | N 50 DEGREES 70 MINUTES 90 SECONDS | E 111 DEGREES 11 MINUTES 73 SECONDS | X | X |
| | 2014/11/17/14:00 | N 50 DEGREES 70 MINUTES 90 SECONDS | E 111 DEGREES 11 MINUTES 73 SECONDS | X | X |
| | 2014/11/17/14:30 | N 50 DEGREES 70 MINUTES 90 SECONDS | E 111 DEGREES 11 MINUTES 73 SECONDS | X | X |
| | ⋮ | ⋮ | ⋮ | ⋮ | ⋮ |
| | ⋮ | ⋮ | ⋮ | ⋮ | ⋮ |
| | ⋮ | ⋮ | ⋮ | ⋮ | ⋮ |

| TIME | LATITUDE | LONGITUDE |
|---|---|---|
| 422a | 424a | 426a |
| ... | ... | ... |
| ... | ... | ... |
| 2014/11/17/ 13:00 | N 50 DEGREES 70 MINUTES 90 SECONDS | E 111 DEGREES 11 MINUTES 73 SECONDS |
| 2014/11/17/ 13:30 | N 50 DEGREES 70 MINUTES 96 SECONDS | E 111 DEGREES 11 MINUTES 74 SECONDS |
| 2014/11/17/ 14:00 | N 50 DEGREES 70 MINUTES 96 SECONDS | E 111 DEGREES 11 MINUTES 73 SECONDS |
| 2014/11/17/ 14:30 | N 50 DEGREES 70 MINUTES 96 SECONDS | E 111 DEGREES 11 MINUTES 74 SECONDS |
| ... | ... | ... |
| ... | ... | ... |
| ... | ... | ... |

400b

| TIME | LATITUDE | LONGITUDE |
|---|---|---|
| 422b | 424b | 426b |
| ... | ... | ... |
| ... | ... | ... |
| 2014/11/17/ 13:00 | N 50 DEGREES 70 MINUTES 90 SECONDS | E 111 DEGREES 11 MINUTES 73 SECONDS |
| 2014/11/17/ 13:00 | N 50 DEGREES 70 MINUTES 92 SECONDS | E 111 DEGREES 11 MINUTES 74 SECONDS |
| 2014/11/17/ 14:00 | N 50 DEGREES 70 MINUTES 91 SECONDS | E 111 DEGREES 11 MINUTES 73 SECONDS |
| 2014/11/17/ 14:30 | N 50 DEGREES 70 MINUTES 90 SECONDS | E 111 DEGREES 11 MINUTES 74 SECONDS |
| ... | ... | ... |
| ... | ... | ... |
| ... | ... | ... |

FIG. 6A

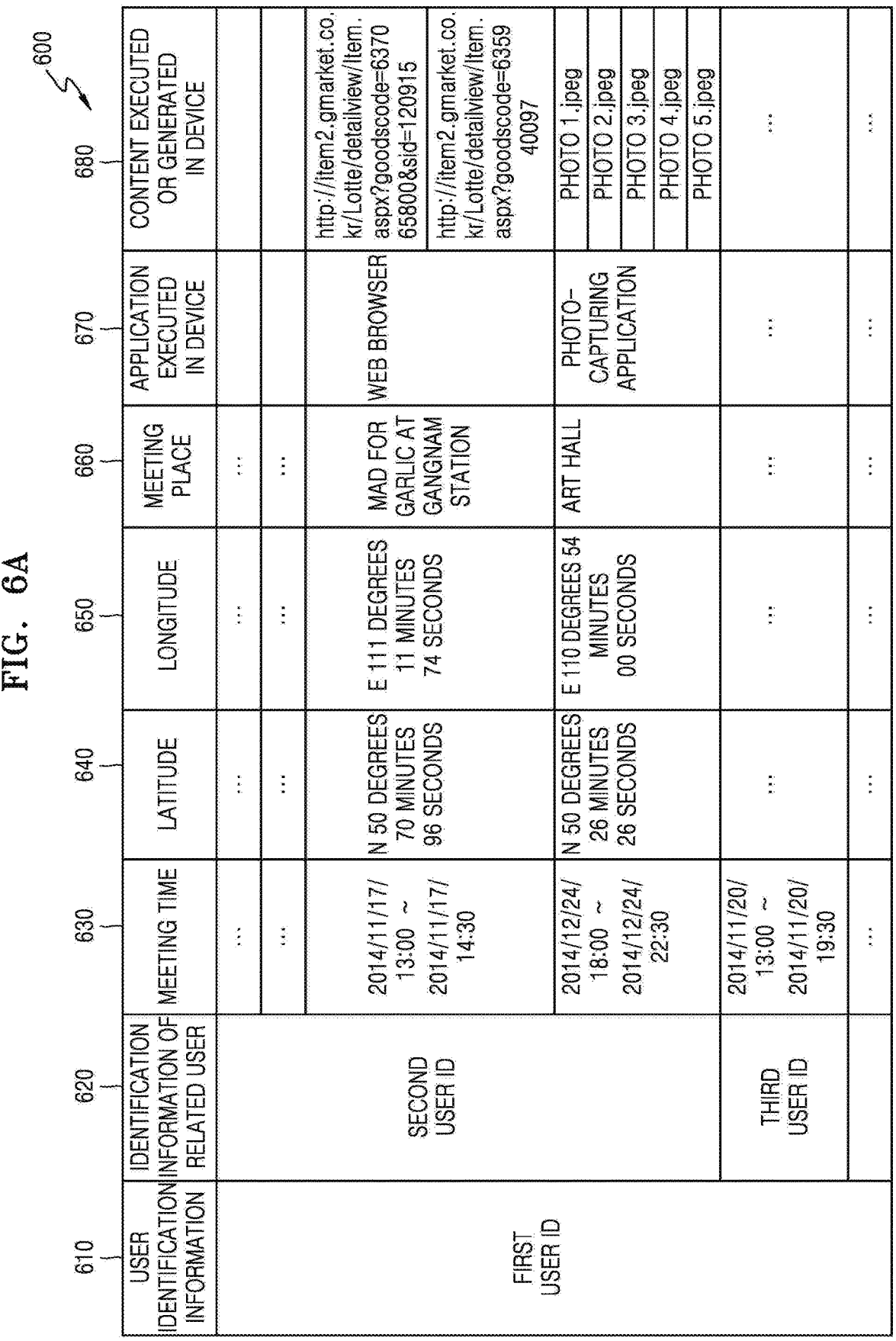

| USER IDENTIFICATION INFORMATION 610 | IDENTIFICATION INFORMATION OF RELATED USER 620 | MEETING TIME 630 | LATITUDE 640 | LONGITUDE 650 | MEETING PLACE 660 | APPLICATION EXECUTED IN DEVICE 670 | CONTENT EXECUTED OR GENERATED IN DEVICE 680 |
|---|---|---|---|---|---|---|---|
| FIRST USER ID | | ⋮ | ⋮ | ⋮ | ⋮ | | |
| | SECOND USER ID | 2014/11/17/ 13:00 ~ 2014/11/17/ 14:30 | N 50 DEGREES 70 MINUTES 96 SECONDS | E 111 DEGREES 11 MINUTES 74 SECONDS | MAD FOR GARLIC AT GANGNAM STATION | WEB BROWSER | http://item2.gmarket.co.kr/Lotte/detailview/Item.aspx?goodscode=6370 65800&sid=120915 |
| | | 2014/12/24/ 18:00 ~ 2014/12/24/ 22:30 | N 50 DEGREES 26 MINUTES 26 SECONDS | E 110 DEGREES 54 MINUTES 00 SECONDS | ART HALL | | http://item2.gmarket.co.kr/Lotte/detailview/Item.aspx?goodscode=6359 40097 |
| | THIRD USER ID | 2014/11/20/ 13:00 ~ 2014/11/20/ 19:30 | ⋮ | ⋮ | ⋮ | PHOTO-CAPTURING APPLICATION | PHOTO 1.jpeg PHOTO 2.jpeg PHOTO 3.jpeg PHOTO 4.jpeg PHOTO 5.jpeg |
| | | | | | | ⋮ | ⋮ |

FIG. 6B

| USER IDENTIFICATION INFORMATION 610 | IDENTIFICATION INFORMATION OF RELATED USER 620 | MEETING TIME 630 | LATITUDE 640 | LONGITUDE 650 | MEETING PLACE 660 | APPLICATION EXECUTED IN DEVICE 670 | CONTENT EXECUTED OR GENERATED IN DEVICE 680 |
|---|---|---|---|---|---|---|---|
| SECOND USER ID | FIRST USER ID | 2014/11/17/ 13:00 ~ 2014/11/17/ 14:30 | N 50 DEGREES 70 MINUTES 96 SECONDS | E 111 DEGREES 11 MINUTES 74 SECONDS | MAD FOR GARLIC AT GANGNAM STATION | PHOTO-CAPTURING APPLICATION | PHOTO aa.jpeg PHOTO bb.jpeg |
| | | 2014/12/24/ 18:00 ~ 2014/12/24/ 22:30 | N 50 DEGREES 26 MINUTES 26 SECONDS | E 110 DEGREES 54 MINUTES 00 SECONDS | ART HALL | MUSIC REPRODUCTION APPLICATION | aaa.mp3 bbb.avi ccc.aac ddd.asf |
| | FOURTH USER ID | 2014/11/22/ 17:00 ~ 2014/11/22/ 23:30 | ... | ... | ... | ... | ... |
| | | ... | ... | ... | ... | ... | ... |

| FIRST USER'S SCHEDULE | |
|---|---|
| TIME | PLACE |
| ~~09:43, 09:59~~ | SAMSEONG-RO |
| 10:00, 10:09 | HYOWON-RO |
| 10:10, 15:27 | MAETAN-RO 108 BEON-GIL |
| ... | ... |

704 ⚡

| SECOND USER'S SCHEDULE | |
|---|---|
| PLACE | TIME |
| HYOWON-RO | 10:00, 10:03 |
| MAETAN-RO | ~~10:04, 10:05~~ |
| MAETAN-RO 108 BEON-GIL | 10:06, 15:27 |
| ... | ... |

FIG. 7C

| USER IDENTIFICATION INFORMATION (710) | SCHEDULE (720) | | USER'S ACTIVITY INFORMATION (420a) | | | | ADDITIONAL INFORMATION (740) | |
|---|---|---|---|---|---|---|---|---|
| | DATE AND TIME (722) | CONTENT (724) | TIME (422a) | LATITUDE (424a) | LONGITUDE (426a) | PERSON IDENTIFICATION INFORMATION (730) | PLACE (742) | PERSON (745) |
| SECOND USER ID | 2014/11/16/ 16:00 ~ 2014/11/10/ 18:00 | Chuck APGUJEONG STATION | 2014/11/10/ 16:00 ~ 2014/11/10/ 18:00 | N 50 DEGREES 62 MINUTES 97 SECONDS | E 111 DEGREES 86 MINUTES 08 SECONDS | THIRD USER ID | APGUJEONG STATION | Chuck |
| | 2014/11/17/ 13:00 ~ 2014/11/17/ 15:00 | MAD FOR GARLIC AT GANGNAM STATION | 2014/11/17/ 13:00 ~ 2014/11/17/ 15:00 | N 50 DEGREES 70 MINUTES 96 SECONDS | E 111 DEGREES 11 MINUTES 74 SECONDS | | MAD FOR GARLIC AT GANGNAM STATION | x |
| | Bob, 24TH SATURDAY, 1 P.M. | | 2014/11/24/ 13:00 ~ | x | x | FOURTH USER ID | x | Bob |
| | ... | | ... | | | | ... | |

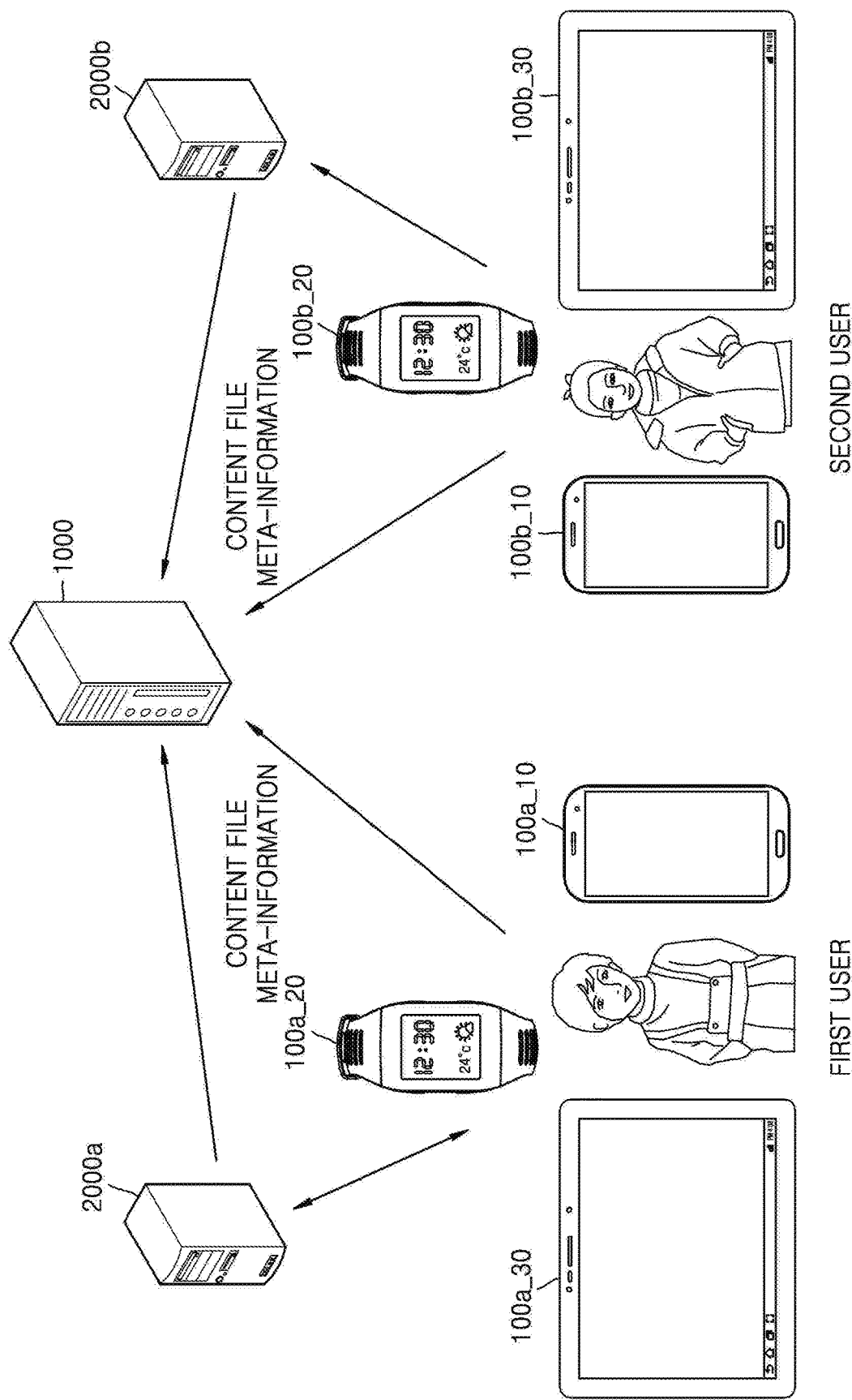

FIG. 8B

| USER'S IDENTIFICATION INFORMATION (810) | CONTENT IDENTIFICATION INFORMATION (820) | USERS' ACTIVITY INFORMATION (830) ||| ADDITIONAL INFORMATION (837) ||
|---|---|---|---|---|---|---|
| | | TIME (832) | LATITUDE (834) | LONGITUDE (836) | STORAGE POSITION (838) | PERSON IN PHOTO (839) |
| SECOND USER ID | aaa.jpeg | 2014/11/10/ 16:00 | N 50 DEGREES 62 MINUTES 96 SECONDS | E111 DEGREES 86 MINUTES 08 SECONDS | SECOND DEVICE IDENTIFICATION INFORMATION | Chuck |
| | bbb.jpeg | 2014/11/17/ 13:00 ~ 2014/11/17/ 15:00 | N 50 DEGREES 70 MINUTES 96 SECONDS | E111 DEGREES 11 MINUTES 74 SECONDS | SECOND DEVICE IDENTIFICATION INFORMATION | Linda |
| | ccc.jpeg | 2014/11/24/ 18:00 ~ 2014/11/17/ 20:00 | N 50 DEGREES 29 MINUTES 96 SECONDS | E111 DEGREES 64 MINUTES 23 SECONDS | http://ndrive. naver.com/# mode=photo &fileId=32533 | X |
| | ... | ... | ... | ... | ... | ... |

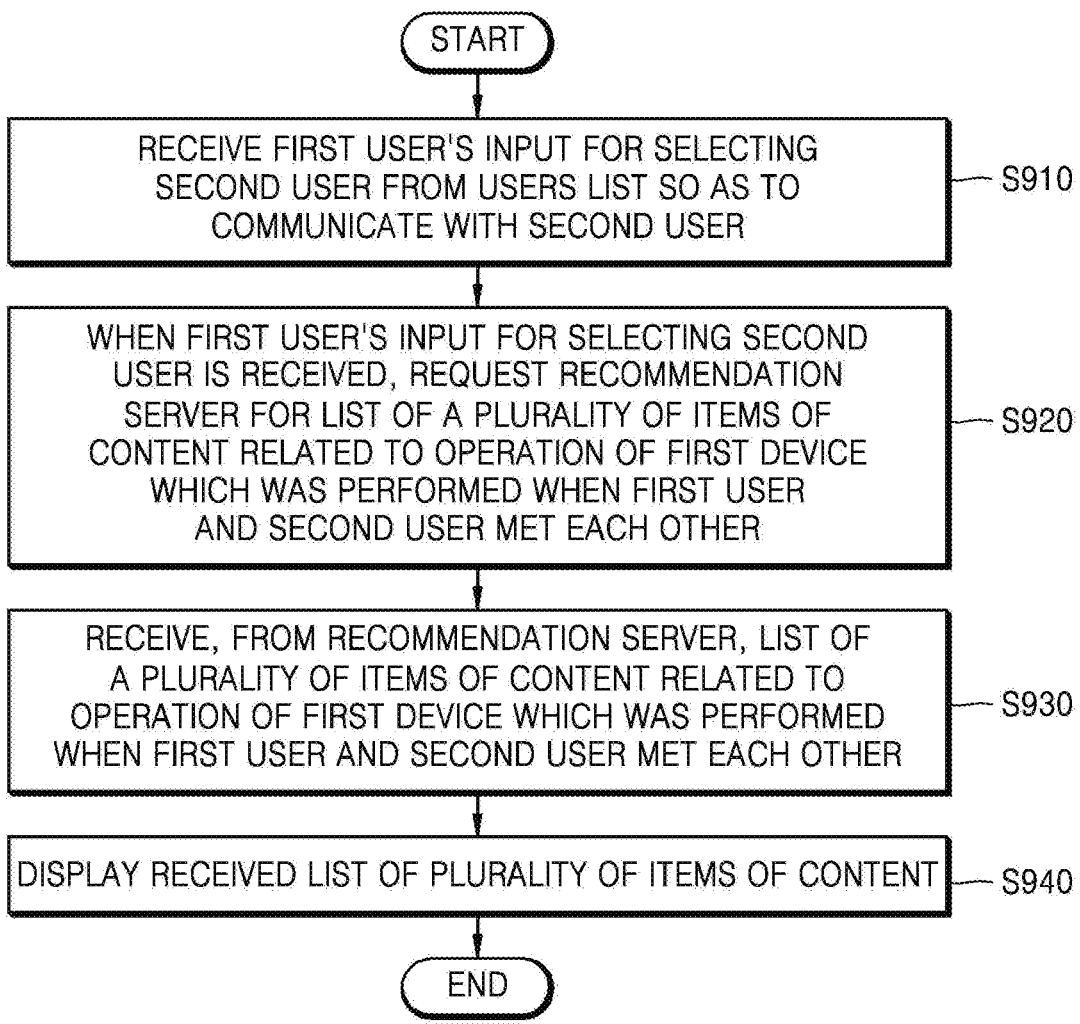

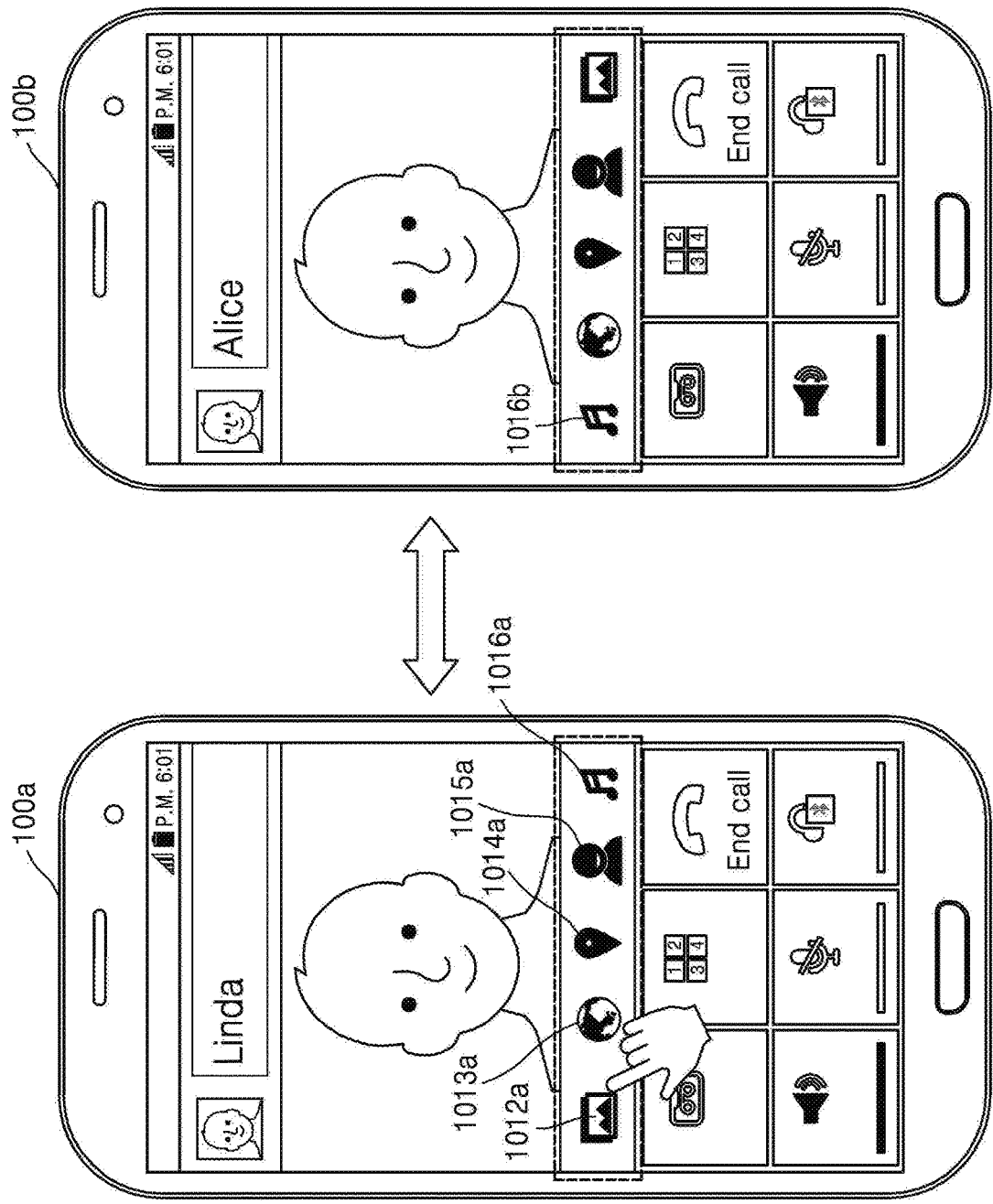

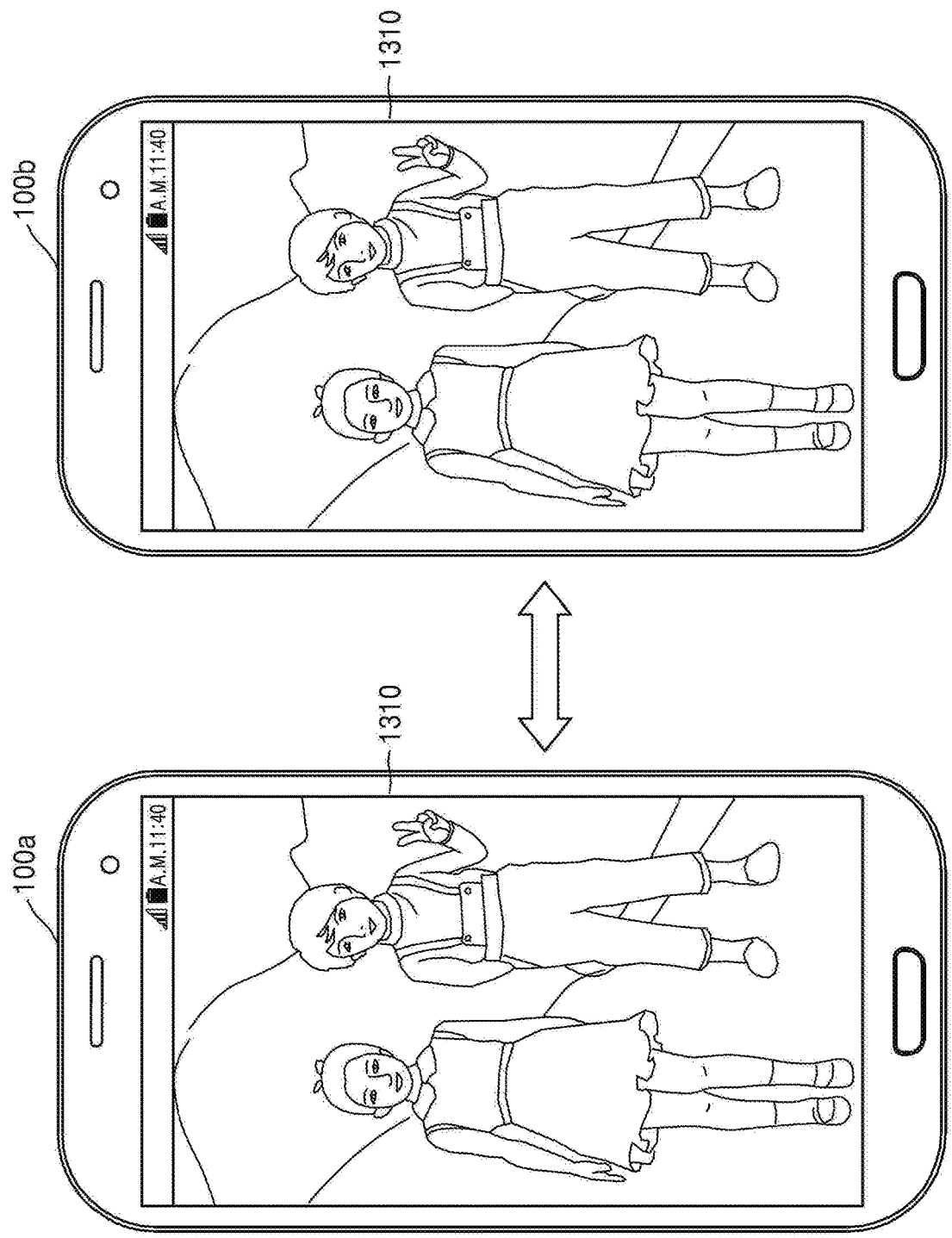

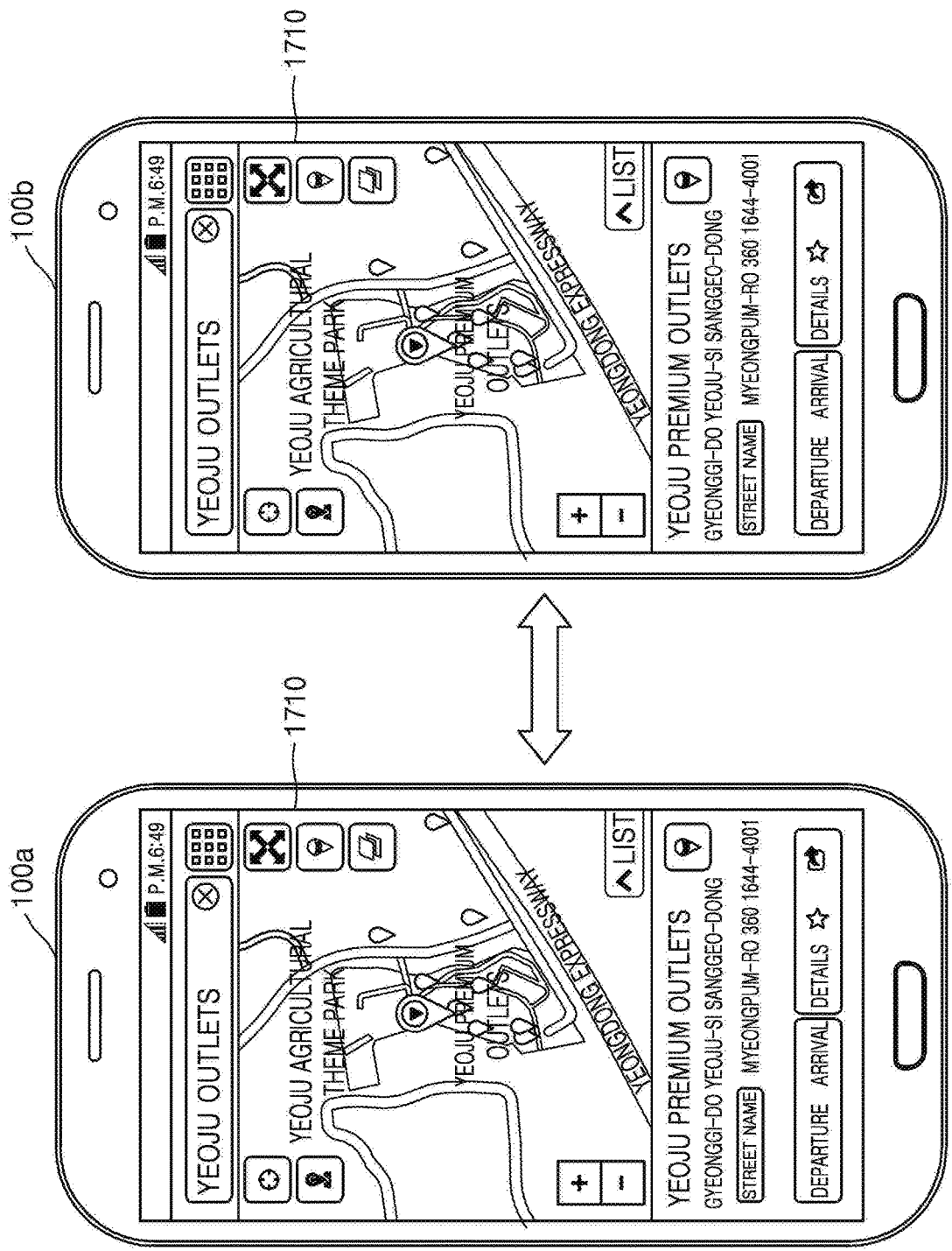

FIG. 21B

| USERS LIST RELATED TO FIRST USER 2120 | PHONE NUMBER 2130 | WHETHER OR NOT CONTACT DETAIL IS STORED 2140 | NUMBER OF TIMES CONTACT OCCURRED 2150 | NUMBER OF TIMES CONTACT OCCURRED RECENTLY 2160 | WHETHER OR NOT EACH USER IS SNS FRIEND 2170 | CLOSENESS 2180 | RELATIONSHIP THAT ALLOWS SHARING OF CONTENT 2190 |
|---|---|---|---|---|---|---|---|
| SECOND USER ID | 123-1234 | ○ | 30 | 10/1month | ○ | 2 | ○ |
| THIRD USER ID | 123-1235 | X | 3 | 3/1month | X | 1 | X |
| FOURTH USER ID | 123-1236 | ○ | 50 | 20/1month | ○ | 3 | ○ |
| ⋮ | ⋮ | ⋮ | ⋮ | ⋮ | ⋮ | ⋮ | ⋮ |

2100

METHOD AND APPARATUS FOR RECOMMENDING CONTENT BASED ON ACTIVITIES OF A PLURALITY OF USERS

CROSS-REFERENCE TO RELATED APPLICATION(S)

This application claims the benefit under 35 U.S.C. § 119(a) of a Korean patent application filed on Feb. 17, 2015 in the Korean Intellectual Property Office and assigned Serial number 10-2015-0024313, the entire disclosure of which is hereby incorporated by reference.

TECHNICAL FIELD

The present disclosure relates to methods and apparatuses for recommending content based on activities of a plurality of users. More particularly, the present disclosure relates to a method for determining a time when users, who are in communication with each other by using devices, met each other, and recommending content during the communication, based on operations of the devices of the users which were performed at the determined time.

BACKGROUND

Due to developments in networks and multimedia, devices may provide not only a voice call but may also provide high-speed data communication. Accordingly, the number of cases in which even a mobile device may download content from a server or two users may share content is increased.

However, a user cannot share content with another party during a call. Even if the content is shared during the call, it takes a long time to search for the desired content. Therefore, there is a demand for a technique that allows content to be shared among users who communicate with each other, and that recommends share-target content by considering activities of the users which were performed before the communication.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for determining a time when users, who are in communication with each other by using devices, met each other, and recommending content during the communication, based on operations of the devices of the users which were performed at the determined time.

In accordance with an aspect of the present disclosure, a recommendation server is provided. The recommendation server includes a communicator configured to receive, from a first device, when a first user's input for communicating with a second user is received by the first device of the first user, a transmission request with respect to a list of a plurality of items of content related to an operation of the first device which was performed when the first user and the second user met each other, and a controller configured to determine a time when the first user and the second user met each other, based on at least one of first user's activity information of the first user and second user's activity information of the second user, and to provide, to the first device, the list of the plurality of items of content related to the operation of the first device which was performed at the determined time.

The content related to the operation of the first device which was performed when the first user and the second user met each other may include at least one of content that was executed in the first device and content that was generated in the first device when the first user and the second user met each other.

The controller may be further configured to provide, to the first device, identification information of an application to execute the content.

The first user's activity information may include location information of the first user according to time, and the second user's activity information may include location information of the second user according to time.

The controller may be further configured to compare the location information of the first user according to time with the location information of the second user according to time, and to determine the time when the first user and the second user met each other.

The first user's activity information may include at least one of identification information of content that was executed in the first device, identification information of an application that executed the content, and information about a location where the content was executed.

The first user's activity information may be obtained from schedule information of the first user.

The first user's activity information may be obtained from meta-information of content that was generated in the first device.

The communicator may be further configured to receive, from the first device, a request for sharing the content between the first user and the second user, and the controller may be further configured to provide the content to the second device, in response to the request.

The communicator may be further configured to transmit, to the second device, the list of the plurality of items of content related to the operation of the first device which was performed at the determined time.

The controller may be further configured to determine a number of times contact occurred between the first user and the second user, based on information about the second user which is stored in the first device, and to determine the second user as a user to share the content, when the number of times contact occurred is equal to or greater than a reference.

In accordance with another aspect of the present disclosure, a device is provided. The device includes a user input device configured to receive an input, by a first user, for selecting a second user from a list of users so as to communicate with the second user, a controller configured to receive the first user's input for selecting the second user, and to request a recommendation server for a list of a plurality of items of content related to an operation of the device which was performed when the first user and the second user met each other, a communicator configured to receive, from the recommendation server, the list of the plurality of items of content related to the operation of the device which was performed when the first user and the second user met each other, and a display device configured to display the list of the plurality of items of content.

The content related to the operation of the device which was performed when the first user and the second user met each other may include at least one of content that was executed in the device and content that was generated in the device when the first user and the second user met each other.

The communicator may be further configured to receive, from the recommendation server, identification information of an application to execute the content.

The list of the plurality of items of content related to the operation of the device which was performed when the first user and the second user met each other may be determined based on at least one of first user's activity information of the first user and second user's activity information of the second user.

The first user's activity information may include at least one of identification information of content that was executed in the device, identification information of an application that executed the content, information about a location where the content was executed, schedule information of the first user, and meta-information of the content that was generated in the device.

The controller may be further configured to determine a plurality of applications configured to execute content that is sharable with the second user, and the display device may be further configured to display a list of the plurality of applications, so that identification information of an application to execute the content may be displayed first in the list, wherein the content is related to the operation of the device which was performed when the first user and the second user met each other.

The user input device may be further configured to receive a first user's input for selecting, from the list of the plurality of applications, the application to execute the content related to the operation of the device which was performed when the first user and the second user met each other, and when the first user's input for selecting the application is received, the display device may be further configured to display a list of a plurality of items of content executable by using the application, so that identification information of the content related to the operation of the device which was performed when the first user and the second user met each other may be displayed first in the list.

The user input device may be further configured to receive an input, by the first user, for requesting sharing of the content with the second user, and the controller may be further configured to request the recommendation server to share the content between the first user and the second user.

In accordance with another aspect of the present disclosure, a method of recommending content is provided. The method includes receiving, from a first device, when a first user's input for communicating with a second user is received by the first device of the first user, a transmission request with respect to a list of a plurality of items of content related to an operation of the first device which was performed when the first user and the second user met each other, determining a time when the first user and the second user met each other, based on at least one of first user's activity information of the first user and second user's activity information of the second user, and providing, to the first device, a list of a plurality of items of content related to an operation of the first device which was performed at the determined time.

The providing of the list of the plurality of items of content may include providing, to the first device, identification information of an application to execute the content.

The first user's activity information may include location information of the first user according to time, and the second user's activity information may include location information of the second user according to time, and the determining of the time may include comparing the location information of the first user according to time with the location information of the second user according to time, and determining the time when the first user and the second user met each other.

The method may further include receiving, from the first device, a request for sharing the content between the first user and the second user, and providing the content to the second device, in response to the request.

The method may further include transmitting, to the second device, the list of the plurality of items of content related to the operation of the first device which was performed at the determined time.

The method may further include determining a number of times contact occurred between the first user and the second user, based on information about the second user which is stored in the first device, and determining the second user as a user to share the content, when the number of times contact occurred is equal to or greater than a reference.

In accordance with another aspect of the present disclosure, a method of recommending content is provided. The method includes receiving an input, by a first user, for selecting a second user from a list of users so as to communicate with the second user, receiving the first user's input for selecting the second user, and requesting a recommendation server for a list of a plurality of items of content related to an operation of the device which was performed when the first user and the second user met each other, receiving, from the recommendation server, the list of the plurality of items of content related to the operation of the device which was performed when the first user and the second user met each other, and displaying the list of the plurality of items of content.

The method may further include receiving, from the recommendation server, identification information of an application to execute the content.

The method may further include determining a plurality of applications configured to execute content that is sharable with the second user, and displaying a list of the plurality of applications, so that identification information of an application to execute the content is displayed first in the list, wherein the content is related to the operation of the device which was performed when the first user and the second user met each other.

The method may further include receiving a first user's input for selecting, from the list of the plurality of applications, the application to execute the content related to the operation of the device which was performed when the first user and the second user met each other, and displaying, when the first user's input for selecting the application is received, a list of a plurality of items of content executable by using the application, so that identification information of the content related to the operation of the device which was performed when the first user and the second user met each other is displayed first in the list.

The method may further include receiving a first user's input for requesting sharing of the content with the second user, and requesting the recommendation server to share the content between the first user and the second user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates a flowchart of a method of recommending content, based on an activity performed together by users, the method being performed by a recommendation server, according to an embodiment of the present disclosure;

FIGS. 4A, 4B, 4C, and 4D illustrate diagrams for describing a method of obtaining a plurality of pieces of user's activity information about users, the method being performed by a recommendation server, according to an embodiment of the present disclosure;

FIG. 5 illustrates a diagram for describing a method of determining a time when users met each other, based on a plurality of pieces of user's activity information about the users, the method being performed by a recommendation server, according to an embodiment of the present disclosure;

FIGS. 6A and 6B illustrate diagrams for describing a method of generating a database (DB) about activities performed together by users, the method being performed by a recommendation server, according to an embodiment of the present disclosure;

FIGS. 7A, 7B, and 7C illustrate diagrams for describing a method of determining information about an activity performed together by users, based on a plurality of pieces of information about activities of the users, the method being performed by a recommendation server, according to an embodiment of the present disclosure;

FIGS. 8A and 8B illustrate diagrams for describing a method of determining information about an activity performed together by users, based on a plurality of pieces of information about activities of the users, the method being performed by a recommendation server, according to an embodiment of the present disclosure;

FIG. 9 illustrates a flowchart of a method of recommending content, based on an activity performed together by users who communicate with each other, the method being performed by a device, according to an embodiment of the present disclosure;

FIGS. 10A, 10B, and 10C illustrate diagrams for describing a method of recommending an application to be executed during communication, based on an activity performed together by users who communicate with each other, the method being performed by a device, according to an embodiment of the present disclosure;

FIG. 13A illustrates diagrams for describing a method of sharing content between users who communicate with each other, the method being performed by a device, according to an embodiment of the present disclosure;

FIGS. 17A and 17B illustrate diagrams for describing a method of recommending map content, based on an activity performed together by users who communicate with each other, the method being performed by a device, according to an embodiment of the present disclosure;

FIGS. 21A and 21B illustrate diagrams for describing a method of determining a relationship between users, and determining whether to share content, based on the determined relationship, the method being performed by a recommendation server, according to an embodiment of the present disclosure;

Throughout the drawings, it should be noted that like reference numbers are used to depict the same or similar elements, features, and structures.

DETAILED DESCRIPTION

Figure 1A:
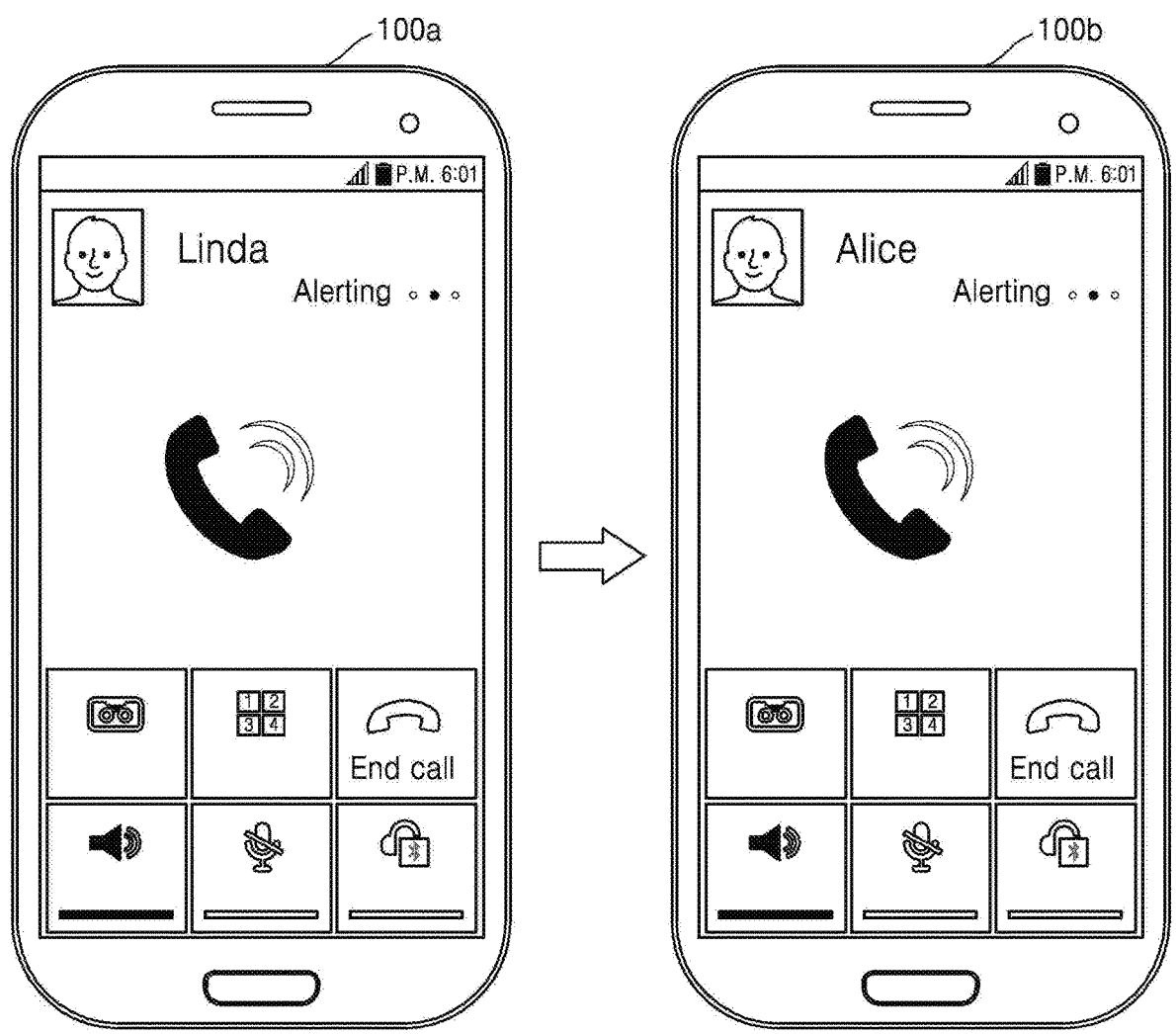
FIGS. 1A, 1B, and 1C illustrate diagrams for describing a method of recommending content, based on activities that were performed together by users who communicate with each other, the method being performed by a device, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In addition, when a part "includes" or "comprises" an element, unless there is a particular description contrary thereto, the part can further include other elements, not excluding the other elements. In the following description, terms, such as "unit" and "module" indicate a unit for processing at least one function or operation, wherein the unit and the block may be embodied as hardware or software or embodied by combining hardware and software.

Throughout the specification, the term "user's activity information" may indicate location information of a device of the user according to time.

One or more embodiments will now be described more fully with reference to the accompanying drawings. However, the one or more embodiments may be embodied in many different forms, and should not be construed as being limited to the various embodiments set forth herein; rather, these various embodiments are provided so that this disclosure will be thorough and complete, and will fully convey the concept of the one or more embodiments to those of ordinary skill in the art. In the following description, well-known functions or constructions are not described further since they would obscure the one or more embodiments with unnecessary detail, and also, throughout the specification, like reference numerals in the drawings denote like elements.

As used herein, the term "and/or" includes any and all combinations of one or more of the associated listed items. Expressions, such as "at least one of," when preceding a list of elements, modify the entire list of elements and do not modify the individual elements of the list.

Figure 1B:
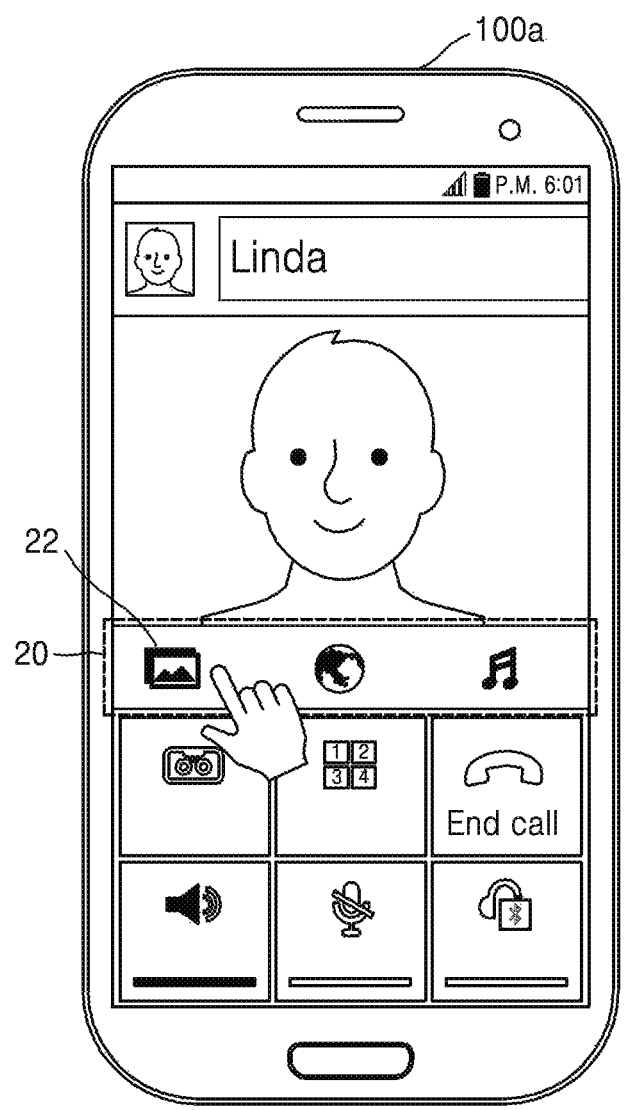
Figure 1C:
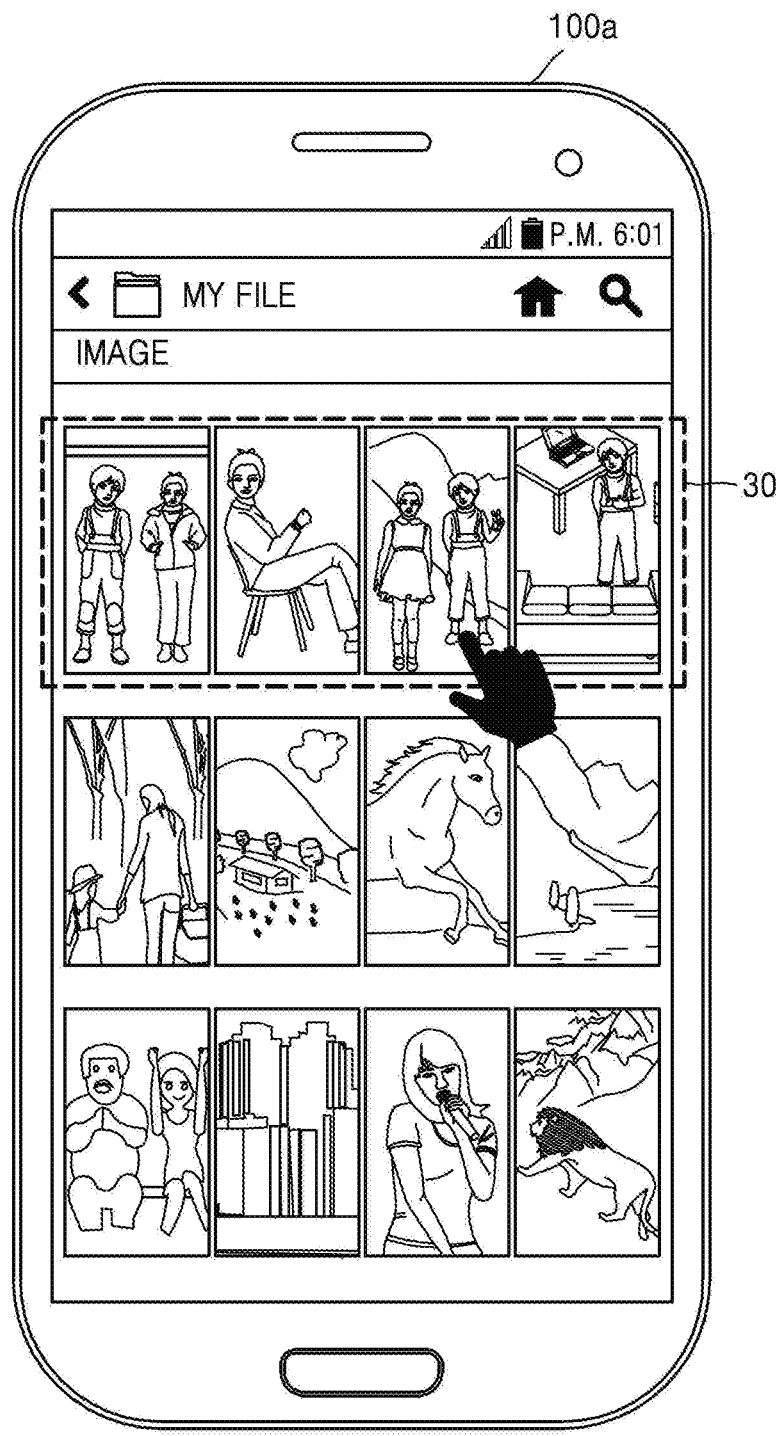

FIGS. 1A, 1B, and 1C illustrate diagrams for describing a method of recommending content, based on activities that were performed together by users who communicate with each other, the method being performed by a device, according to an embodiment of the present disclosure.

Referring to FIG. 1A, a device 100 including a first device 100*a* and a second device 100*b*, or a recommendation server 1000 may store information 10 about activities that were performed together by users. The information 10 about the activities that were performed together by a first user and a second user may be stored in correspondence to identification information of each of the first and second users.

For example, the device 100 or the recommendation server 1000 may store information 15 indicating the first user who is "Alice" and the second user who is "Linda" captured a photo on November 17, 9 o'clock in the Yeongtong Station, in correspondence to identification information of each of "Alice" and "Linda".

When the first device 100*a* receives an input from the first user who requests communication from the second user, the first device 100*a* may request the recommendation server 1000 to connect the first device 100*a* and the second device 100*b* for communication between the first user and the second user. For example, when the first device 100*a* receives an input of "Alice" to call "Linda", the first device 100*a* may request a phone network server to connect the first device 100*a* and the second device 100*b* for a call between "Alice" and "Linda".

Referring to FIG. 1B, when the first device 100*a* and the second device 100*b* are connected, the first device 100*a* may display one or more applications 20 to allow the first user and the second user to share content between the first user and the second user.

In this case, the first device 100*a* may recommend an application to allow content to be shared, wherein the content is predicted to have been executed or generated by both "Alice" and "Linda" when "Alice" and "Linda" met each other. For example, based on information about the photo captured by "Alice" and "Linda" on November 17, 9 o'clock in the Yeongtong Station, the first device 100*a* may recommend a photo viewer application 22 to make photo content shared.

Referring to FIG. 1C, when the first device 100*a* receives an input of "Alice" who selects the photo viewer application 22, the first device 100*a* may recommend content that is predicted to have been executed or generated by both "Alice" and "Linda" when "Alice" and "Linda" met each other.

For example, when the input of "Alice" who selects the photo viewer application 22 is received, the first device 100*a* may display, on a top of a screen of the first device 100*a*, photos 30 captured when "Alice" and "Linda" met each other, based on the information about the photo taken by "Alice" and "Linda" on November 17, 9 o'clock in the Yeongtong Station, so that the photos 30 captured when "Alice" and "Linda" met each other may be first displayed from among a plurality of photos stored in the first device 100a. Accordingly, "Alice" does not need to scroll many photos so as to share a photo of "Alice" and "Linda" with "Linda".

When an input of "Alice" who selects one of the photos 30 captured when "Alice" and "Linda" met each other is received, the first device 100a may display the selected photo on the screen. The first device 100a may request the recommendation server 1000 to transmit the selected photo to the second device 100b. When the photo selected by "Alice" is transmitted from the recommendation server 1000, the second device 100b may display the received photo on a screen of the second device 100b. Accordingly, the first device 100a and the second device 100b may simultaneously display the same photo during a call.

Throughout the specification, the first device 100a may be a device of the first user, and the second device 100b may be a device of the second user. Throughout the specification, for convenience of description, content is shared between the device of the first user and the device of the second user, however, in other embodiments of the present disclosure, devices of at least three users, not two users, may share content therebetween.

FIG. 2 illustrates a flowchart of a method of recommending content, based on an activity performed together by users, the method being performed by a recommendation server, according to an embodiment of the present disclosure.

Referring to FIG. 2, in operation S210, when an input of the first user who attempts to communicate with the second user is received by the first device 100a, the recommendation server 1000 may receive, from the first device 100a, a transmission request with respect to a list of content related to an operation of the first device 100a which was performed when the first user and the second user met each other.

The content related to the operation of the first device 100a which was performed when the first user and the second user met each other may include at least one of content executed in the first device 100a and content generated in the first device 100a, wherein the execution and the generation were performed when the first user and the second user met each other.

In operation S220, the recommendation server 1000 may determine a time when the first user and the second user met each other, based on at least one of activity information about the first user and activity information about the second user.

The activity information about the first user may include at least one of identification information of the content executed in the first device 100a, identification information of an application that executed the content, and information about a location where the content was executed.

User's activity information may indicate information about locations of a user according to time. The user's activity information may be obtained from schedule information of the user. In addition, the user's activity information may be obtained from meta-information of content generated in a device of the user.

The recommendation server 1000 may compare location information of the first user according to time with location information of the second user according to time, and then may determine the time when the first user and the second user met each other.

In operation S230, the recommendation server 1000 may provide, to the first device 100a, a list of content related to an operation of the first device 100a which was performed at the determined time.

In this case, the recommendation server 1000 may determine a closeness of the relationship between the first user and the second user, based on information about the second user which is stored in the first device 100a, and only when the closeness is equal to or greater than a reference, the recommendation server 1000 may determine the second user as a target user to share the content.

The recommendation server 1000 may transmit, to the second device 100b, a list of content related to an operation of the second device 100b which was performed at the determined time.

The recommendation server 1000 may provide, to the first device 100a, identification information of an application to execute the content.

The recommendation server 1000 may provide the list of content to the second device 100b.

Figure 3:
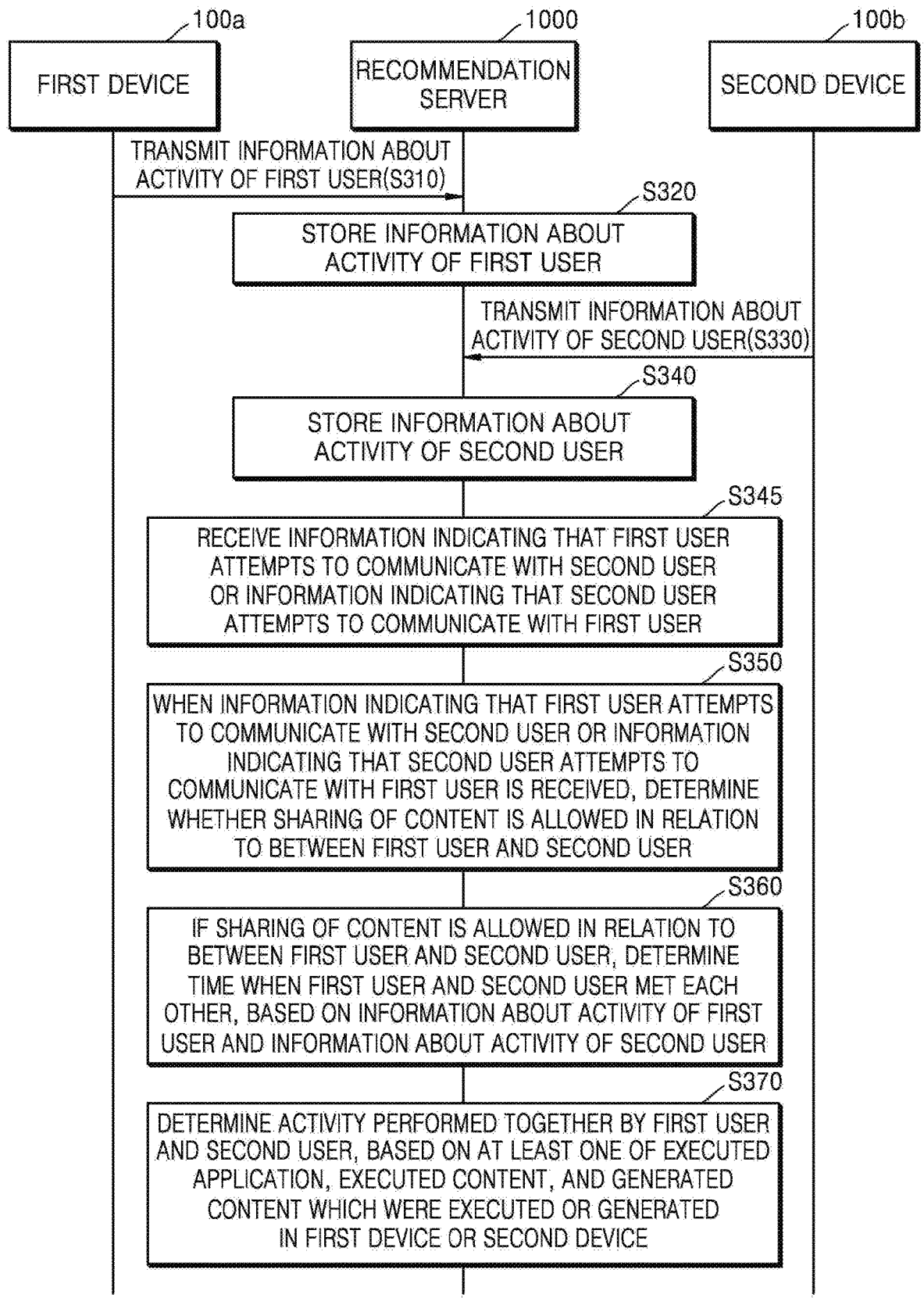
FIG. 3 illustrates a flowchart of a method of determining information about an activity performed together by users, based on a plurality of pieces of information about activities of the users, the method being performed by a recommendation server, according to an embodiment of the present disclosure.

FIG. 3 illustrates a flowchart of a method of determining information about an activity performed together by users, based on a plurality of pieces of information about activities of the users, the method being performed by a recommendation server, according to an embodiment of the present disclosure.

Referring to FIG. 3, in operation S310, the first device 100a may transmit, to the recommendation server 1000, information about an activity of the first user.

The first device 100a may transmit the information about the activity of the first user along with an identifier (ID) of the first user which is registered in the recommendation server 1000, and identification information of the first device 100a.

User's activity information may indicate information about locations of the device 100 of a user according to time. The user's activity information may include information about at least one application executed in the device 100 of the user, information about at least one item of executed content, and information about at least one item of generated content according to time.

The device 100 may transmit, as the user's activity information, information about a location of the device 100 at a particular time, and information about an executed application, executed content, and generated content which were executed or generated in the device 100 at the particular time, to the recommendation server 1000.

The device 100 may transmit, to the recommendation server 1000, user's schedule information as the user's activity information. The device 100 may transmit, to the recommendation server 1000, meta-information of content generated in the device 100 as the user's activity information.

The device 100 may periodically transmit the user's activity information to the recommendation server 1000. When content is executed or is generated in the device 100, the device 100 may transmit the user's activity information to the recommendation server 1000. When the user attempts to communicate with another user by using the device 100, the device 100 may transmit the user's activity information to the recommendation server 1000.

In operation S320, the recommendation server 1000 may store the information about the activity of the first user which is received from the first device 100a.

The information about the activity of the first user which is received from the first device 100a may be stored in correspondence to the identification information of the first user.

For example, the recommendation server 1000 may store, as the information about the activity of the first user, the information about the location of the device 100 at the particular time, and the information about the executed application, the executed content, and the generated content which were executed or generated in the device 100 at the particular time.

In addition, the recommendation server 1000 may determine location information of the device 100 of the user at the particular time, based on the received schedule information, and may store, as the information about the activity of the first user, the determined location information of the device 100 of the user.

The recommendation server 1000 may determine, based on the received meta-information of the content, the information about the location of the device 100 at the particular time, and the information about the executed application, the executed content, and the generated content which were executed or generated in the device 100 at the particular time, and may store, as the information about the activity of the first user, the information about the location of the device 100 at the particular time, and the information about the executed application, the executed content, and the generated content which were executed or generated in the device 100 at the particular time.

In operation S330, the second device 100b may transmit, to the recommendation server 1000, information about an activity of the second user.

In operation S340, the recommendation server 1000 may store the information about the activity of the second user which is received from the second device 100b. Operations S330 through S340 may be described with reference to operations S310 through S320.

In operation S345, the recommendation server 1000 may receive information indicating that the first user attempts to communicate with the second user or information indicating that the second user attempts to communicate with the first user.

For example, when a user input of the first user who attempts to communicate with the second user is received, the first device 100a may transmit, to the recommendation server 1000, the information indicating that the first user attempts to communicate with the second user. In this case, the first device 100a may transmit, to the recommendation server 1000, the identification information of the first user and the identification information of the second user which are registered in the recommendation server 1000.

For example, when the first device 100a requests a call server to connect a call between the first user and the second user, the call server may transmit, to the recommendation server 1000, the information indicating that the first user attempts to communicate with the second user. In this case, the call server may transmit phone numbers of the first user and the second user to the recommendation server 1000.

In operation S350, when the recommendation server 1000 receives the information indicating that the first user attempts to communicate with the second user or the information indicating that the second user attempts to communicate with the first user, the recommendation server 1000 may determine whether sharing of content is allowed in a relation between the first user and the second user.

The relation between the first user and the second user which was determined based on user information of the first user or user information of the second user may be set in the recommendation server 1000.

The user information may include contact information, a call history list, a short message service (SMS) list, and a chatting list. The recommendation server 1000 may determine the closeness, based on whether contact information is stored, the number of contacts, the number of recent contacts, and whether a social networking service (SNS) friendship is established, according to the user information of the first user or the user information of the second user, and may determine, based on the determined closeness, whether sharing of content is allowed in the relation between the first user and the second user.

A method of determining a relation among users, based on user information, will be described at a later time with reference to FIGS. 19A to 19C.

In operation S360, if sharing of content is allowed in the relation between the first user and the second user, the recommendation server 1000 may determine the time when the first user and the second user met each other, based on the information about the activity of the first user and the information about the activity of the second user.

The recommendation server 1000 may compare the information about the activity of the first user with the information about the activity of the second user, and may determine whether the first user and the second user were in a same place at a same time. When the recommendation server 1000 determines that the first user and the second user were in a particular place at a particular time, the recommendation server 1000 may determine the particular time as the time when the first user and the second user met each other.

In an embodiment of the present disclosure, the recommendation server 1000 may compare the information about the activity of the first user with the information about the activity of the second user, and may determine the time when the first user and the second user met each other, based on a time period in which the first device 100a and the second device 100b communicate with each other via short-distance communication.

In operation S370, the recommendation server 1000 may determine an activity performed together by the first user and the second user, based on at least one of an executed application, executed content, and generated content which were executed or generated in the first device 100a or the second device 100b.

The activity performed together by the first user and the second user may be determined from information about content related to an operation of the first device 100a or the second device 100b which was performed when the first user and the second user met each other.

For example, the recommendation server 1000 may determine the activity performed together by the first user and the second user, based on at least one of the executed application, the executed content, and the generated content which were executed or generated in the first device 100a or the second device 100b when the first user and the second user met each other.

FIGS. 4A, 4B, 4C, and 4D illustrate diagrams for describing a method of obtaining a plurality of pieces of user's activity information about users, the method being performed by a recommendation server, according to an embodiment of the present disclosure.

Referring to FIG. 4A, the recommendation server 1000 may receive, from the device 100 of the user, information about a time, a location of the device 100, and an executed application. The device 100 may include devices 100a_10, 100a_20, and 100a_30 of the first user, and devices 100b_10, 100b_20, and 100b_30 of the second user.

The location of the device 100 may include latitudes and longitudes information, address information, and place information, such as a business name. The information about the executed application may include identification information of the application that is being executed.

The device 100 may periodically transmit, to the recommendation server 1000, the information about the time, the location of the device 100, and the executed application. The device 100 may periodically transmit, to the recommendation server 1000, the information about the time, the location of the device 100, and the executed application, from when the application started according to a user input until when the application is ended.

The recommendation server 1000 may store, in correspondence to an ID of the user, user's activity information which is received from the device 100. When the user joined a service of a service provider who operates the recommendation server 1000, account information of the user may be registered in the recommendation server 1000.

Referring to FIG. 4B, the recommendation server 1000 may receive, from the device 100 of the user, information about the time, the location of the device 100, executed content or generated content.

For example, the executed content may include reproduced music, a reproduced moving picture, a webpage that is rendered and is displayed on the screen, a map page, and a photo. The generated content may include, but is not limited to, a captured photo, a generated moving picture, and an image and a written memo that are drawn on the screen.

The information about the executed or generated content may include, but is not limited to, identification information of the content, identification information of an application to execute the content, storage position information of the content, and meta-information of the content.

The device 100 may transmit, to the recommendation server 1000, information about a time when the content was executed or generated, the information about the location of the device 100, and the information about the executed or generated content. For example, when a music file is reproduced, the device 100 may transmit, to the recommendation server 1000, information about a reproduction start time, information about a location of the device 100, and information about the reproduced music file. If a photo is captured, the device 100 may transmit, to the recommendation server 1000, information about a time when the photo is captured, information about a location of the device 100, and information about the captured photo.

Referring to FIG. 4C, the recommendation server 1000 may generate a database (DB) 400a corresponding to the first user, based on user's activity information 420a received from the first device 100a.

The recommendation server 1000 may store the user's activity information 420a received from the first device 100a, in correspondence to user identification information 410a of the first user.

For example, the recommendation server 1000 may store, in correspondence to a time 422a, a latitude 424a and a longitude 426a which indicate a location of the first device 100a, application information 427a about an application executed in the first device 100a, and content information 428a about content executed or generated in the first device 100a.

The application information 427a may include identification information of the application. The content information 428a may include identification information of the content, meta-information of the content, storage position information of the content, and identification information of an application to execute the content.

Referring to FIG. 4D, the recommendation server 1000 may generate a DB 400b corresponding to the second user, based on user's activity information 420b received from the second device 100b.

The recommendation server 1000 may store the user's activity information 420b received from the second device 100b, in correspondence to user identification information 410b of the second user.

For example, the recommendation server 1000 may store, in correspondence to a time 422b, a latitude 424b and a longitude 426b which indicate a location of the second device 100b, application information 427b about an application executed in the second device 100b, and content information 428b about content executed or generated in the second device 100b. In this case, if the application information 427b and the content information 428b which correspond to the time 422b are not received, the recommendation server 1000 may store only the latitude 424b and the longitude 426b of the second device 100b which correspond to the time 422b.

FIG. 5 illustrates a diagram for describing a method of determining a time when users met each other, based on a plurality of pieces of user's activity information about the users, the method being performed by a recommendation server, according to an embodiment of the present disclosure.

Referring to FIG. 5, the recommendation server 1000 may compare first user's activity information 400a with second user's activity information 400b, and may determine whether the first user and the second user were in a same place at a same time.

For example, the recommendation server 1000 may determine whether a distance difference between a location of the first device 100a and a location of the second device 100b at a proximate time is within a reference distance. For example, when a distance difference between a location of the first device 100a during a time period from 1 p.m. to 2:30 p.m. on Nov. 17, 2014 and a location of the second device 100b during the same time period is within the reference distance, the recommendation server 1000 may determine that the first user and the second user met each other during the time period from 1 p.m. to 2:30 p.m. on Nov. 17, 2014.

FIGS. 6A and 6B illustrate diagrams for describing a method of generating a DB 600 about activities performed together by users, the method being performed by a recommendation server, according to an embodiment of the present disclosure.

Referring to FIG. 6A, the recommendation server 1000 may generate the database 600 about the activities performed together by the users. The DB 600 about the activities performed together by the users may include user identification information 610 of a reference user, user identification information 620 of a user related to the reference user, a meeting time 630, a latitude 640 with respect to the meeting time 630, a longitude 650 with respect to the meeting time 630, a meeting place 660, application information 670 about an application executed in a device, and content information 680 about content executed or generated in the device.

For example, the recommendation server 1000 may determine the activities performed together by the users, based on at least one of an executed application, executed content, and generated content which were executed or generated in the first device 100a or the second device 100b when the first user and the second user met each other, and may generate the DB 600 about the activities performed together by the users, in correspondence to a plurality of pieces of identification information and time.

For example, during the time period from 1 p.m. to 2:30 p.m. on Nov. 17, 2014 when the first user and the second user met each other, if an application executed in the first device 100a is a web browser, and executed content is a webpage, the recommendation server 1000 may determine that the first user and the second user did a web search together during the time period from 1 p.m. to 2:30 p.m. on Nov. 17, 2014.

The recommendation server 1000 may store "web browser" that is identification information of the executed application, and may store link information of a particular webpage which is identification information of the executed content, in correspondence to an ID of the first user, an ID of the second user, and the time period from 1 p.m. to 2:30 p.m. on Nov. 17, 2014.

Referring to FIG. 6B, the recommendation server 1000 may determine an activity performed together by the first user and the second user, based on at least one of an executed application, executed content, and generated content which are executed or generated in the second device 100b when the first user and the second user met each other.

For example, during the time period from 1 p.m. to 2:30 p.m. on Nov. 17, 2014 when the first user and the second user met each other, if an application executed in the second device 100b is a photo-capturing application, and the generated content is a photo file, the recommendation server 1000 may determine that the first user and the second user did photo-capturing together during the time period from 1 p.m. to 2:30 p.m. on Nov. 17, 2014.

The recommendation server 1000 may store "photo-capturing application" that is identification information of the executed application, and may store identification information of a particular photo which is identification information of the executed content, in correspondence to the ID of the first user, the ID of the second user, and the time period from 1 p.m. to 2:30 p.m. on Nov. 17, 2014.

Figure 7A:
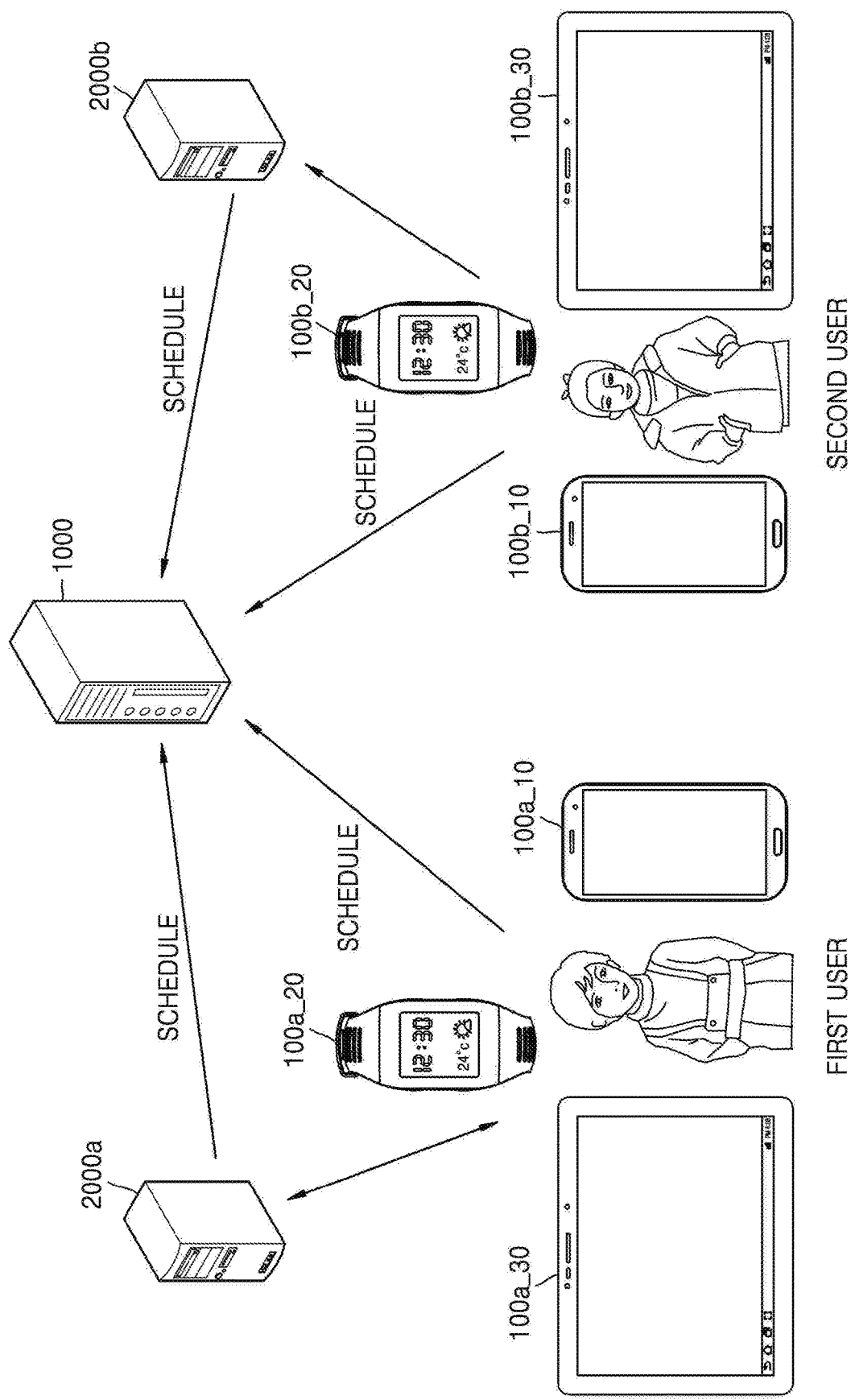

FIGS. 7A, 7B, and 7C illustrate diagrams for describing a method of determining information about an activity performed together by users, based on a plurality of pieces of information about activities of the users, the method being performed by a recommendation server, according to an embodiment of the present disclosure.

Referring to FIG. 7A, the recommendation server 1000 may receive user's schedule information from the device 100.

The user's schedule information may include appointments, things to do, and the like, of a user according to dates and time. The user's schedule information may be divided into a date item, a time item, and a content item according to time, and may be transmitted to the recommendation server 1000. The user's schedule information may be transmitted, to the recommendation server 1000, as one item of data that is not divided according to dates, time, and contents.

The recommendation server 1000 may receive the user's schedule information from the devices 100 of the user or may receive the user's schedule information from at least one of third-party servers 2000a and 2000b storing the user's schedule information.

The device 100 may periodically transmit the user's schedule information to the recommendation server 1000. In addition, whenever a new schedule is input, the device 100 may transmit the input schedule to the recommendation server 1000.

Referring to FIG. 7B, the recommendation server 1000 may determine a time when users met each other, based on a plurality of pieces of user's schedule information.

For example, the recommendation server 1000 may compare first user's schedule information 702 with second user's schedule information 704, and may determine whether a same place is included therein. If the same place is determined, the recommendation server 1000 may determine whether times corresponding to the determined same place are similar to each other. If the times corresponding to the same place are similar to each other, the recommendation server 1000 may determine that the first user and the second user met each other in the determined same place on the time corresponding to the determined same place.

Referring to FIG. 7C, the recommendation server 1000 may generate a DB 700 about activities of the user, based on user identification information 710 and user's schedule information 720 received from the device 100.

The recommendation server 1000 may extract time information 422a from a date and time item 722 included in the user's schedule information 720. The recommendation server 1000 may analyze a content item 724 and may extract place information 742 from additional information 740. In this case, the recommendation server 1000 may also extract person information 745 from the content item 724.

When the place information 742 is extracted from the content item 724 included in the user's schedule information 720, the recommendation server 1000 may determine a latitude 424a and a longitude 426a which correspond to the extracted place 742. When the person information 745 is extracted from the content item 724 included in the user's schedule information 720, the recommendation server 1000 may determine person identification information 730 of a person who the user met, based on the person information 745.

Users' activity information 420a is generated based on the user's schedule information 720, the recommendation server 1000 may determine an activity performed together by the users, based on the users' activity information 420a.

For example, first user's activity information may include information about a time, a location, and executed content, and second user's activity information may only include information about a time and a location.

In this case, the recommendation server 1000 may compare time information and latitude and longitude information of the first user with time information and latitude and longitude information of the second user, and may determine a time when the first user and the second user met each other. When the time when the first user and the second user met each other is determined, the recommendation server 1000 may determine an activity performed together by the first user and the second user, based on information about content corresponding to the time when the first user and the second user met each other, wherein the information about content is from among the information about executed content which is included in the first user's activity information.

FIGS. 8A and 8B illustrate diagrams for describing a method of determining information about an activity performed together by users, based on a plurality of pieces of information about activities of the users, the method being performed by a recommendation server, according to an embodiment of the present disclosure.

Referring to FIG. 8A, the recommendation server 1000 may receive, from the device 100, content meta-information of content generated in the device 100.

The content may include, but is not limited to, a photo, music, a voice, a moving picture, an image, a document file, and a written memo.

The content meta-information of the content may include, but is not limited to, a generation time of the content, a generation location of the content, identification information of the content, a type of the content, storage position information of the content, user's identification information registered in a device where the content was generated, and identification information of an application to execute the content. The meta-information of the content may be included in a content file, as metadata of a content file.

The recommendation server 1000 may receive the content meta-information from each of the devices 100 of a user or may receive the content meta-information from at least one of third-party servers 2000a and 2000b storing the content meta-information.

The device 100 may periodically transmit the content meta-information to the recommendation server 1000. In addition, whenever content is generated, the device 100 may transmit content meta-information of the generated content to the recommendation server 1000.

Referring to FIG. 8B, the recommendation server 1000 may generate second user's activity information 830, based on content meta-information 820 of the second user, in correspondence to the ID of the second user.

For example, the recommendation server 1000 may determine time information 832, based on content generation time information from among the content meta-information. The recommendation server 1000 may determine a plurality of pieces of location information 834 and 836 with respect to the device 100 according to time, based on content generation location information from among the content meta-information. The recommendation server 1000 may determine a type of an application executed in the device 100, based on extension of the content or type information of the content. Accordingly, the recommendation server 1000 may generate information about a location of the device 100, information about an application executed in the device 100, and information about content generated in the device 100, which are with respect to a particular time and correspond to user's identification information 810.

The recommendation server 1000 may obtain additional information from the content meta-information. For example, the recommendation server 1000 may obtain content storage position information 837 from additional information 838. When the content is a photo, the recommendation server 1000 may obtain information 839 about at least one person in the photo from the additional information 838.

FIG. 9 illustrates a flowchart of a method of recommending content, based on an activity performed together by users who communicate with each other, the method being performed by a device, according to an embodiment of the present disclosure.

Referring to FIG. 9, in operation S910, the device 100 may receive a first user's input for selecting the second user from a list of users so as to communicate with the second user.

Content related to an operation of the first device 100a which was performed when the first user and the second user met each other may include at least one of a plurality of items of content which were executed or generated in the first device 100a when the first user and the second user met each other.

In operation S920, when the device 100 receives the first user's input for selecting the second user, the device 100 may request the recommendation server 1000 for a list of a plurality of items of content related to the operation of the first device 100a which was performed when the first user and the second user met each other.

The plurality of items of content related to the operation of the first device 100a which was performed when the first user and the second user met each other may be determined based on at least one of first user's activity information and second user's activity information.

The first user's activity information may include at least one of identification information of content executed in the first device 100a, identification information of an application that executed the content, information about a location where the content was executed, first user's schedule information, and meta-information of content generated in the first device 100a.

In operation S930, the device 100 may receive, from the recommendation server 1000, the list of the plurality of items of content related to the operation of the first device 100a which was performed when the first user and the second user met each other.

The device 100 may receive, from the recommendation server 1000, the identification information of the application to execute the content.

In operation S940, the device 100 may display the received list of the plurality of items of content.

The device 100 may display a list of a plurality of applications, in such a manner that the identification information of the application to execute the content may be displayed first in the list, wherein the content is related to the operation of the first device 100a which was performed when the first user and the second user met each other.

The device 100 may receive a first user's input for selecting, from the list of the plurality of applications, the application to execute the content related to the operation of the first device 100a which was performed when the first user and the second user met each other.

When the first user's input for selecting the application is received, the device 100 may display a list of a plurality of items of content executable by using the selected application, in such a manner that the identification information of the content related to the operation of the first device 100a which was performed when the first user and the second user met each other may be displayed first in the list.

The device 100 may receive a first user's input for requesting the content to be shared with the second user, and may request the recommendation server 1000 to share the content between the first user and the second user.

Figure 10B:
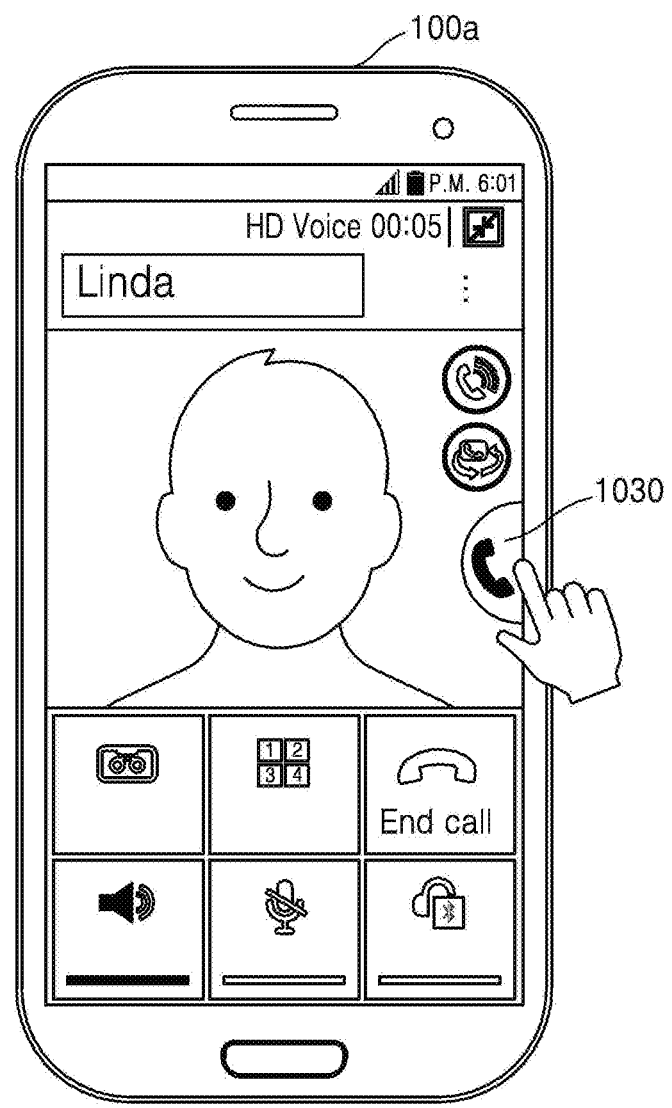
Figure 10C:
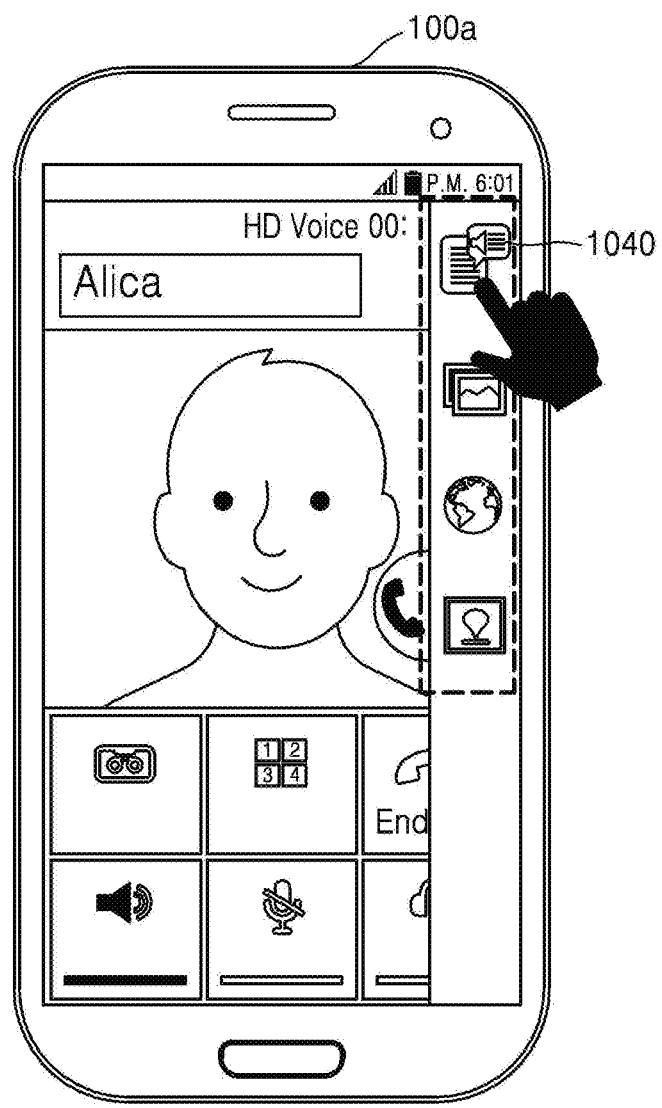

FIGS. 10A, 10B, and 10C illustrate diagrams for describing a method of recommending an application to be executed during communication, based on an activity performed together by users who communicate with each other, the method being performed by a device, according to an embodiment of the present disclosure.

Referring to FIG. 10A, when a call is connected between the first device 100a and the second device 100b, the first device 100a or the second device 100b may recommend an application, based on an activity performed together by the first user and the second user.

The device 100 may display a plurality of applications that are executable during the call. For example, the plurality of applications may include, but are not limited to, a photo viewer application 1012a, a web browser 1013a, a map viewer application 1014a, a translation application 1015a, and a music reproduction application 1016a.

When the first device 100a receives a first user's input for requesting a call with the second user, the first device 100a may request the recommendation server 1000 to recommend content that may be shared with the second user by the first user. In this case, the content recommendation request may include the ID of the first user and the ID of the second user which are registered in the recommendation server 1000.

When the content recommendation request is received from the first device 100*a*, the recommendation server 1000 may determine content related to an operation of the first device 100*a* which was performed when the first user and the second user met each other. As illustrated in FIG. 6A, the recommendation server 1000 may determine, based on the first user's activity information and the second user's activity information, the content related to the operation of the first device 100*a* which was performed when the first user and the second user met each other.

In a case where a photo was captured by the first device 100*a* when the first user and the second user met each other, the recommendation server 1000 may transmit information about a generated photo file to the first device 100*a*. The information about the photo file may include identification information of the photo file, meta-information of the photo file, and identification information of an application to render the photo file.

When the call is connected between the first device 100*a* and the second device 100*b*, the first device 100*a* may recommend the photo viewer application 1012*a*, based on the received photo file. For example, when the first device 100*a* displays a list of applications executable during the call, the first device 100*a* may recommend the photo viewer application 1012*a* by disposing the photo viewer application 1012*a* at the top of the list.

When the second device 100*b* receives a second user's input for requesting a start of the call requested by the first device 100*a*, the second device 100*b* may request the recommendation server 1000 to recommend content that may be shared with the first user by the second user.

In a case where music was reproduced by the second device 100*b* when the first user and the second user met each other, the recommendation server 1000 may transmit information about a reproduced music file to the second device 100*b*. The second device 100*b* may recommend a music reproduction application 1016*b*, based on the received information about the music file.

Referring to FIG. 10B, during the call, the first device 100*a* may display, on the screen, a button 1030 to display a list of applications to be executed during the call.

Referring to FIG. 10C, when the first device 100*a* receives a user input for selecting the button 1030 to display the list of applications to be executed during the call, the first device 100*a* may display the list of applications on the screen. In this case, the first device 100*a* may first display an application 1040 to execute content related to an activity that was performed together by the first user and the second user.

Figure 10D:
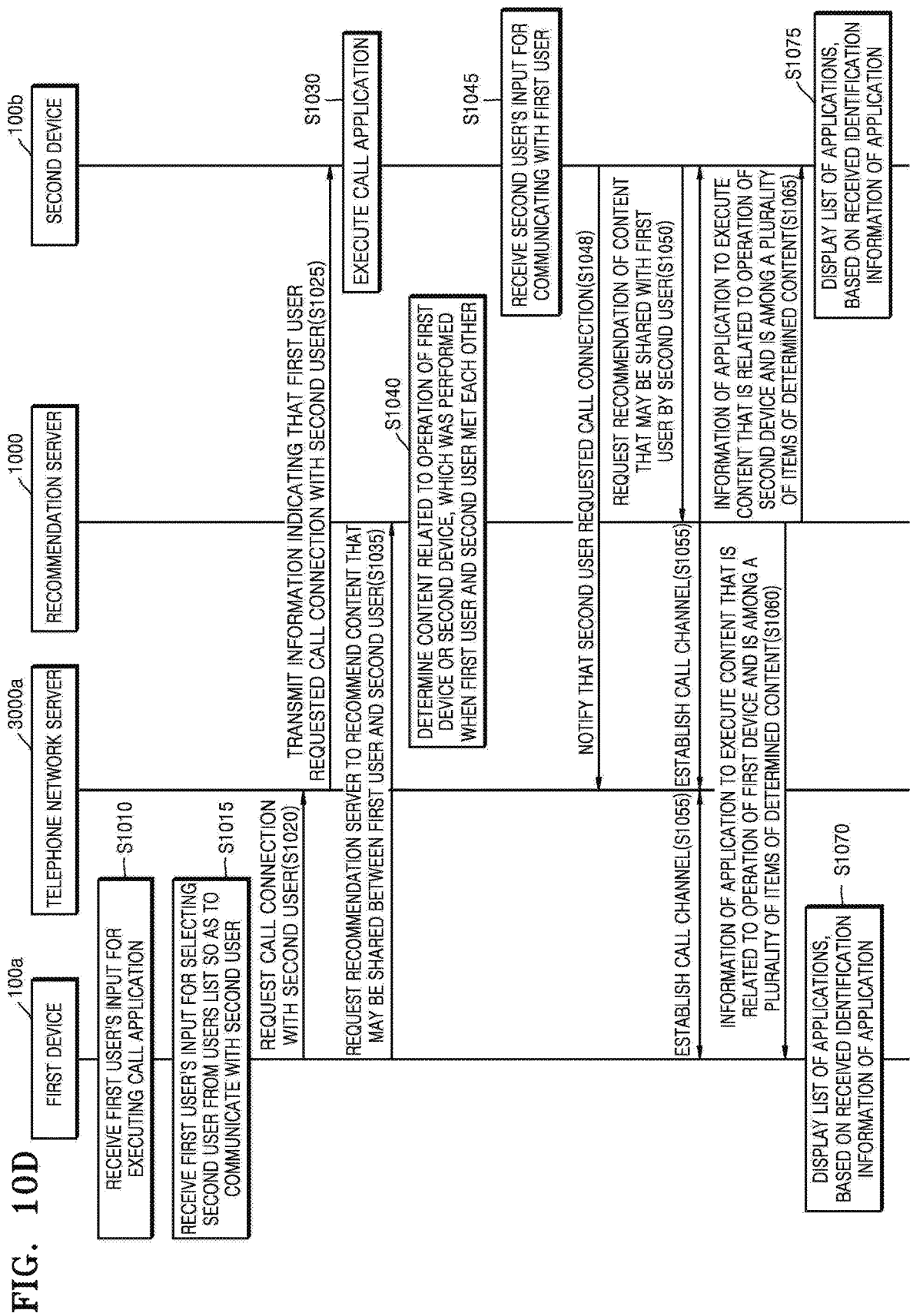
FIG. 10D illustrates a flowchart of a method of recommending an application to be executed during communication, based on an activity performed together by users who communicate with each other, the method being performed by a device, according to an embodiment of the present disclosure.

FIG. 10D illustrates a flowchart of a method of recommending an application to be executed during communication, based on an activity performed together by users who communicate with each other, the method being performed by a device, according to an embodiment of the present disclosure.

Referring to FIG. 10D, in operation S1010, the first device 100*a* may receive a first user's input for executing a call application.

For example, when the first user selects an icon of the call application displayed on a home screen, the first device 100*a* may execute the call application.

In operation S1015, the first device 100*a* may receive a first user's input for selecting the second user from a list of users so as to communicate with the second user.

For example, when the call application is executed, the first device 100*a* may display a list of users whose phone numbers are stored in the first device 100*a*. The first device 100*a* may receive a first user's input for selecting identification information of the second user from the displayed list of users.

In operation S1020, the first device 100*a* may request a telephone network server 3000*a* to connect a call with the second user.

When the first user's input for selecting the identification information of the second user is received, the first device 100*a* may notify the telephone network server 3000*a* that the first user requested a call connection with the second user. The telephone network server 3000*a* may indicate a server that manages an IP multimedia subsystem (IMS) network and receives a user input from the device 100.

In this case, the first device 100*a* may transmit, to the telephone network server 3000*a*, a first user's phone number as a caller's number, and a second user's phone number as a receiver's number.

In operation S1025, the telephone network server 3000*a* may transmit, to the second device 100*b*, information indicating that the first user requested the call connection with the second user.

The telephone network server 3000*a* may obtain, based on the receiver's number received from the first device 100*a*, identification information of the second device 100*b* that is a device of the second user which is registered in the telephone network server 3000*a*. When the identification information of the second device 100*b* is obtained, the telephone network server 3000*a* may transmit, to the second device 100*b*, the first user's phone number as the caller's number.

In operation S1030, the second device 100*b* may execute a call application.

When the call request is received from the telephone network server 3000*a*, the second device 100*b* may execute the call application. When the call application is executed, the second device 100*b* may display the caller's number on the screen.

In operation S1035, the first device 100*a* may request the recommendation server 1000 to recommend content that may be shared between the first user and the second user.

The first device 100*a* may request the recommendation server 1000 to recommend content that may be shared with the second user by the first user. In this case, the first device 100*a* may transmit, to the recommendation server 1000, both identification information of the first user and identification information of the second user which are registered in the recommendation server 1000. The identification information of the first user and the second user may include phone numbers of the first and second users.

In operation S1040, the recommendation server 1000 may determine content related to an operation performed by the first device 100*a* or the second device 100*b*, which was performed when the first user and the second user met each other.

Content related to an operation of the device 100 may include at least one of content that was executed in the first device 100*a* or the second device 100*b* and content that was generated in the first device 100*a* or the second device 100*b*, wherein the execution and the generation were performed when the first user and the second user met each other.

When the recommendation server 1000 receives, from the first device 100*a*, a request for recommending the content that may be shared between the first user and the second user, the recommendation server 1000 may determine a time when the first user and the second user met each other.

For example, the recommendation server 1000 may store first user's activity information and second user's activity information. User's activity information may mean location information of the device 100 according to time. The user's activity information may also include information about content that was executed or generated in the device 100.

As illustrated in FIGS. 4A, 4B, 4C, 4D, 5, 6A, 6B, 7A, 7B, 7C, 8A, and 8B, the location information of the device 100 according to time may be directly received from the device 100, or may be obtained from user's schedule information or meta-information of a file generated in the device 100. Information about content that was executed or generated at a particular time by the device 100 may be directly received from the device 100, or may be obtained from meta-information of a content file generated in the device 100.

The recommendation server 1000 may determine the time when the first user and the second user met each other, based on the first user's activity information and the second user's activity information. When the recommendation server 1000 determines the time when the first user and the second user met each other, the recommendation server 1000 may determine content that was executed or generated at the determined time by the first device 100a or the second device 100b.

In operation S1045, the second device 100b may receive a second user's input for communicating with the first user.

When the second device 100b executes a call application, the second device 100b may display a button for the call with the first user on the screen. The second device 100b may receive a second user's input for selecting the button for the call with the first user.

In operation S1048, the second device 100b may notify the telephone network server 3000a that the second user requested a call connection.

In operation S1050, the second device 100b may request the recommendation server 1000 to recommend content that may be shared with the first user by the second user.

When the second user's input for selecting the button for the call with the first user is received, the second device 100b may request the recommendation server 1000 to recommend the content that may be shared with the first user by the second user.

In operation S1055, the telephone network server 3000a may establish a call channel between the first device 100a and the second device 100b.

In operation S1060, the recommendation server 1000 may transmit, to the first device 100a, identification information of an application to execute content related to an operation of the first device 100a which was performed when the first user and the second user met each other, wherein the content is among a plurality of items of determined content.

In response to the content recommendation request by the first device 100a, the recommendation server 1000 may transmit, to the first device 100a, the identification information of the application to execute the content related to the operation of the first device 100a which was performed when the first user and the second user met each other, wherein the content is among the plurality of items of determined content.

In operation S1065, the recommendation server 1000 may transmit, to the second device 100b, identification information of an application to execute content related to an operation of the second device 100b which was performed when the first user and the second user met each other, wherein the content is among a plurality of items of determined content.

In response to the content recommendation request by the second device 100b, the recommendation server 1000 may transmit, to the second device 100b, the identification information of the application to execute the content related to the operation of the second device 100b which was performed when the first user and the second user met each other, wherein the content is among the plurality of items of determined content.

In operation S1070, the first device 100a may display a list of applications, based on the received identification information of the application.

For example, the first device 100a may display the list of applications, in such a manner that the application corresponding to the received identification information may be first disposed, wherein the application is from among the applications that are executable during the call.

In operation S1075, the second device 100b may display a list of applications, based on the received identification information of the application.

Figure 11A:
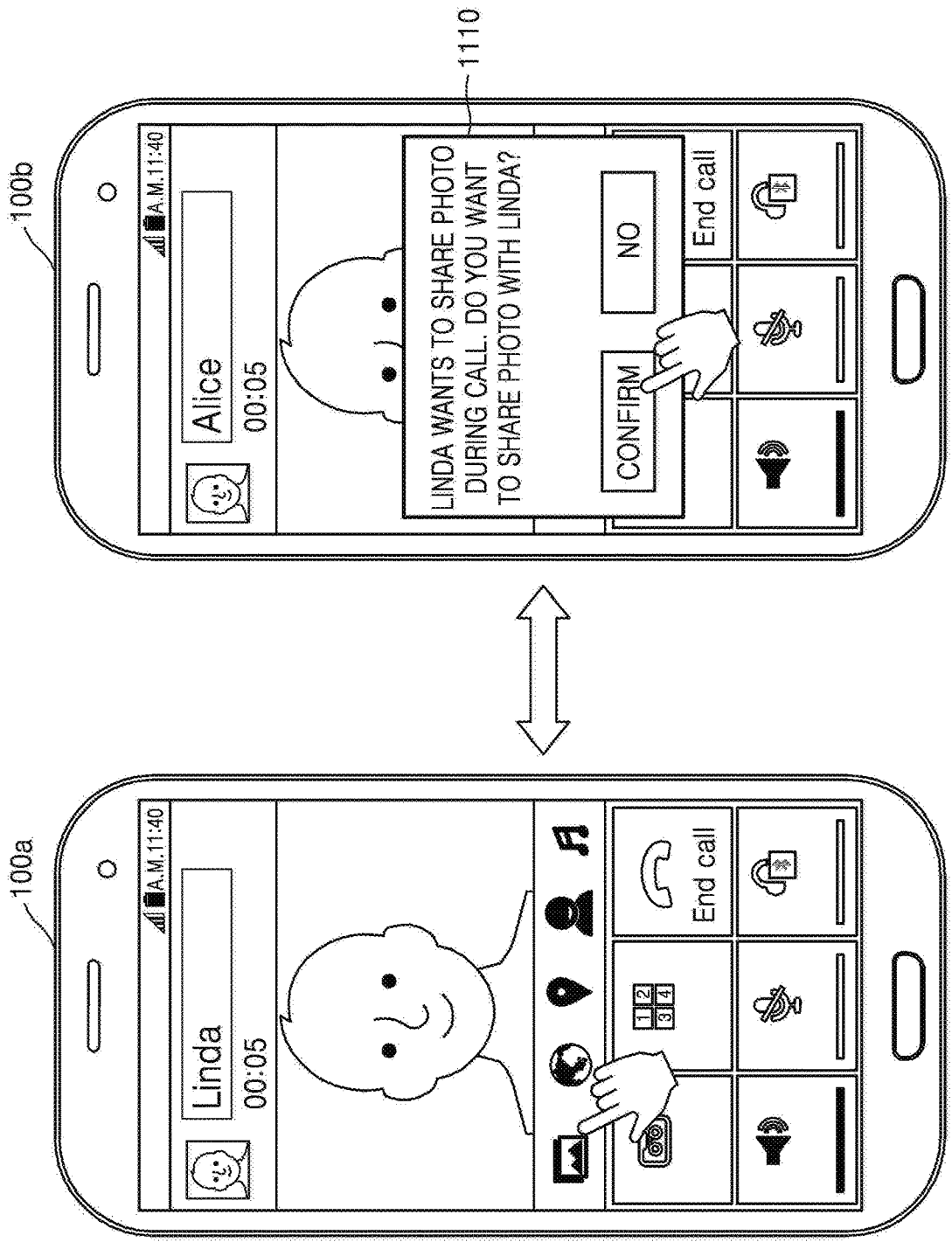
FIGS. 11A and 11B illustrate diagrams for describing a method of recommending content, based on an activity performed together by users who communicate with each other, the method being performed by a device, according to an embodiment of the present disclosure.
Figure 11B:
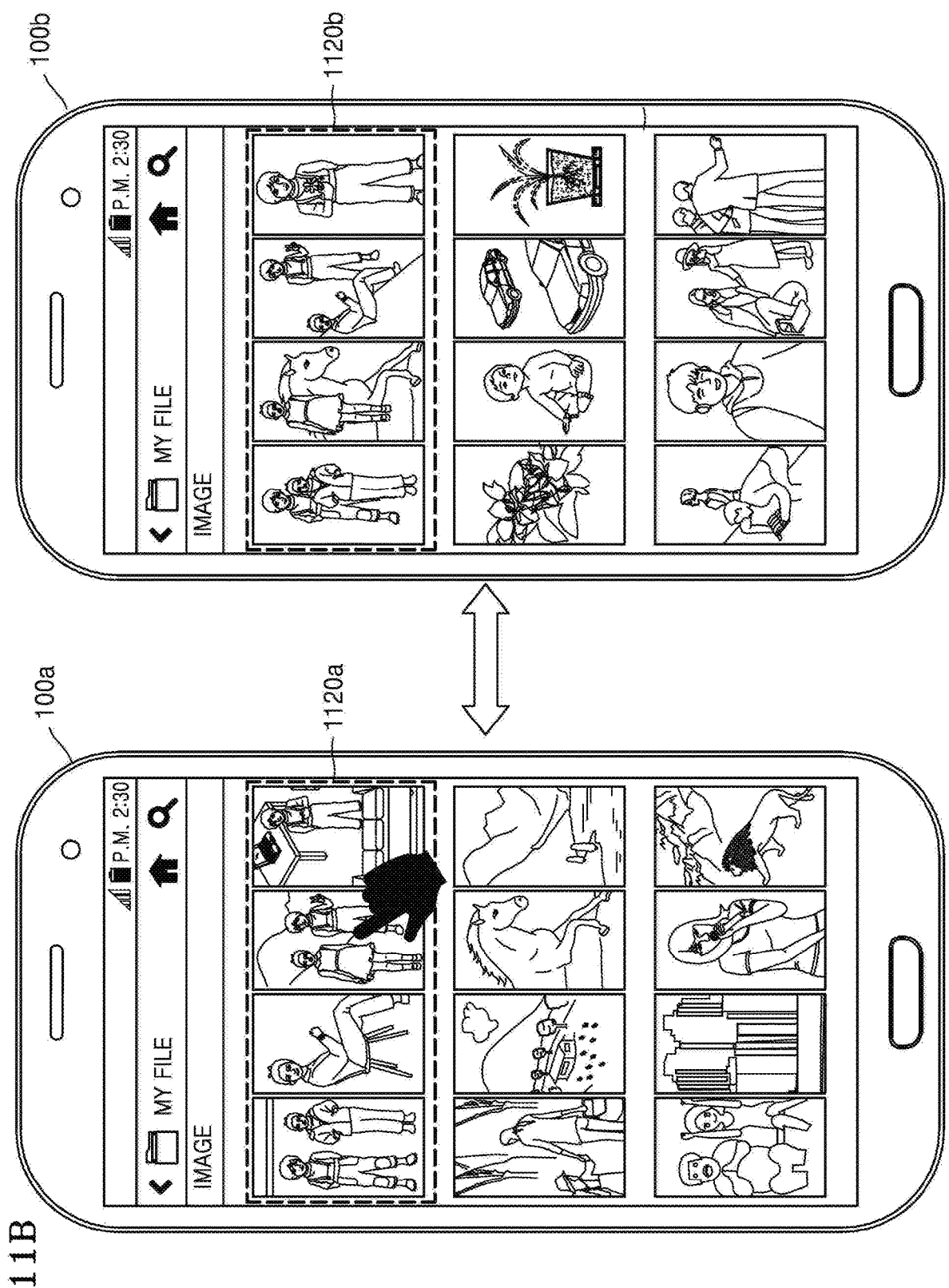

FIGS. 11A and 11B illustrate diagrams for describing a method of recommending content, based on an activity performed together by users who communicate with each other, the method being performed by a device, according to an embodiment of the present disclosure.

Referring to FIG. 11A, when a content sharing request by the first user is received, the second device 100b may display a selection window 1110 so as to select whether to share content.

For example, when the first user and the second user communicate with each other, when the first device 100a receives a first user's input for selecting a photo viewer application from a list of applications displayed on the screen, the first device 100a may transmit, to the recommendation server 1000, information indicating that the first user attempts to share a photo with the second user.

When the recommendation server 1000 receives, from the first device 100a, a photo share request by the first user, the recommendation server 1000 may request the second device 100b to determine whether the second user wants to share the photo with the first user.

When a determination request with respect to sharing the photo is received, the second device 100b may display the selection window 1110 for selecting whether to accept the photo share request by the first user, wherein the selection window 1110 includes information indicating that the first user sent the photo share request to the second user.

Referring to FIG. 11B, when a second user's input for accepting the photo share request by the first user is received, each of the first device 100a and the second device 100b may display a list of photos stored therein. In this case, the first device 100a and the second device 100b may recommend a photo to a user, based on an activity performed together by the first user and the second user.

For example, when the second user's input for accepting the photo share request by the first user is received, the second device 100b may transmit, to the recommendation server 1000, information indicating that the second user accepted the photo share request by the first user.

When the acceptance confirmation by the second user is received, the recommendation server 1000 may transmit, to the first device 100a, identification information and meta-information of one or more photos generated in the first device 100a when the first user and the second user met each other, and may transmit, to the second device 100b, identification information and meta-information of one or more photos generated in the second device 100b when the first user and the second user met each other.

When the identification information of the recommended photos is received from the recommendation server 1000, each of the first device 100a and the second device 100b may display a list of the photos, based on the received identification information of the photos.

For example, the first device 100a may display thumbnails of photos stored in the first device 100a, in such a manner that thumbnails 1120a of the photos corresponding to the identification information received from the recommendation server 1000 may be displayed on a top of the screen.

The second device 100b may display thumbnails of photos stored in the second device 100b, in such a manner that thumbnails 1120b of the photos corresponding to the identification information received from the recommendation server 1000 may be displayed on a top of the screen.

In this case, the device 100 may differently display a thumbnail of a photo from thumbnails of other photos, wherein the photo corresponds to identification information received from the recommendation server 1000. For example, the first device 100a may display identification information of the second user on a thumbnail of a photo that corresponds to identification information received from the recommendation server 1000.

The device 100 may display thumbnails of photos in an order of generation time of the photos, based on meta-information of each of the photos.

Figure 11C:
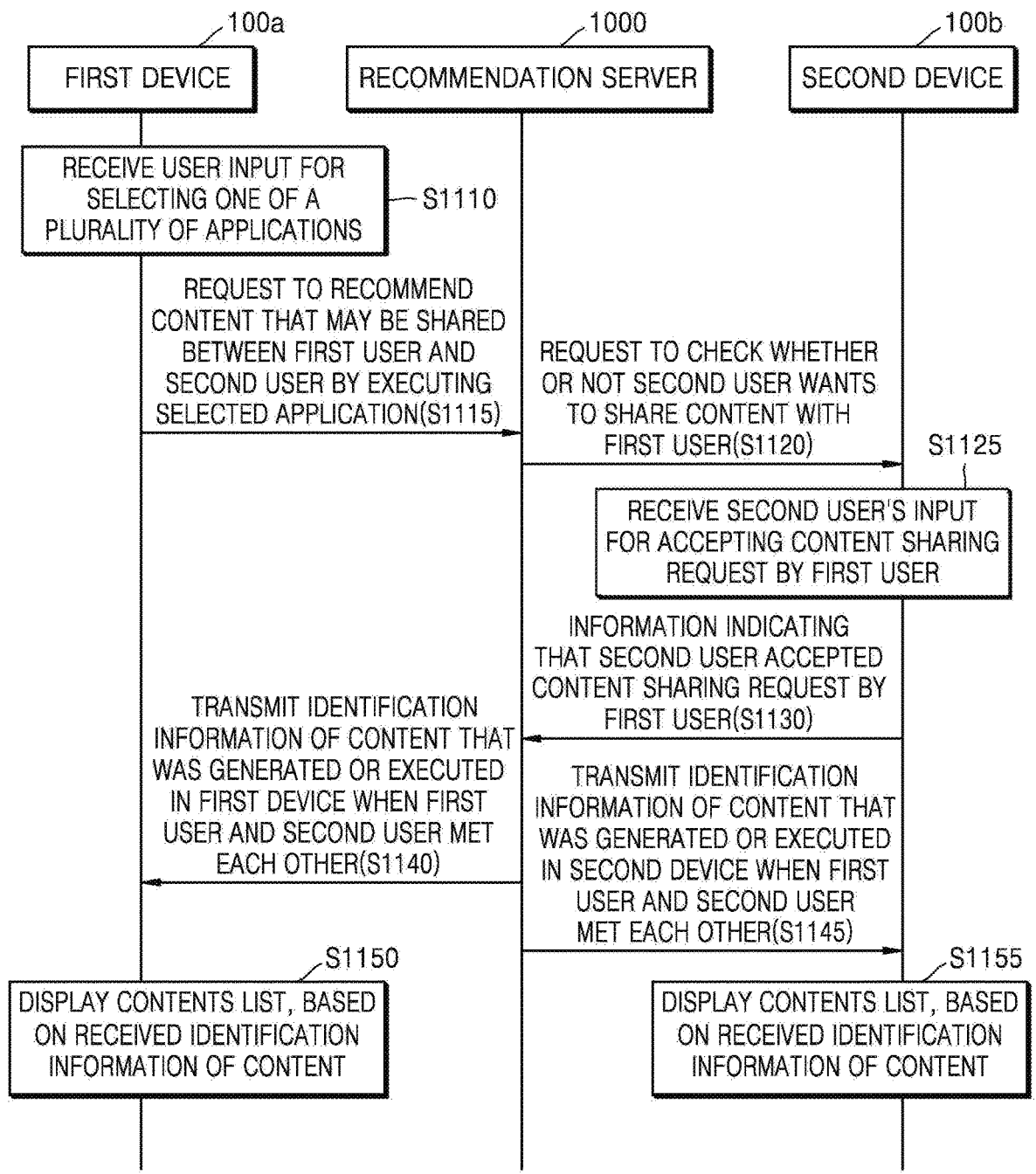
FIG. 11C illustrates a flowchart of a method of recommending content, based on an activity performed together by users who communicate with each other, the method being performed by a device, according to an embodiment of the present disclosure.

FIG. 11C illustrates a flowchart of a method of recommending content, based on an activity performed together by users who communicate with each other, the method being performed by a device, according to an embodiment of the present disclosure.

Referring to FIG. 11C, in operation S1110, the first device 100a may receive a user input for selecting one of a plurality of applications that are executable during a call.

The plurality of applications may include, but are not limited to, a photo viewer application, a web browser, a map viewer application, a translation application, and a music reproduction application.

In operation S1115, the first device 100a may request the recommendation server 1000 to recommend content that may be shared between the first user and the second user by executing the selected application.

The first device 100a may transmit, to the recommendation server 1000, the content recommendation request, identification information of the selected application, and the ID of the first user and the ID of the second user which are registered in the recommendation server 1000.

In operation S1120, the recommendation server 1000 may request the second device 100b to determine whether the second user wants to share content with the first user.

The recommendation server 1000 may transmit, to the second device 100b, the content sharing determination request, the ID of the first user, and a type of the content to be shared.

In an embodiment of the present disclosure, if a closeness of the relationship between the first user and the second user is equal to or greater than a reference, an operation of determining whether the second user wants to share the content with the first user may be skipped.

In operation S1125, the second device 100b may receive a second user's input for accepting the content sharing request by the first user.

When the content share determination request is received from the recommendation server 1000, the second device 100b may display, based on the ID of the first user and the type of the content to be shared, a selection window including information indicating that the first user attempts to share the content with the second user and for selecting whether to accept the content sharing request by the first user.

The second device 100b may receive, via the selection window, a second user's input for accepting the content sharing request by the first user.

In operation S1130, the second device 100b may transmit, to the recommendation server 1000, information indicating that the second user accepted the content sharing request by the first user.

When the second user's input for accepting the content sharing request by the first user is received, the second device 100b may transmit, to the recommendation server 1000, the information indicating that the second user accepted the content sharing request by the first user.

In operation S1140, the recommendation server 1000 may transmit, to the first device 100a, identification information of content that was generated or executed in the first device 100a when the first user and the second user met each other.

In response to the content recommendation request received from the first device 100a, the recommendation server 1000 may transmit, to the first device 100a, the identification information of the content that was generated or executed in the first device 100a when the first user and the second user met each other.

In operation S1145, the recommendation server 1000 may transmit, to the second device 100b, identification information of content that was generated or executed in the second device 100b when the first user and the second user met each other.

In response to the acceptance confirmation received from the second device 100b, the recommendation server 1000 may transmit, to the first device 100a, the identification information of the content that was generated or executed in the second device 100b when the first user and the second user met each other.

In operation S1150, the first device 100a may display a contents list, based on the received identification information of the content.

In operation S1155, the second device 100b may display a contents list, based on the received identification information of the content.

Figure 12A:
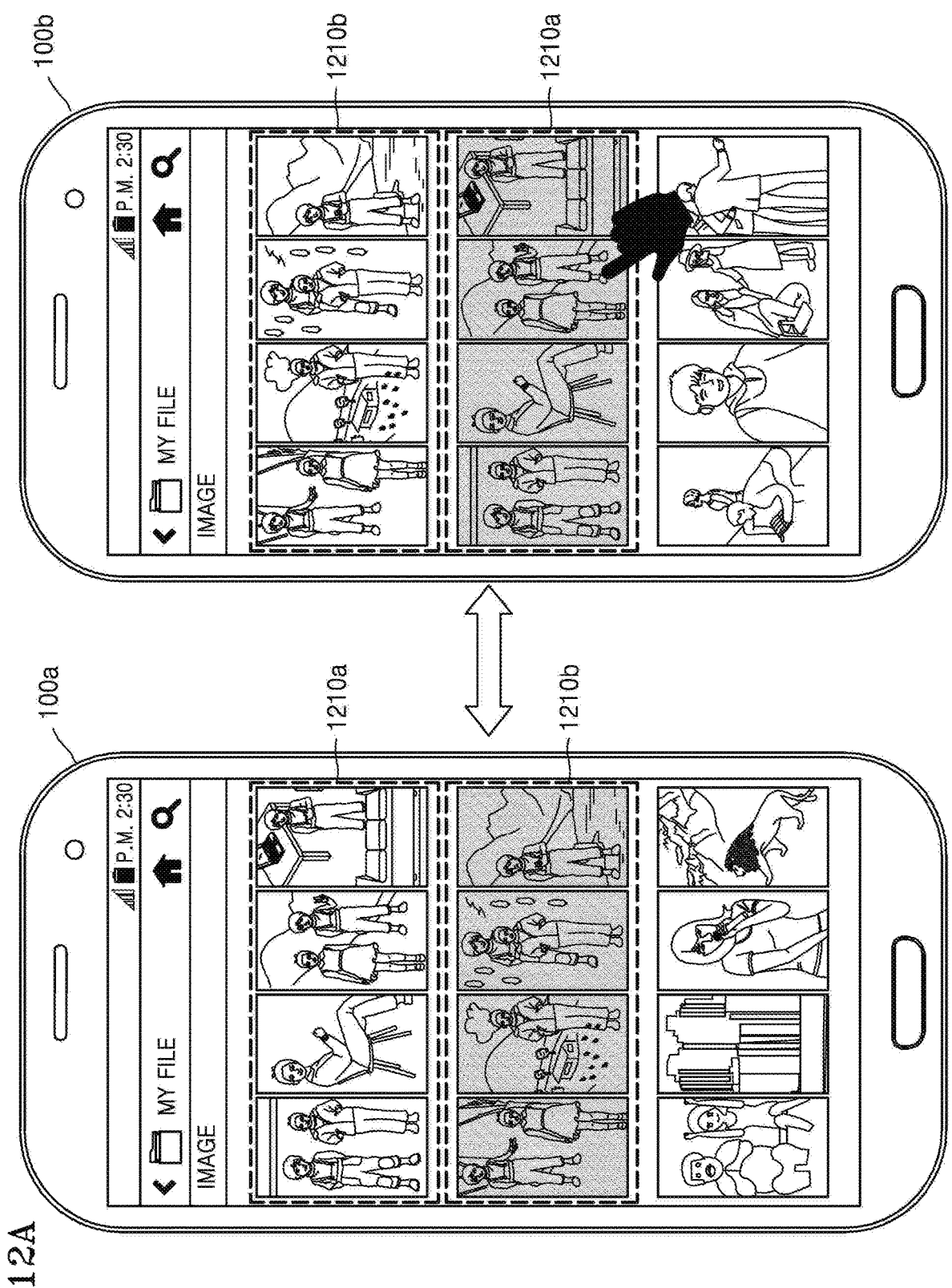
FIG. 12A illustrates diagrams for describing a method of recommending content, based on an activity performed together by users who communicate with each other, the method being performed by the a, according to an embodiment of the present disclosure.

FIG. 12A illustrates diagrams for describing a method of recommending content, based on an activity performed together by users who communicate with each other, the method being performed by a device, according to an embodiment of the present disclosure.

Referring to FIG. 12A, during a call, the device 100 may provide not only photos stored in the device 100 but may also provide photos stored in the device 100 of the other party.

The recommendation server 1000 may transmit, to the first device 100a and the second device 100b, a plurality of pieces of identification information and meta-information of all photos that were generated in the first device 100a or the second device 100b when the first user and the second user met each other.

Since identification information and meta-information of a photo file executed or generated in the device 100 of the other party during a call are received from the recommendation server 1000, the first device 100a or the second device 100b may display not only a list of autonomously generated photos but may also display a list of photo files generated in the device 100 of the other party.

For example, the first device 100*a* may first display, based on the plurality of pieces of identification information of the photos received from the recommendation server 1000, a list of photos 1210*a* stored in the first device 100*a*, and may display a list of photos 1210*b*, which are stored in the second device 100*b*, after the list of photos 1210*a* stored in the first device 100*a*.

In this case, even if photo files are not stored in the first device 100*a*, the first device 100*a* may display a list of the photo files that are not stored in the first device 100*a*, based on thumbnail information including meta-information received from the recommendation server 1000.

The first device 100*a* may differently display the list of photos 1210*a* stored in the first device 100*a* from the list of photos 1210*b* stored in the second device 100*b*. For example, the first device 100*a* may allow thumbnails of files, which are stored in the second device 100*b*, to be further shadily displayed than thumbnails of files stored in the first device 100*a*.

Figure 12B:
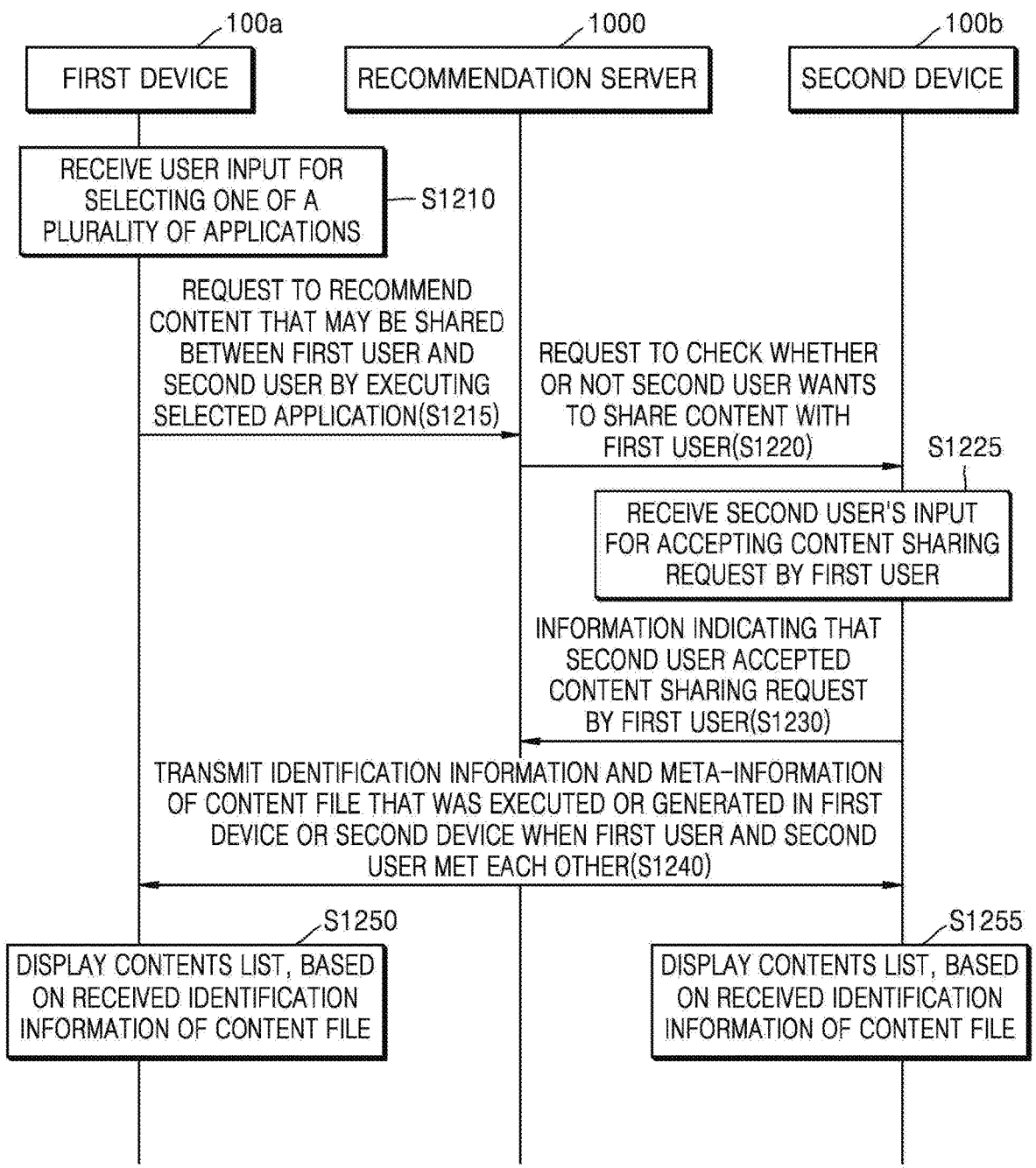
FIG. 12B illustrates a flowchart of a method of recommending content, based on an activity performed together by users who communicate with each other, the method being performed by a device, according to an embodiment of the present disclosure.

FIG. 12B illustrates a flowchart of a method of recommending content, based on an activity performed together by users who communicate with each other, the method being performed by a device, according to an embodiment of the present disclosure.

Referring to FIG. 12B, in operation S1210, the first device 100*a* may receive a user input for selecting one of a plurality of applications that are executable during a call.

In operation S1215, the first device 100*a* may request the recommendation server 1000 to recommend content that may be shared between the first user and the second user by executing the selected application.

In operation S1220, the recommendation server 1000 may request the second device 100*b* to determine whether the second user wants to share content with the first user.

In operation S1225, the second device 100*b* may receive a second user's input for accepting the content sharing request by the first user.

In operation S1230, the second device 100*b* may transmit, to the recommendation server 1000, information indicating that the second user accepted the content sharing request by the first user. The operations S1210 through S1230 may be described with reference to the operations S1110 through S1130 of FIG. 11C.

In operation S1240, the recommendation server 1000 may transmit, to the first device 100*a* and the second device 100*b*, identification information and meta-information of a content file that was executed or generated in the first device 100*a* or the second device 100*b* when the first user and the second user met each other.

In operation S1250, the first device 100*a* may display a contents list, based on the received identification information of the content file.

In operation S1255, the second device 100*b* may display a contents list, based on the received identification information of the content file.

FIG. 13A illustrates diagrams for describing a method of sharing content between users who communicate with each other, the method being performed by a device, according to an embodiment of the present disclosure.

Referring to FIG. 13A, when the first device 100*a* receives, during a call, a first user's input for selecting content 1310 from a contents list displayed on the screen, the first device 100*a* and the second device 100*b* may co-display the content 1310 selected by the first user.

For example, the first device 100*a* may request the recommendation server 1000 to provide, to the second device 100*b*, the content 1310 selected by the first user. In this case, the first device 100*a* may transmit the content 1310 selected by the first user to the recommendation server 1000.

When the content sharing request is received, the recommendation server 1000 may transmit, to the second device 100*b*, information indicating that content has been provided from the first user. In this case, the recommendation server 1000 may transmit, to the second device 100*b*, the content 1310 received from the second device 100*b*.

When the information indicating that the content has been provided from the first user is received, the second device 100*b* may display, on the screen, the content 1310 received from the recommendation server 1000. The second device 100*b* may provide a user interface for storing the displayed content 1310 in the second device 100*b*.

In an embodiment of the present disclosure, when a second user's input for selecting content from a contents list displayed on the second device 100*b* is received, the second device 100*b* may request the recommendation server 1000 to provide the first device 100*a* with the content selected by the second user.

Accordingly, the first user and the second user may share content stored in the first device 100*a* or the second device 100*b*.

Figure 13B:
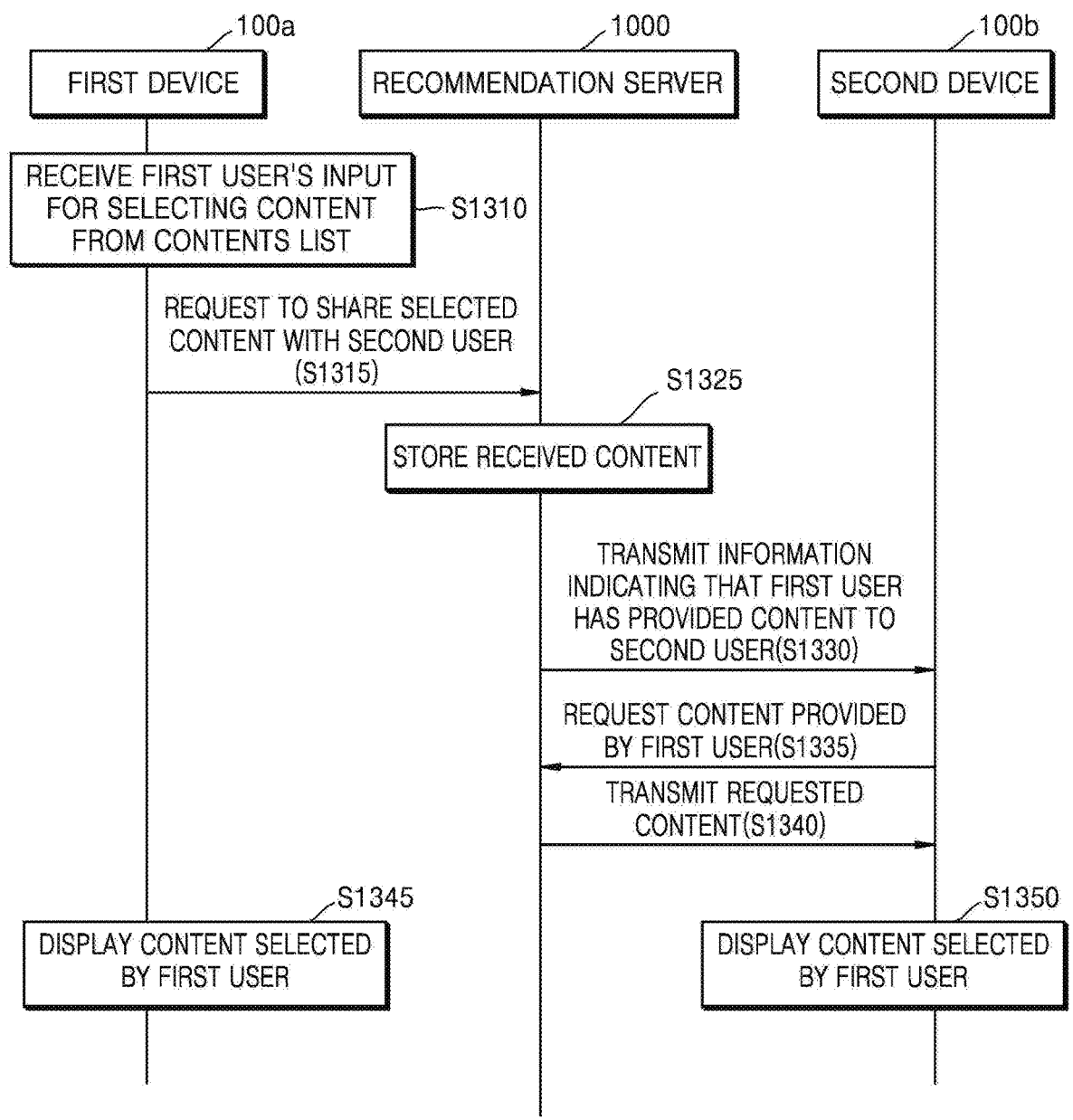
FIG. 13B illustrates a flowchart of a method of sharing content between users who communicate with each other, the method being performed by a device, according to an embodiment of the present disclosure.

FIG. 13B illustrates a flowchart of a method of sharing content between users who communicate with each other, the method being performed by a device, according to an embodiment of the present disclosure.

Referring to FIG. 13B, in operation S1310, the first device 100*a* may receive a first user's input for selecting content from a contents list.

The first device 100*a* may receive, during a call, the first user's input for selecting the content from the contents list displayed on the screen.

In operation S1315, the first device 100*a* may request the recommendation server 1000 to share the selected content with the second user.

In this case, the first device 100*a* may transmit identification information of the selected content, a file of the selected content, and the ID of the first user and the ID of the second user which are registered in the recommendation server 1000.

In operation S1325, the recommendation server 1000 may store the received content.

In operation S1330, the recommendation server 1000 may transmit information indicating that the first user has provided the content to the second user.

In this case, the recommendation server 1000 may transmit, to the second device 100*b*, the ID of the first user, the identification information of the content selected by the first user, metadata of the content, and link information for downloading the content.

In operation S1335, the second device 100*b* may request the recommendation server 1000 for the content provided by the first user.

The second device 100*b* may request the content provided by the first user, based on the received link information.

In operation S1340, the recommendation server 1000 may transmit the requested content to the second device 100*b*.

In an embodiment of the present disclosure, the recommendation server 1000 may not perform the operations S1330 and S1335 but may directly transmit the content selected by the first user to the second device 100*b*.

In operation S1345, the first device 100*a* may display the content selected by the first user.

In operation S1350, the second device 100b may display the content selected by the first user.

Figure 14:
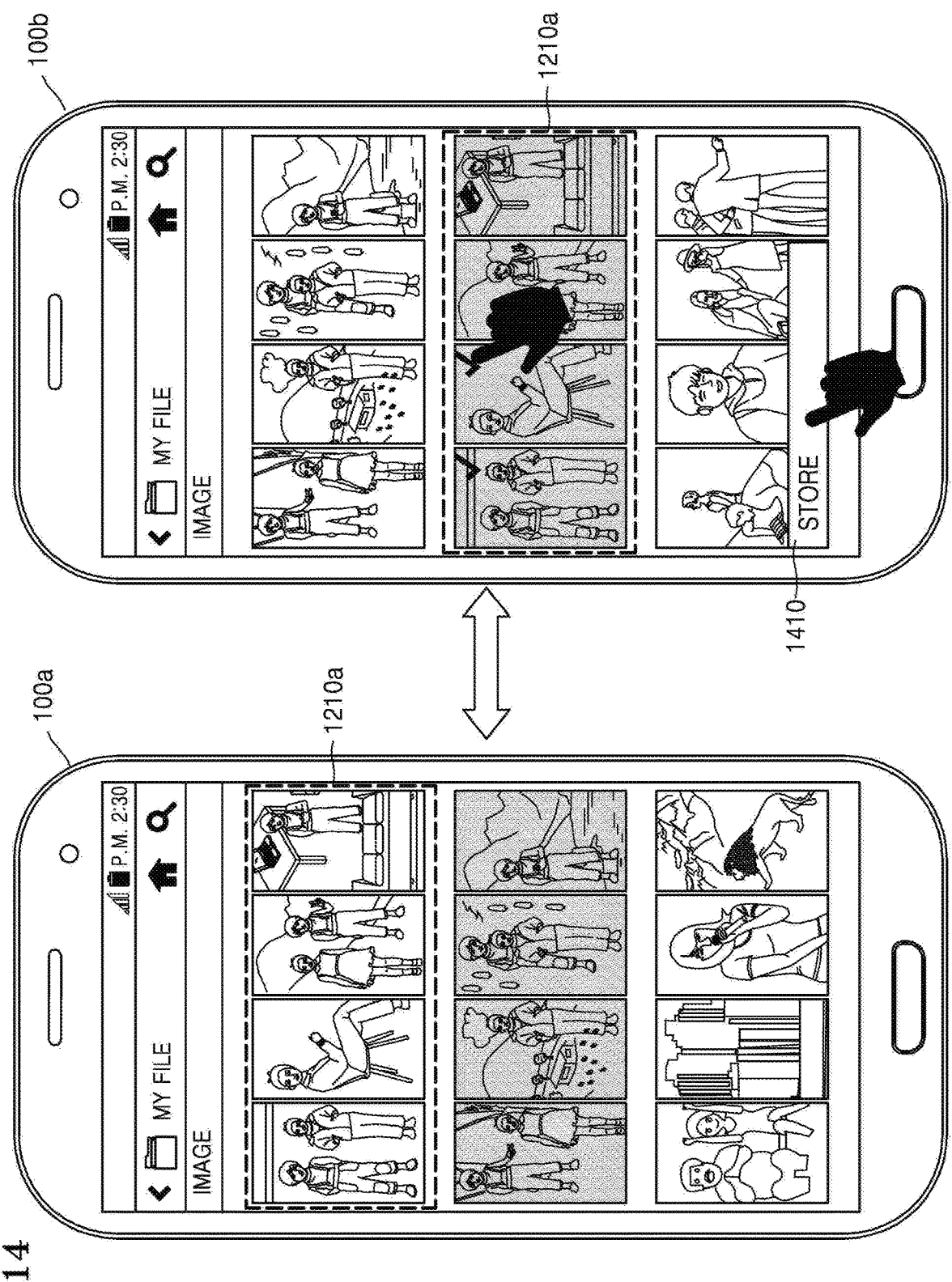
FIG. 14 illustrates a flowchart of a method of sharing content between users who communicate with each other, the method being performed by a device, according to an embodiment of the present disclosure.

FIG. 14 illustrates a flowchart of a method of sharing content between users who communicate with each other, the method being performed by a device, according to an embodiment of the present disclosure.

Referring to FIG. 14, the device 100 may select at least one item of content from a contents list, and may provide a store button 1410 to store the selected content.

For example, when content that is stored only in the first device 100a is selected from a contents list displayed on the screen of the second device 100b, if a pre-decided user input is received, the second device 100b may display the store button 1410 to store the selected content.

When a second user's input for selecting the store button 1410 to store the selected content is received, the second device 100b may request the recommendation server 1000 for the selected content.

When a content transmission request is received from the second device 100b, the recommendation server 1000 may request the first device 100a to transmit the content selected by the second user and may receive, from the first device 100a, the content selected by the second user. In response to the content transmission request by the second device 100b, the recommendation server 1000 may transmit the requested content to the second device 100b.

Figure 15A:
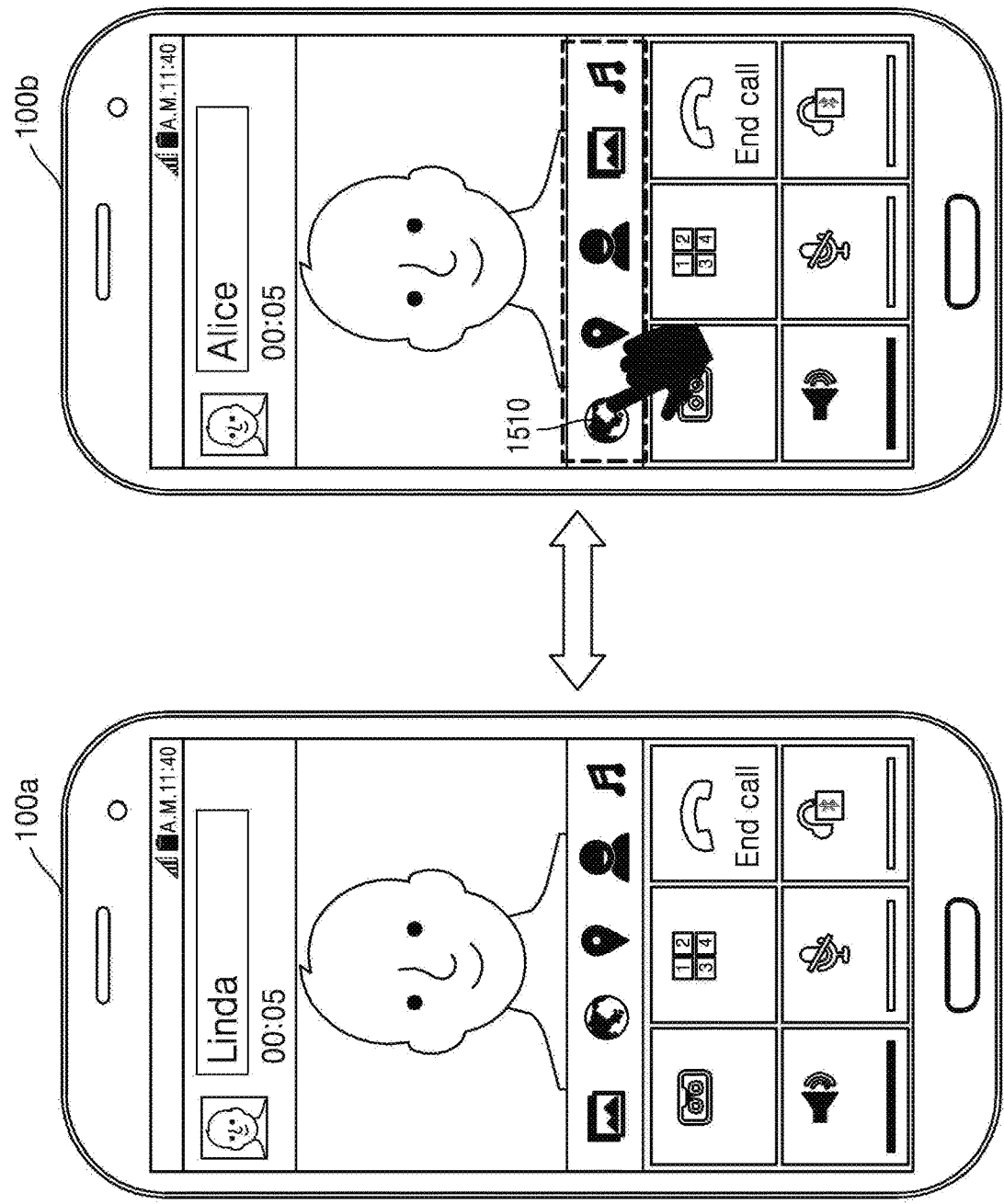
FIGS. 15A, 15B, and 15C illustrate diagrams for describing a method of recommending a webpage, based on an activity performed together by users who communicate with each other, the method being performed by a device, according to an embodiment of the present disclosure.
Figure 15B:
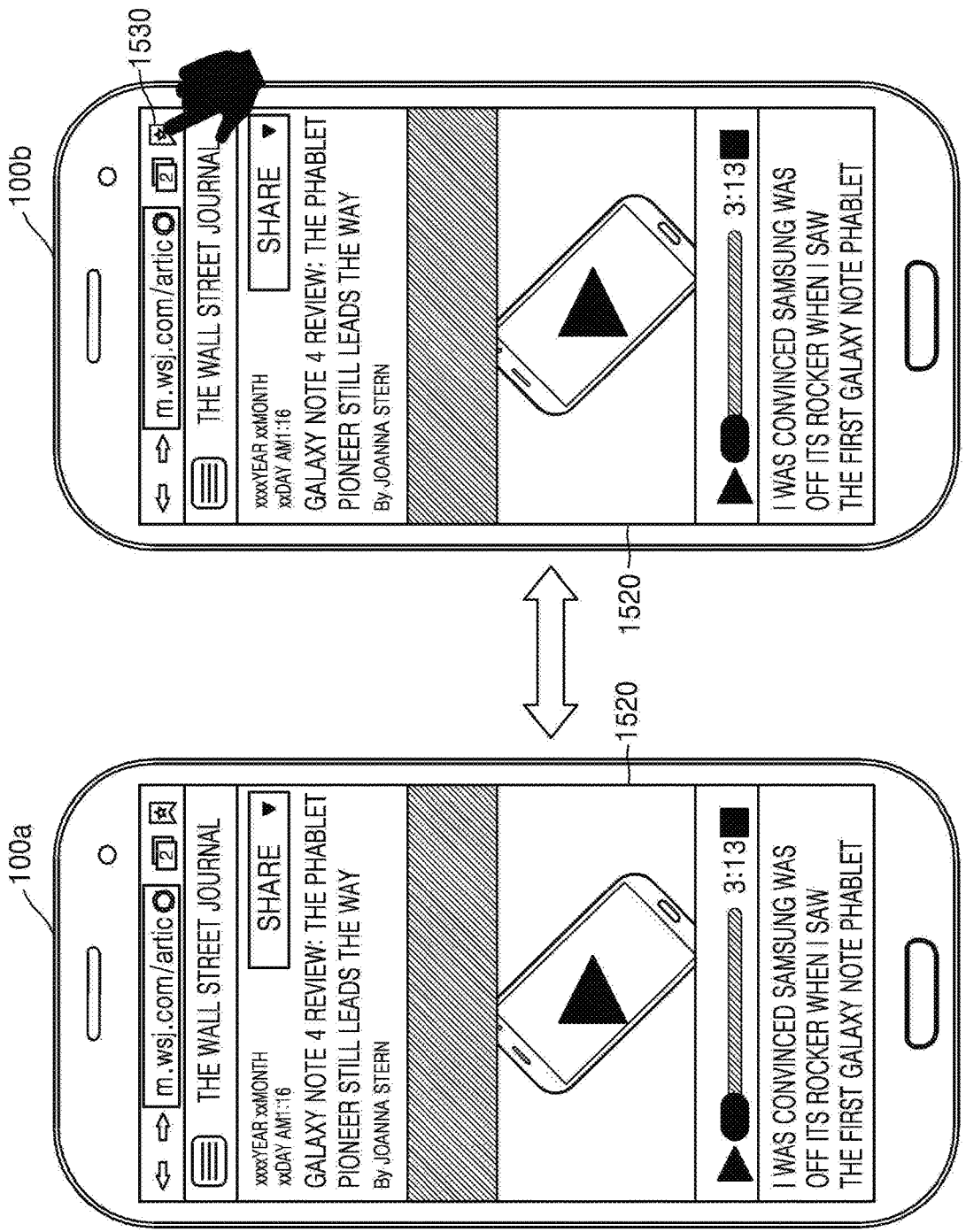
Figure 15C:
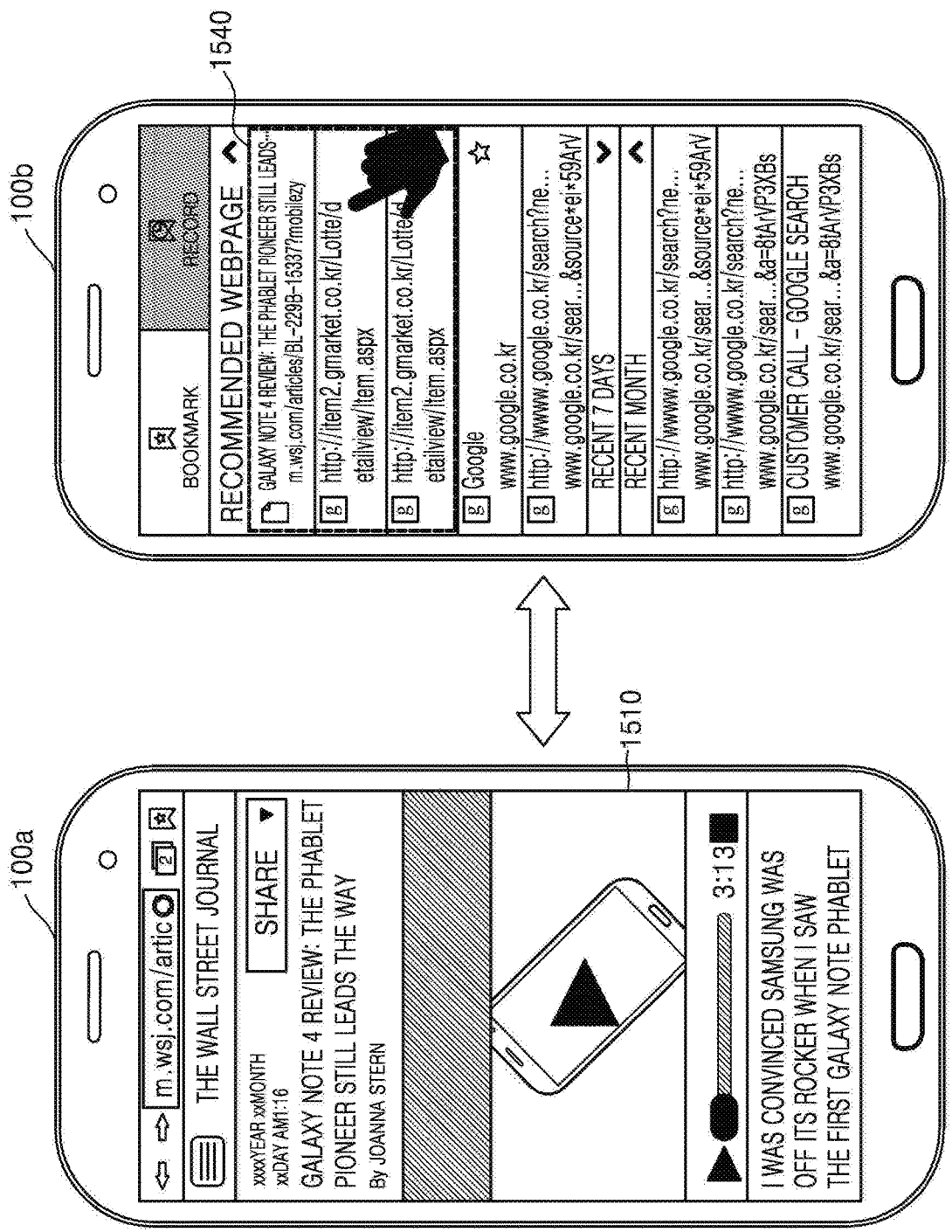

FIGS. 15A, 15B, and 15C illustrate diagrams for describing a method of recommending a webpage, based on an activity performed together by users who communicate with each other, the method being performed by a device, according to an embodiment of the present disclosure.

Referring to FIG. 15A, when a web browser was executed in the second device 100b when the first user and the second user met each other, the second device 100b may recommend, during a call between the first user and the second user, a web browser 1510 among a plurality of applications.

Referring to FIG. 15B, when the second device 100b receives a second user's input for selecting the web browser 1510, the second device 100b may request the recommendation server 1000 to provide the first device 100a and the second device 100b with link information of a webpage that might have been searched for together by the first user and the second user when they met each other.

The recommendation server 1000 may transmit, to the first device 100a and the second device 100b, link information of a webpage 1520 that was recently rendered and displayed on the screen by the first device 100a or the second device 100b when the first user and the second user met each other.

When the link information of the webpage 1520 is received from the recommendation server 1000, the first device 100a and the second device 100b may execute the web browser 1510, based on the received link information.

Accordingly, the first device 100a and the second device 100b may share the webpage 1520 that might have been searched for together by the first user and the second user when they met each other.

Referring to FIG. 15C, the device 100 may provide, during a call between the first user and the second user, a user with a list 1540 of webpages that were executed in the first device 100a or the second device 100b when the first user and the second user met each other.

For example, referring to FIG. 15B, when the second device 100b receives a user input for selecting a button 1530 to display a list of webpages that were executed in the second device 100b, the second device 100b may display the list 1540 of the webpages executed in the second device 100b, according to a temporal order with respect to the webpages or according to the number of times the webpages were accessed.

Figure 16A:
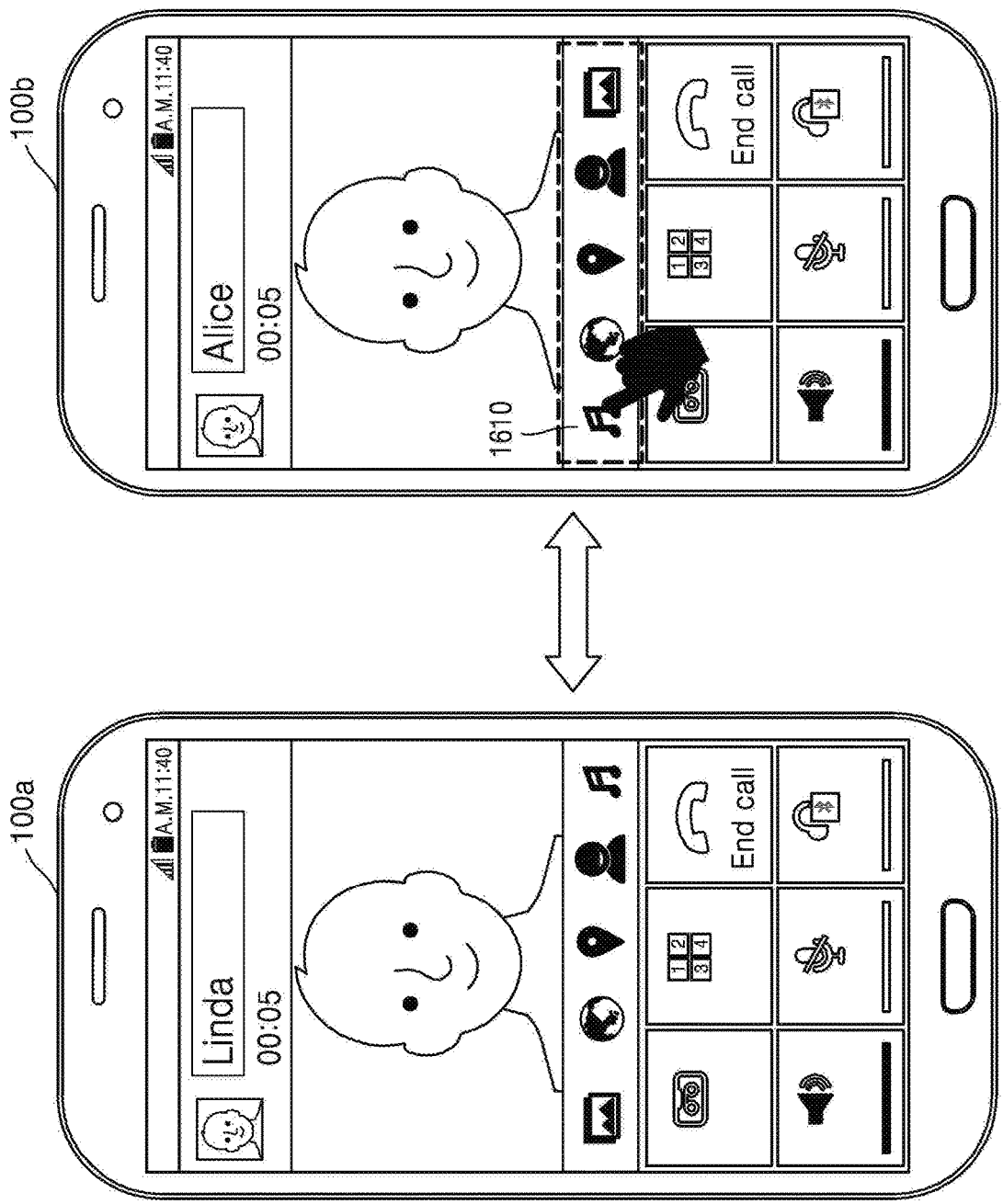
FIGS. 16A and 16B illustrate diagrams for describing a method of recommending music content, based on an activity performed together by users who communicate with each other, the method being performed by a device, according to an embodiment of the present disclosure.
Figure 16B:
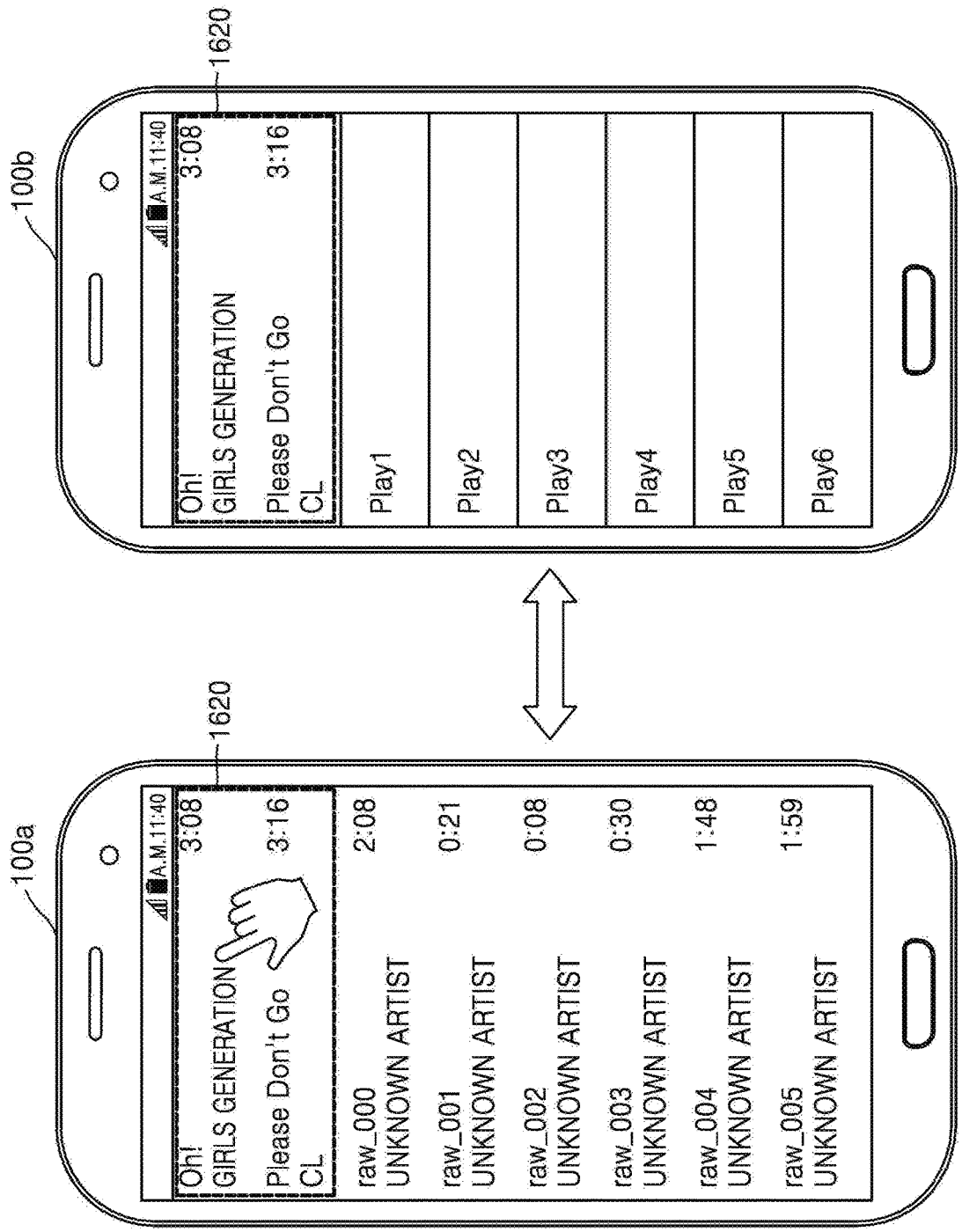

FIGS. 16A and 16B illustrate diagrams for describing a method of recommending music content, based on an activity performed together by users who communicate with each other, the method being performed by a device, according to an embodiment of the present disclosure.

Referring to FIG. 16A, in a case where music reproduction was performed in the second device 100b when the first user and the second user met each other, the second device 100b may recommend, during a call between the first user and the second user, a music reproduction application 1610 among a plurality of applications.

Referring to FIG. 16B, when a second user's input for selecting the music reproduction application 1610 is received, the second device 100b may request the recommendation server 1000 to provide the first device 100a and the second device 100b with identification information of a music file that might have been reproduced together by the first user and the second user when they met each other.

The recommendation server 1000 may transmit, to the first device 100a and the second device 100b, identification information 1620 of music files that were decoded and output by the first device 100a or the second device 100b when the first user and the second user met each other.

When the identification information 1620 of the music files is received from the recommendation server 1000, the first device 100a and the second device 100b may display the identification information 1620 of the music files, compared to identification information of other music files, and thus may recommend a music file related to the second user.

Accordingly, the first device 100a and the second device 100b may share the music file that might have been reproduced together by the first user and the second user when they met each other.

Figure 17A:
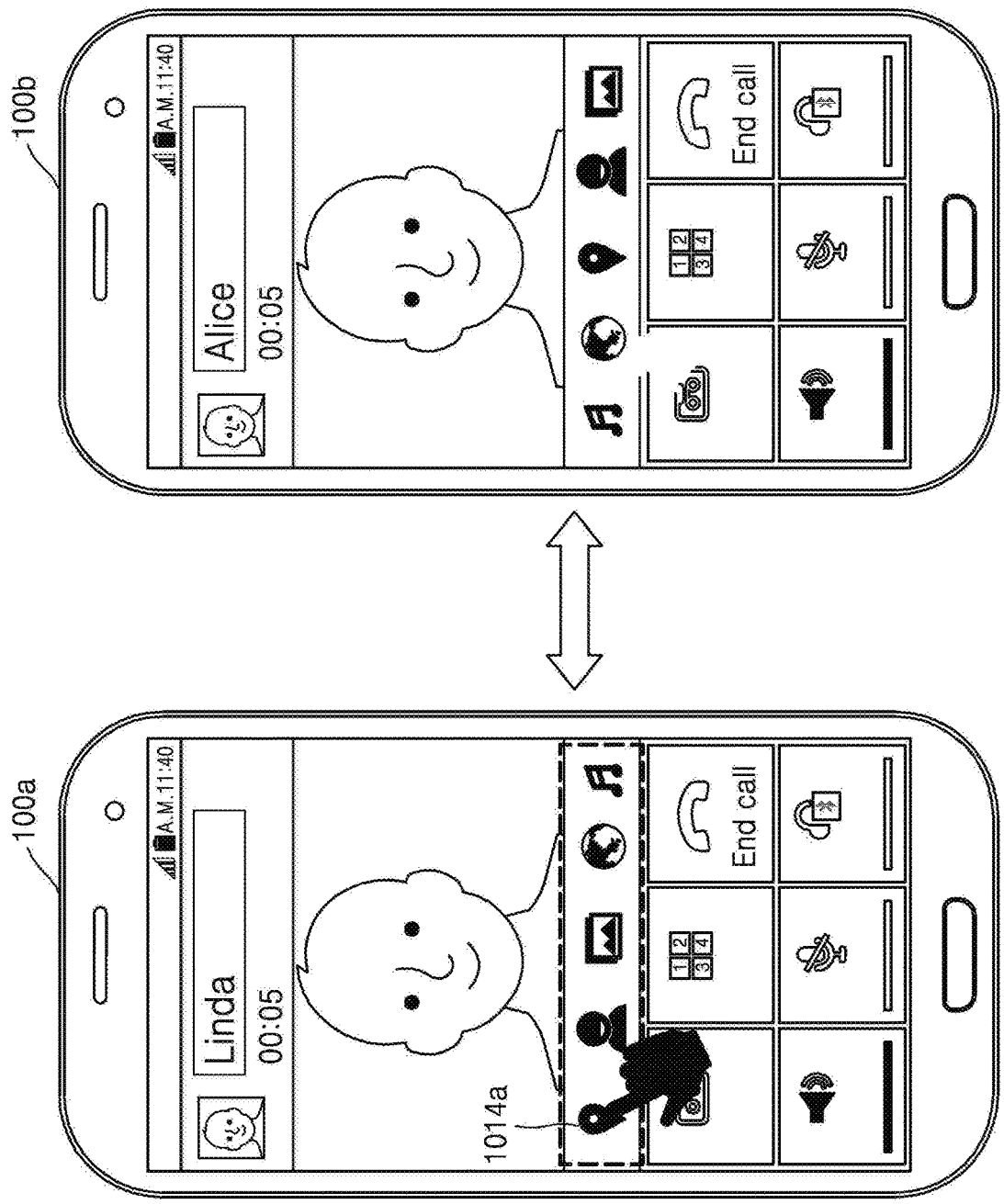

FIGS. 17A and 17B illustrate diagrams for describing a method of recommending map content, based on an activity performed together by users who communicate with each other, the method being performed by a device, according to an embodiment of the present disclosure.

Referring to FIG. 17A, in a case where a map was displayed in the first device 100a or the second device 100b when the first user and the second user met each other, the first device 100a may recommend, during a call between the first user and the second user, a map viewer application 1014a among a plurality of applications.

Referring to FIG. 17B, when a first user's input for selecting the map viewer application 1014a is received, the first device 100a may request the recommendation server 1000 to provide the first device 100a and the second device 100b with identification information of a location that might have been searched for together by the first user and the second user when they met each other.

The recommendation server 1000 may transmit, to the first device 100a and the second device 100b, information about the location that was displayed by the first device 100a or the second device 100b when the first user and the second user met each other. The information about the location may include, but is not limited to, address information of the location, latitude and longitude information of the location, and a store name.

When the information about the location is received from the recommendation server 1000, the first device 100a and the second device 100b may display a map 1710, based on the received information about the location.

Accordingly, the first device 100*a* and the second device 100*b* may share the location that might have been searched for together by the first user and the second user when they met each other.

In an embodiment of the present disclosure, in a case where first user's schedule information and second user's schedule information include a schedule having a common keyword, and when a content recommendation request is received from the first device 100*a* or the second device 100*b* during the schedule having the common keyword, the recommendation server 1000 may recommend a map viewer application to share a location during a call between the first user and the second user.

Figure 18A:
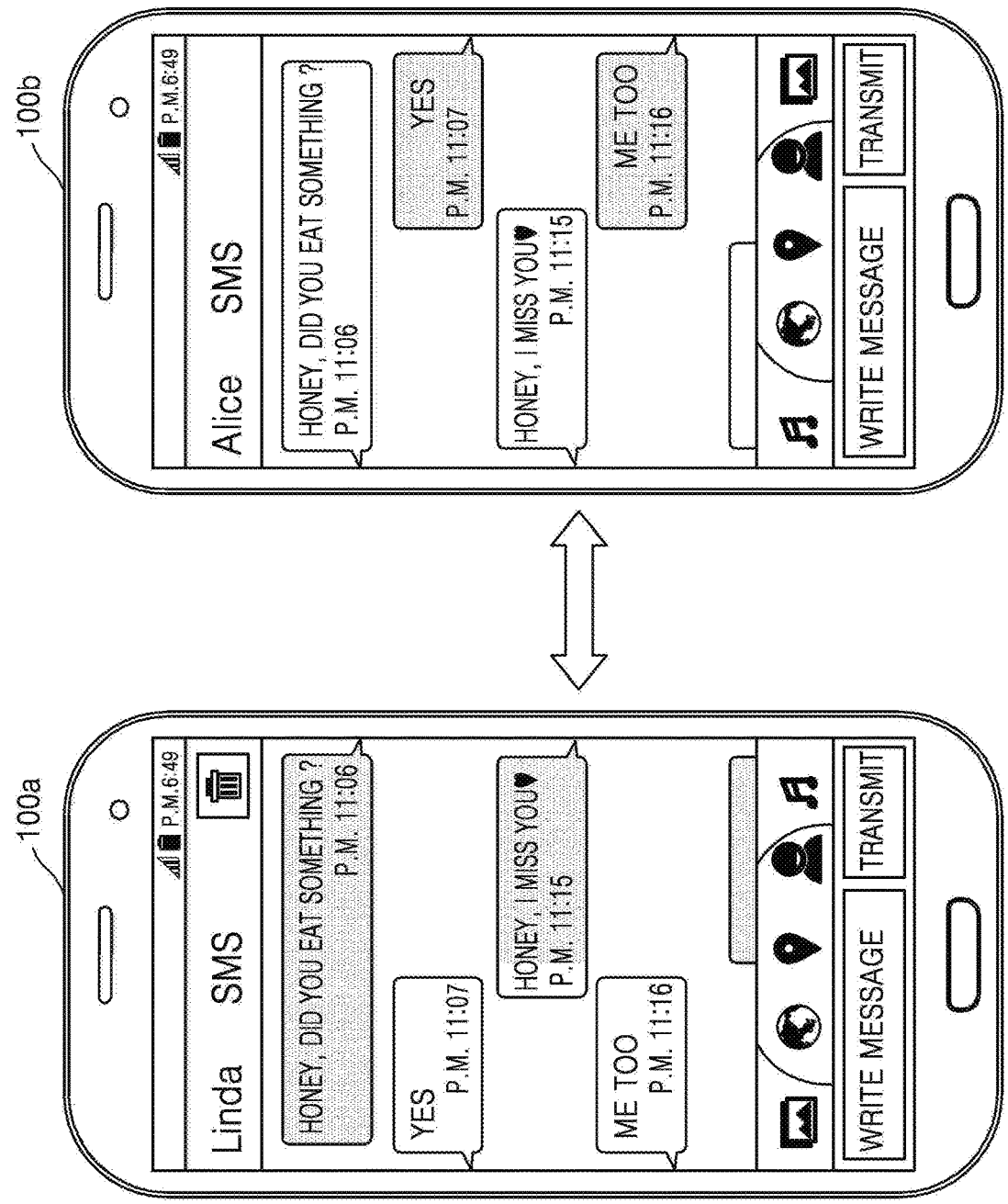
FIGS. 18A, 18B, and 18C illustrate diagrams for describing a method of recommending content, based on an activity performed together by users who chat with each other, the method being performed by a device, according to an embodiment of the present disclosure.
Figure 18B:
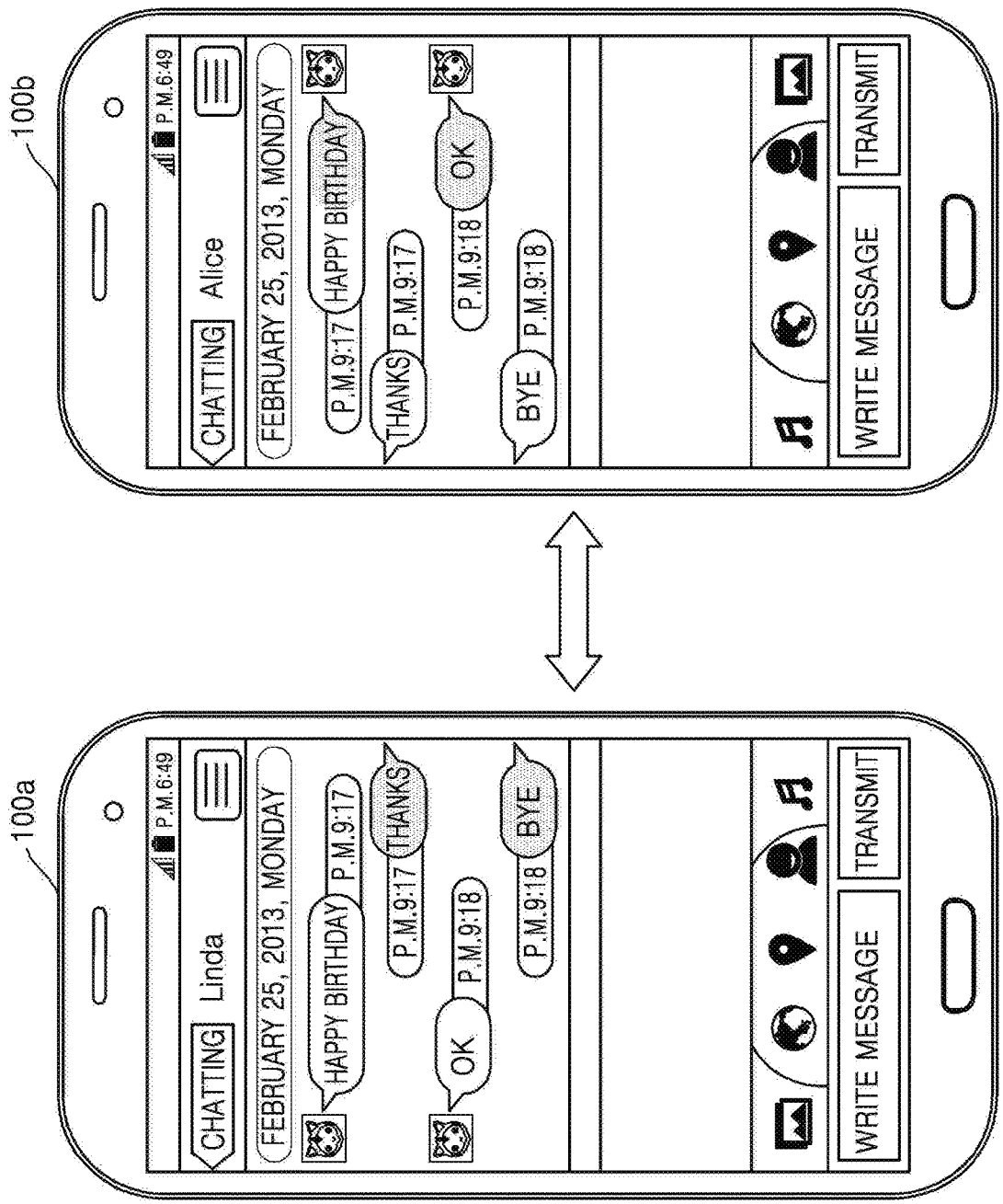
Figure 18C:
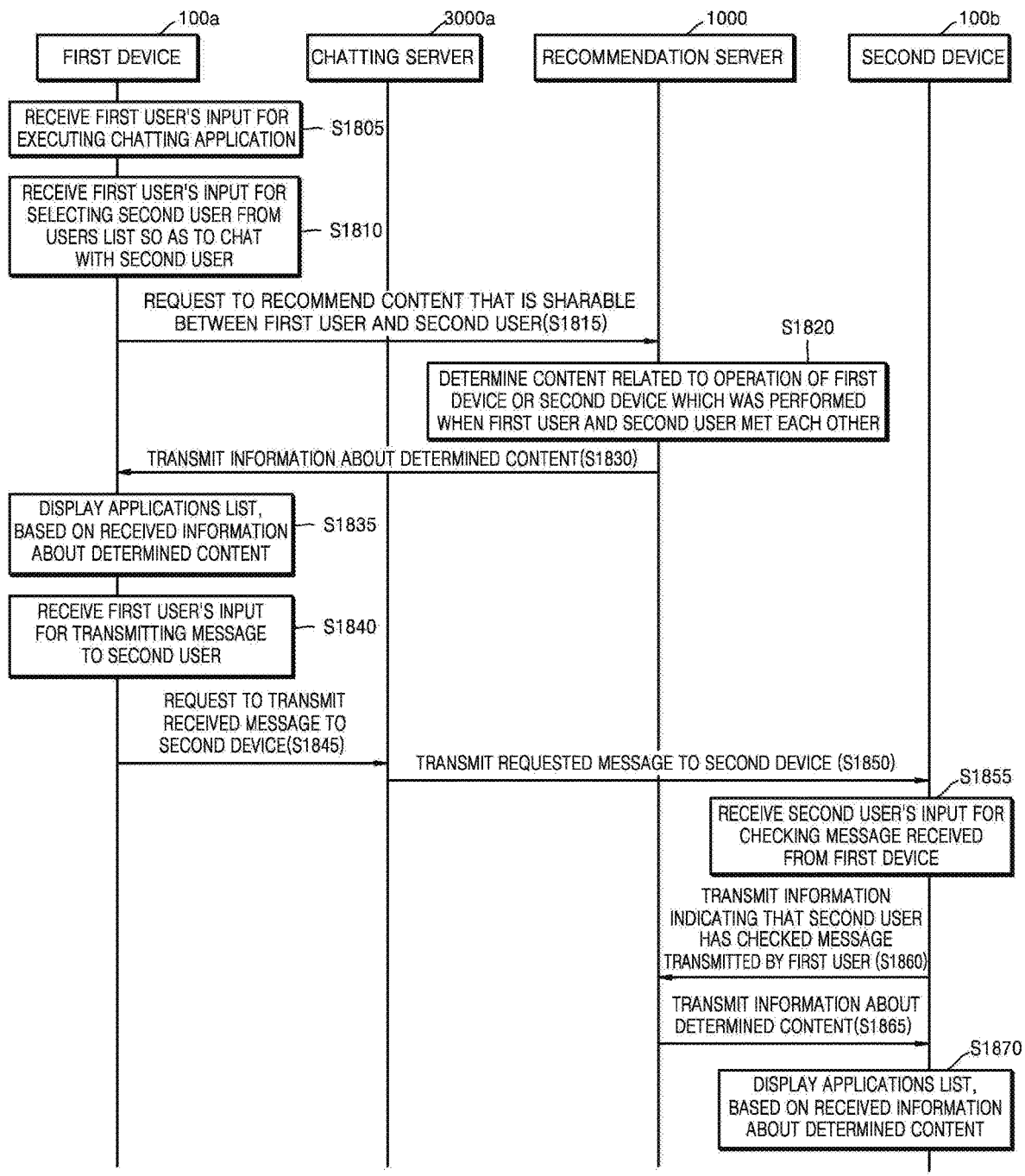

FIGS. 18A, 18B, and 18C illustrate diagrams for describing a method of recommending content, based on an activity performed together by users who chat with each other, the method being performed by a device, according to an embodiment of the present disclosure.

Referring to FIG. 18A, when the device 100 executes an application so as to exchange an SMS message between the users, the device 100 may recommend content, based on an activity performed together by the users who exchanges SMS messages.

For example, when an SMS exchange application is executed, and a first user's input for selecting the second user to exchange an SMS is received, the first device 100*a* may request the recommendation server 1000 to provide content for the first user and the second user to the first device 100*a* or the second device 100*b*. In this case, the first device 100*a* may transmit, to the recommendation server 1000, the ID of the first user and the ID of the second user which are registered in the recommendation server 1000.

When the recommendation request with respect to the content for the first user and the second user is received from the first device 100*a*, the recommendation server 1000 may transmit, to the first device 100*a* and the second device 100*b*, identification information and meta-information of content executed or generated in the first device 100*a* or the second device 100*b* when the first user and the second user met each other.

Based on the identification information and meta-information of the content which are received from the recommendation server 1000, the first device 100*a* may recommend an application to be shared with the second user and content to be shared with the second user.

Referring to FIG. 18B, when the device 100 executes an application to exchange chatting messages, the device 100 may recommend content, based on an activity performed together by users who exchange the chatting messages.

FIG. 18C illustrates a flowchart of a method of recommending content, based on an activity performed together by users who chat with each other, the method being performed by a device, according to an embodiment of the present disclosure.

Referring to FIG. 18C, in operation S1805, the first device 100*a* may receive a first user's input for executing a chatting application.

The chatting application may include, but is not limited to, an SMS application, a text chatting application, and a video chatting application.

In operation S1810, the first device 100*a* may receive a first user's input for selecting the second user from a list of users so as to chat with the second user.

When the chatting application is executed, the first device 100*a* may display a list of users who are registered as friends of the first user in a chatting server 3000*b*.

In operation S1815, the first device 100*a* may request the recommendation server 1000 to recommend content that is sharable between the first user and the second user.

When a user input for selecting a user from the list of users is received, the first device 100*a* may request the recommendation server 1000 to recommend the content that is sharable between the first user and the second user. The recommendation request may include the ID of the first user and the ID of the second user which are registered in the recommendation server 1000.

The recommendation server 1000 may be a server that is equal to or different from the chatting server 3000*b*. The recommendation server 1000 and the chatting server 3000*b* may be run by a same service provider or by different service providers.

In an embodiment of the present disclosure, the recommendation server 1000 may receive the content recommendation request from the chatting server 3000*b*, not from the first device 100*a*. In this case, the chatting server 3000*b* may transmit, to the recommendation server 1000, the ID of the first user and the ID of the second user which are registered in the chatting server 3000*b*. The recommendation server 1000 may identify users, based on IDs of the users registered in the chatting server 3000*b*.

In operation S1820, the recommendation server 1000 may determine content related to an operation of the first device 100*a* or the second device 100*b* which was performed when the first user and the second user met each other.

The recommendation server 1000 may determine the content that was executed or generated in the first device 100*a* or the second device 100*b* when the first user and the second user met each other.

In operation S1830, the recommendation server 1000 may transmit information about the determined content to the first device 100*a*.

The information about the determined content may include identification information of the content, meta-information of the content, information of an application to execute the content, a storage location of the content, and identification information of the first device 100*a* in which the content was generated or executed.

In operation S1835, the first device 100*a* may display an applications list, based on the received information about the determined content.

Based on the received identification information and meta-information of the content, the first device 100*a* may first display an application to execute the content received from the recommendation server 1000, compared to other applications of the applications list.

In operation S1840, the first device 100*a* may receive a first user's input for transmitting a message to the second user.

When a first user's input for selecting the second user from the list of users is received, the first device 100*a* may display a chatting window for transmitting the message to the second user.

The first device 100*a* may receive the first user's input for transmitting the message to the second user via the chatting window.

In operation S1845, the first device 100*a* may request the chatting server 3000*b* to transmit the received message to the second device 100*b*.

In operation S1850, the chatting server 3000*b* may transmit the requested message to the second device 100*b*.

In operation S1855, the second device 100*b* may receive a second user's input for determining the message received from the first device 100*a*.

When the message is received from the chatting server 3000b, the second device 100b may display notification information notifying the second user about reception of the message from the first user.

In operation S1860, the second device 100b may transmit, to the recommendation server 1000, information indicating that the second user has determined the message transmitted by the first user.

In this case, the second device 100b may transmit, to the recommendation server 1000, the ID of the second user registered in the recommendation server 1000.

In operation S1865, the recommendation server 1000 may transmit the information about the determined content to the second device 100b.

In operation S1870, the second device 100b may display an applications list, based on the received information about the determined content.

Based on the received identification information and meta-information of the content, the second device 100b may first display an application to execute the content received from the recommendation server 1000, compared to other applications of the applications list.

Figure 19:
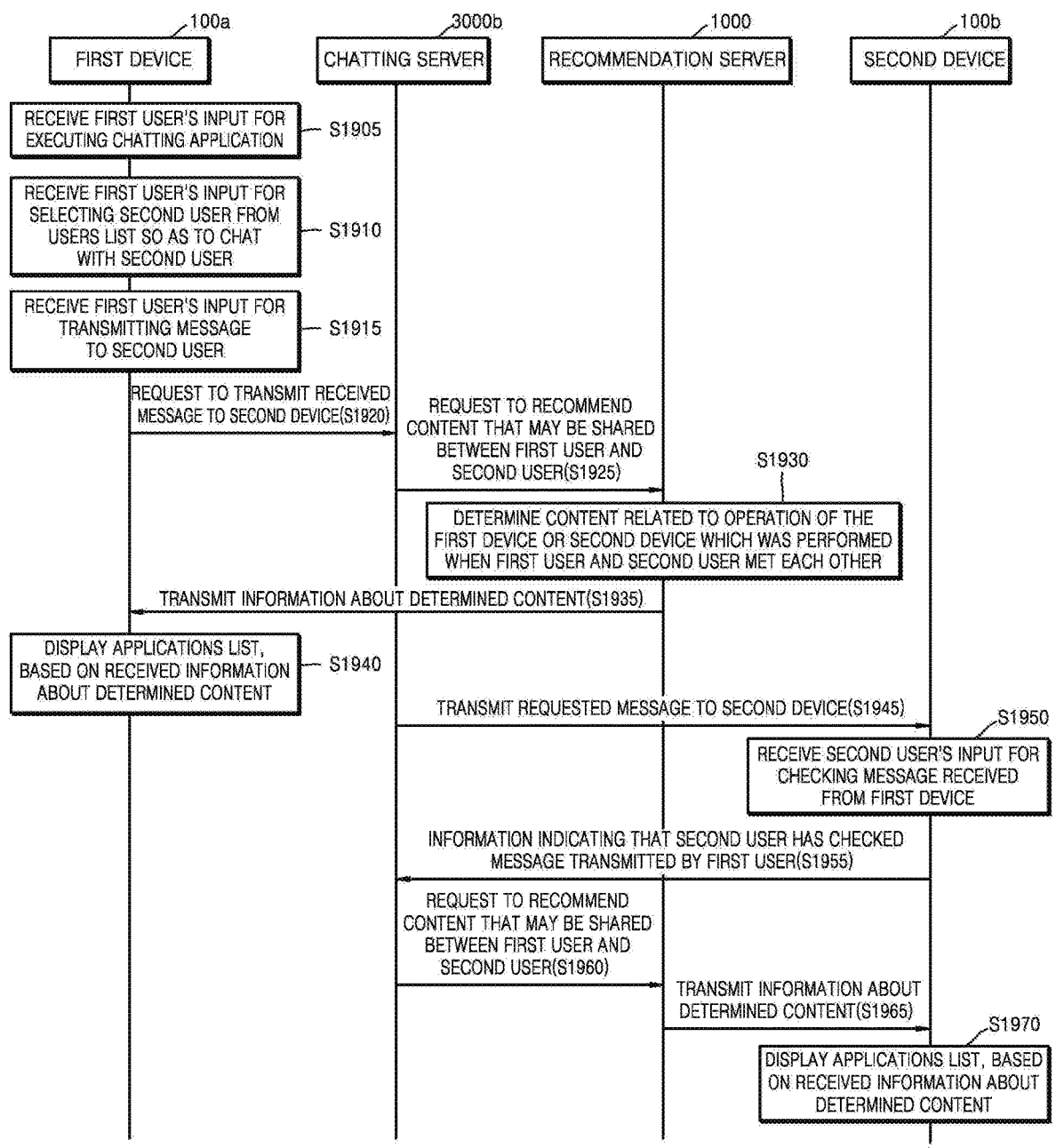
FIG. 19 illustrates a flowchart of a method of recommending content, based on an activity performed together by users who communicate with each other, the method being performed by a device, according to an embodiment of the present disclosure.

FIG. 19 illustrates a flowchart of a method of recommending content, based on an activity performed together by users who communicate with each other, the method being performed by a device, according to an embodiment of the present disclosure.

Referring to FIG. 19, in operation S1905, the first device 100a may receive a first user's input for executing a chatting application.

In operation S1910, the first device 100a may receive a first user's input for selecting the second user from a list of users so as to chat with the second user.

In operation S1915, the first device 100a may receive a first user's input for transmitting a message to the second user.

In operation S1920, the first device 100a may request the chatting server 3000b to transmit the received message to the second device 100b.

In operation S1925, the chatting server 3000b may request the recommendation server 1000 to recommend content that may be shared between the first user and the second user.

In this case, the chatting server 3000b may transmit, to the recommendation server 1000, the ID of the first user and the ID of the second user which are registered in the chatting server 3000b. The chatting server 3000b and the recommendation server 1000 may store same identification information about each user. Therefore, the chatting server 3000b may transmit, to the recommendation server 1000, an ID of a user which is registered in the chatting server 3000b, as the ID of the user registered in the recommendation server 1000.

In operation S1930, the recommendation server 1000 may determine content related to an operation of the first device 100a or the second device 100b which was performed when the first user and the second user met each other.

The recommendation server 1000 may determine the content that was executed or generated in the first device 100a or the second device 100b when the first user and the second user met each other.

In operation S1935, the recommendation server 1000 may transmit information about the determined content to the first device 100a.

The information about the determined content may include identification information of the content, meta-information of the content, information of an application to execute the content, a storage location of the content, and identification information of the first device 100a in which the content was generated or executed.

In operation S1940, the first device 100a may display an applications list, based on the received information about the determined content.

Based on the received identification information and meta-information of the content, the first device 100a may first display an application to execute the content received from the recommendation server 1000, compared to other applications of the applications list.

In operation S1945, the chatting server 3000b may transmit the requested message to the second device 100b.

In operation S1950, the second device 100b may receive a second user's input for determining the message received from the first device 100a.

In operation S1955, the second device 100b may transmit, to the chatting server 3000b, information indicating that the second user has determined the message transmitted by the first user.

In operation S1960, the chatting server 3000b may request the recommendation server 1000 to recommend content that may be shared between the first user and the second user. In this case, the chatting server 3000b may transmit, to the recommendation server 1000, the ID of the first user and the ID of the second user which are registered in the recommendation server 1000.

In operation S1965, the recommendation server 1000 may transmit information about the determined content to the second device 100b.

In operation S1970, the second device 100b may display an applications list, based on the received information about the determined content.

Accordingly, the first device 100a and the second device 100b may be recommended content by the recommendation server 1000 via the chatting server 3000b.

Figure 20:
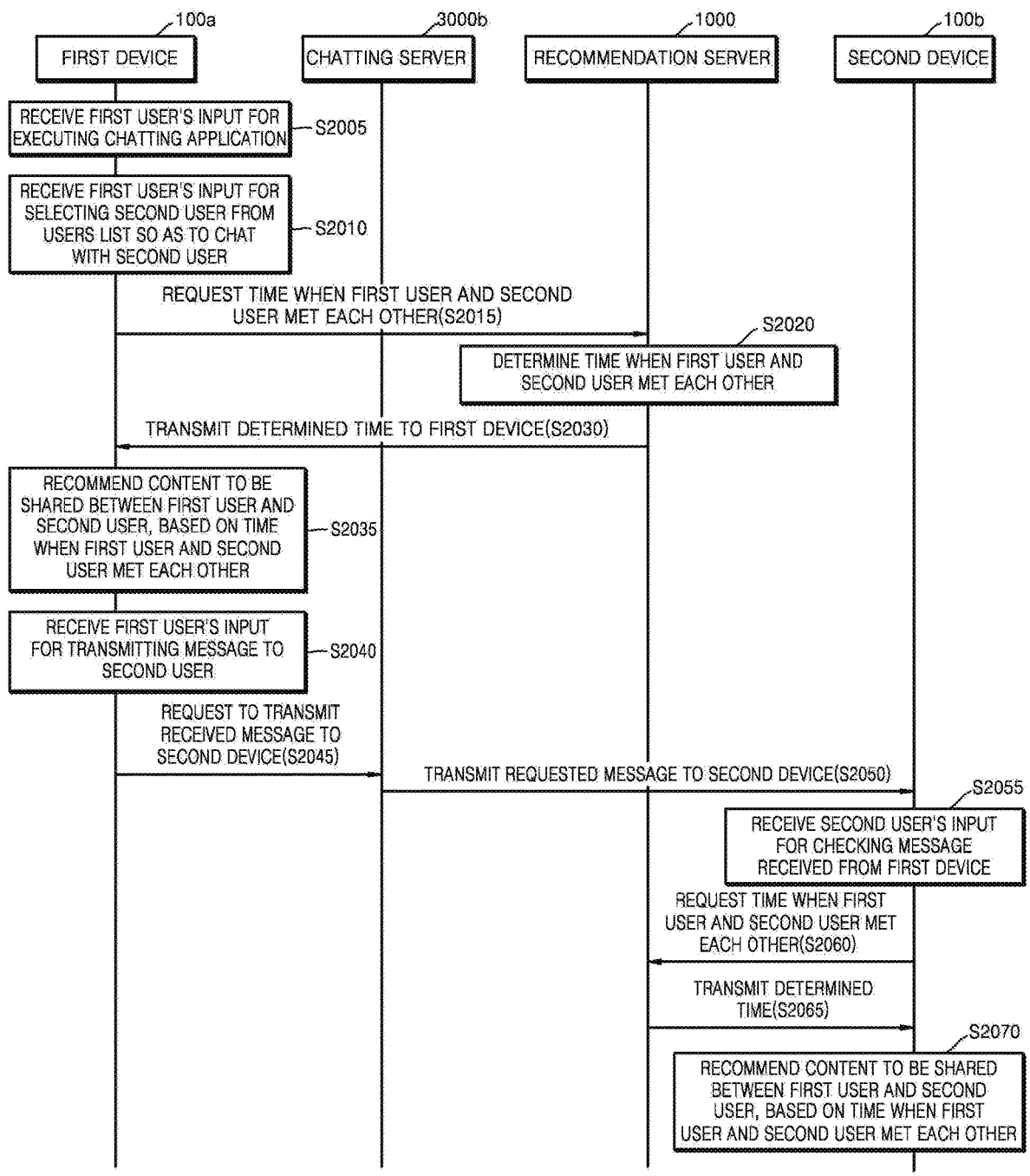
FIG. 20 illustrates a flowchart of a method of recommending content, based on an activity performed together by users who communicate with each other, the method being performed by a device, according to an embodiment of the present disclosure.

FIG. 20 illustrates a flowchart of a method of recommending content, based on an activity performed together by users who communicate with each other, the method being performed by a device, according to an embodiment of the present disclosure.

Referring to FIG. 20, in operation S2005, the first device 100a may receive a first user's input for executing a chatting application.

In operation S2010, the first device 100a may receive a first user's input for selecting the second user from a list of users so as to chat with the second user.

In operation S2015, the first device 100a may request a time when the first user and the second user met each other.

In this case, the first device 100a may transmit, to the recommendation server 1000, the ID of the first user and the ID of the second user which are registered in the recommendation server 1000.

In operation S2020, the recommendation server 1000 may determine the time when the first user and the second user met each other.

The recommendation server 1000 may determine the time when the first user and the second user met each other, based on first user's activity information and second user's activity information. User's activity information may indicate location information of the device 100 of a user according to time.

In operation S2030, the recommendation server 1000 may transmit the determined time to the first device 100a.

In operation S2035, the first device 100a may recommend content to be shared between the first user and the second user, based on the time when the first user and the second user met each other.

The first device 100a may determine the content that was executed or generated at the time when the first user and the second user met each other, wherein the content is from among a plurality of items of content stored in the first device 100a. For example, based on an executed date, an executed time, or a generated time of the content which is included in metadata of the content, the first device 100a may determine the content that was executed or generated at the time when the first user and the second user met each other. The first device 100a may display a list of the determined content.

In operation S2040, the first device 100a may receive a first user's input for transmitting a message to the second user.

In operation S2045, the first device 100a may request the chatting server 3000b to transmit the received message to the second device 100b.

In operation S2050, the chatting server 3000b may transmit the requested message to the second device 100b.

In operation S2055, the second device 100b may receive a second user's input for determining the message received from the first device 100a.

In operation S2060, the second device 100b may request the recommendation server 1000 for a time when the first user and the second user met each other.

In operation S2065, the recommendation server 1000 may transmit, to the second device 100b, the time when the first user and the second user met each other.

In operation S2070, the second device 100b may recommend content to be shared between the first user and the second user, based on the time when the first user and the second user met each other.

The second device 100b may determine the content that was executed or generated at the time when the first user and the second user met each other, wherein the content is from among a plurality of items of content stored in the second device 100b. For example, based on an executed date, an executed time, or a generated time of the content which is included in metadata of the content, the second device 100b may determine the content that was executed or generated at the time when the first user and the second user met each other. The second device 100b may display a list of the determined content.

Figure 21A:
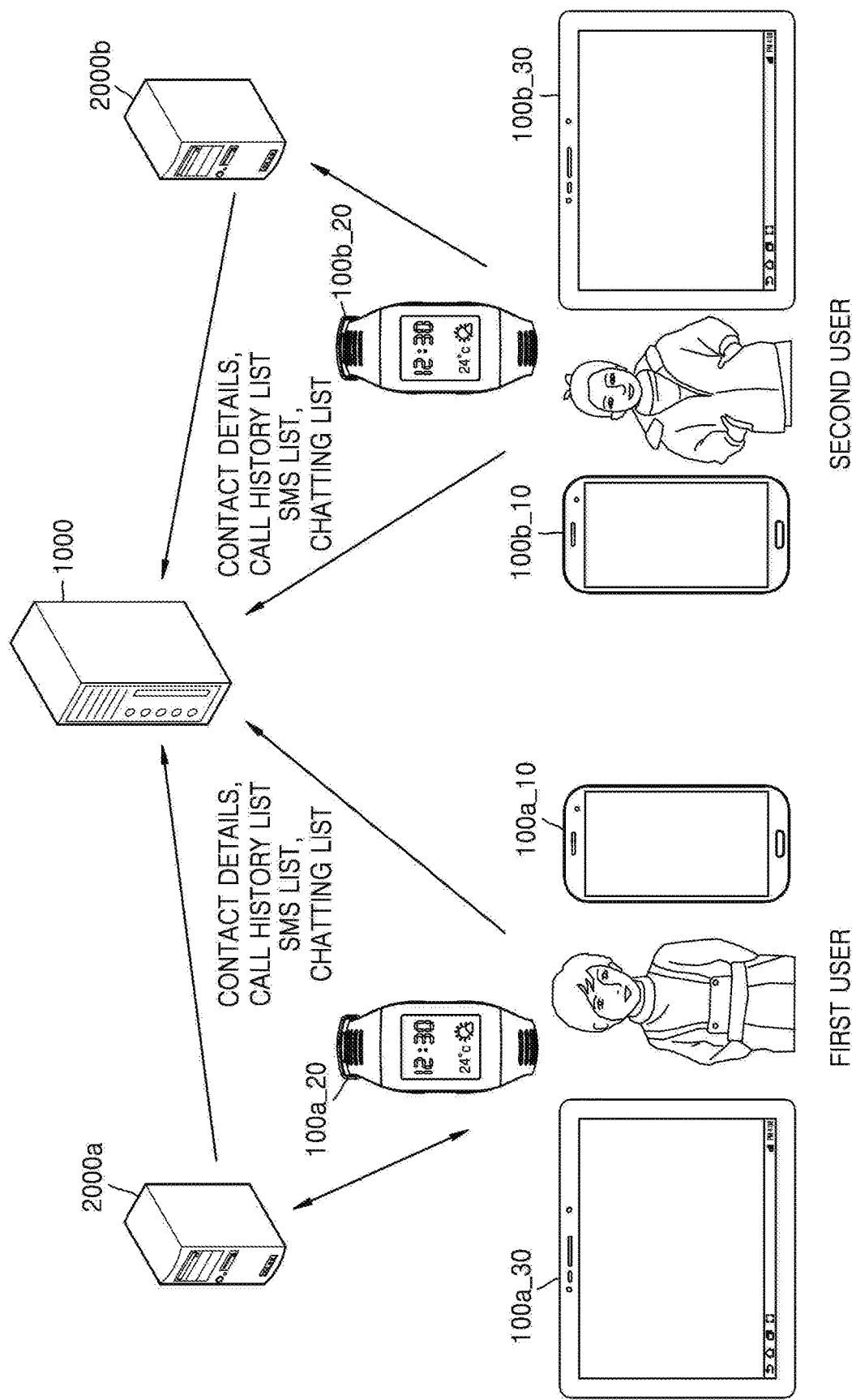

FIGS. 21A and 21B illustrate diagrams for describing a method of determining a relationship between users, and determining whether to share content, based on the determined relationship, the method being performed by a recommendation server, according to an embodiment of the present disclosure.

Referring to FIGS. 21A and 21B, the recommendation server 1000 may determine the relationship between the users who communicate with each other, and only when the relationship between the users who communicate with each other allows sharing of content, the recommendation server 1000 may recommend content. The recommendation server 1000 may determine the relationship between the users, based on user information of the users.

Referring to FIG. 21A, the recommendation server 1000 may receive user information of a user from the device 100 of the user.

The user information may include, but is not limited to, contact details, a call history list, an SMS list, and a chatting list which are related to the user.

The device 100 may periodically transmit the user information to the recommendation server 1000. When new user information is stored in the device 100, the device 100 may transmit the new user information to the recommendation server 1000.

The recommendation server 1000 may receive the user information not only from the device 100 of the user but may also receive the user information from a third party server 2000 that stores the user information.

Referring to FIG. 21B, the recommendation server 1000 may generate a DB 2100 indicating relationships among users, based on user information of the users.

The recommendation server 1000 may determine a closeness of the relationship between the users, based on the user information of the users, and when the determined closeness is equal to or greater than a reference, the recommendation server 1000 may determine that the users have a relationship that allows sharing of content.

For example, based on phone numbers 2130 of contact details or a call list of the first user, the recommendation server 1000 may determine a plurality of pieces of identification information 2120 of users which correspond to the phone numbers 2130 and are registered in the recommendation server 1000.

The recommendation server 1000 may calculate a closeness 2180 of the relationship between the first user and each of the users, in correspondence to the plurality of pieces of determined identification information 2120 of the users.

For example, the recommendation server 1000 may determine the closeness 2180 between the first user and each of the users, based on whether a contact detail of each user is stored in the first device 100a 2140, the number of times of contact 2150, the number of times of contact occurred recently 2160, whether each user is an SNS friend 2170, and the like.

For example, the recommendation server 1000 may determine the closeness 2180 between the first user and each of the users, based on groups in the contact details of the first user, wherein each user is included in any one of the groups, or based on the alma mater of the first user which is stored in an SNS server of the first user.

As another example, the recommendation server 1000 may set the closeness 2180 of a user who shares more items of content with the first user to be high, compared to other users.

The recommendation server 1000 may determine a user, whose determined closeness 2180 is equal to or greater than a reference, as a user 2190 having a relationship with the first user which allows sharing of content.

Figure 21C:
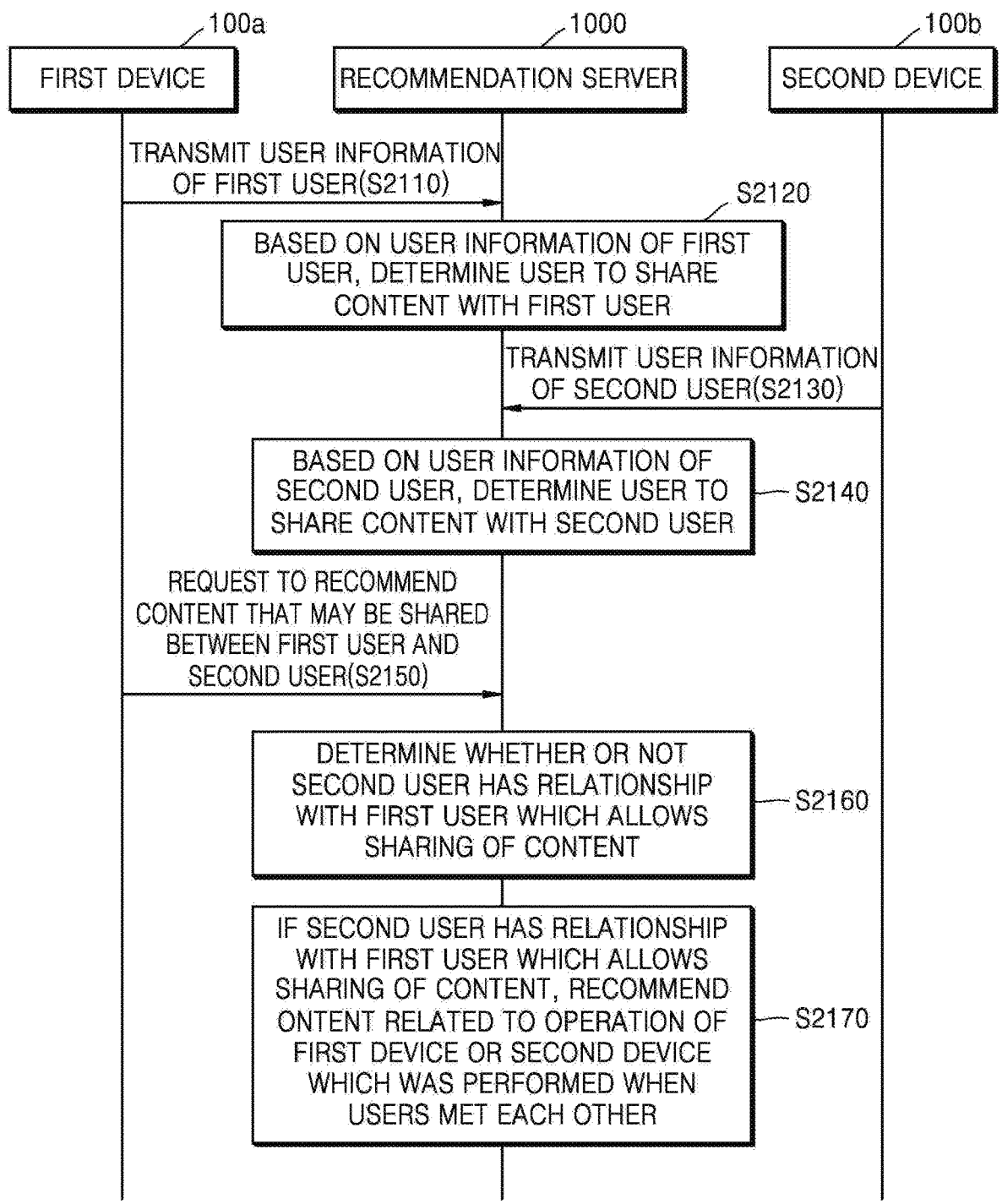
FIG. 21C illustrates a flowchart of a method of determining a relationship between users, and determining whether to share content, based on the determined relationship, the method being performed by a recommendation server, according to an embodiment of the present disclosure.

FIG. 21C illustrates a flowchart of a method of determining a relationship between users, and determining whether to share content, based on the determined relationship, the method being performed by a recommendation server, according to an embodiment of the present disclosure.

Referring to FIG. 21C, in operation S2110, the first device 100a may transmit user information of the first user to the recommendation server 1000.

The user information may include, but is not limited to, contact details, a call history list, an SMS list, and a chatting list which are related to the user.

In operation S2120, the recommendation server 1000 may determine, based on the user information of the first user, a user to share content with the first user.

For example, the recommendation server 1000 may determine a closeness of the relationship between the users, based on user information of the users, and when the determined closeness is equal to or greater than a reference, the recommendation server 1000 may determine that the users have a relationship that allows sharing of content.

In operation S2130, the second device 100b may transmit user information of the second user to the recommendation server 1000.

In operation S2140, the recommendation server 1000 may determine, based on the user information of the second user, a user to share content with the second user.

In operation S2150, the first device 100a may request the recommendation server 1000 to recommend content that may be shared between the first user and the second user.

In operation S2160, the recommendation server 1000 may determine whether the second user has a relationship with the first user which allows sharing of content.

In operation S2170, if the second user has the relationship with the first user which allows sharing of content, the recommendation server 1000 may recommend content related to an operation of the first device 100a or the second device 100b which was performed when the first user and the second user met each other.

If the second user does not have the relationship with the first user which allows sharing of content, the recommendation server 1000 may not recommend content.

In an embodiment of the present disclosure, the first device 100a and the second device 100b may provide notification so as to notify a user about contacting another user, based on a closeness of the relationship between the user and the other user. For example, in a case where the first user and the second user have been periodically contacting each other, and there is no contact between the first user and the second user in a corresponding period, the recommendation server 1000 may provide the first device 100a or the second device 100b with notification indicating that it is a time to contact the other party.

Figure 22:
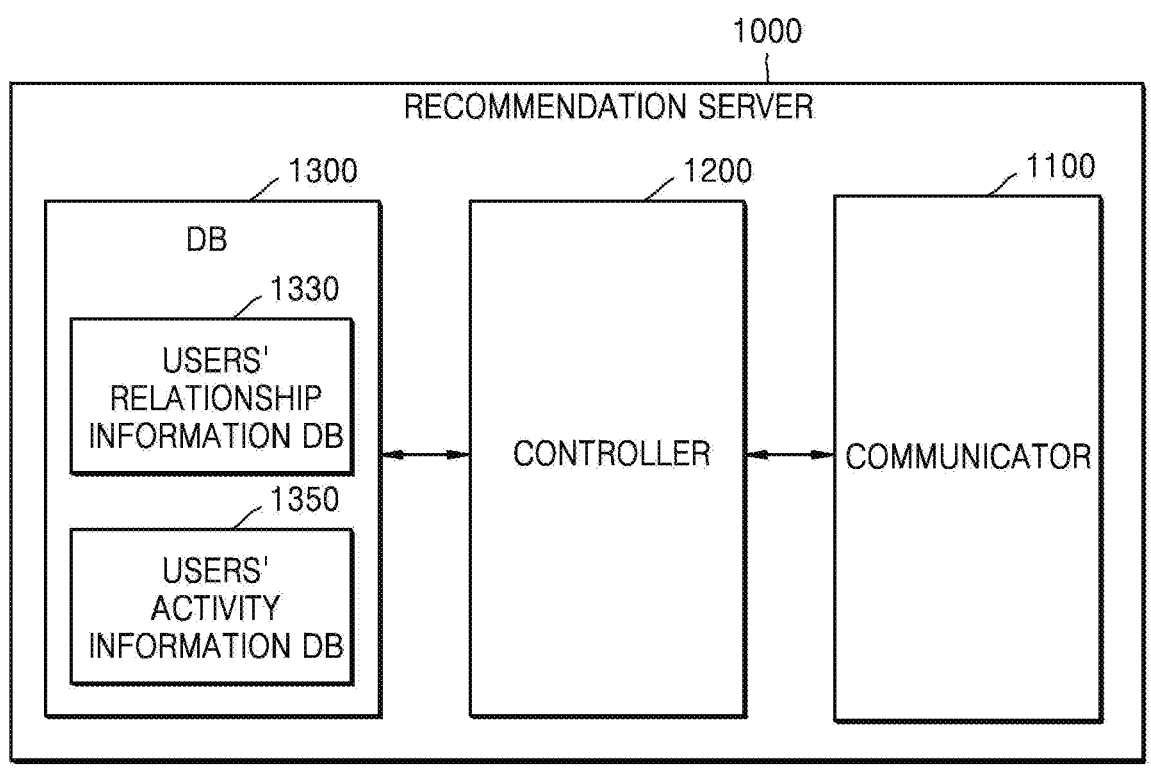
FIG. 22 illustrates a block diagram of the recommendation server, according to an embodiment of the present disclosure.

FIG. 22 illustrates a block diagram of a recommendation server according to an embodiment of the present disclosure.

Referring to FIG. 22, the recommendation server 1000 may include a communicator 1100, a controller 1200, and a DB 1300.

The communicator 1100 may exchange data with the first device 100a or the second device 100b.

When a first user's input for communicating with the second user is received by the first device 100a, the communicator 1100 may receive, from the first device 100a, a transmission request with respect to a list of a plurality of items of content related to an operation of the first device 100a which was performed when the first user and the second user met each other.

The communicator 1100 may receive, from the first device 100a or the second device 100b, a request for sharing content between the first user and the second user. The communicator 1100 may transmit, to the first device 100a or the second device 100b, information about content related to an operation of the first device 100a or the second device 100b which was performed when the first user and the second user met each other.

The DB 1300 may include a users' relationship information DB 1330 and a users' activity information DB 1350.

The user relationship information DB 1330 may be a DB that stores whether relationships allow sharing of content, based on a closeness of the relationship between users. The closeness between the users may be determined based on whether a contact detail of each other is stored, the number of times of contact, the number of times of contact occurred recently, whether each user is an SNS friend, and the like. The closeness between the users may be calculated from contact details, a call history list, an SMS list, and a chatting list which are related to the users.

The users' activity information DB 1350 may be a DB that stores a plurality of pieces of information about activities of the users. For example, user's activity information may indicate information about locations of a user according to time. The user's activity information may be obtained from schedule information of the user. In addition, the user's activity information may be obtained from meta-information of content generated in a device of the user.

The controller 1200 may generally control a configuration of the recommendation server 1000 including the communicator 1100 and the DB 1300.

The controller 1200 may determine a time when the first user and the second user met each other, based on at least one of activity information about the first user and activity information about the second user.

The controller 1200 may compare location information of the first user according to time with location information of the second user according to time, and then may determine the time when the first user and the second user met each other.

The controller 1200 may determine content that was executed or generated in the first device 100a or the second device 100b at the time when the first user and the second user met each other.

The controller 1200 may provide, to the first device 100a or the second device 100b, a list of a plurality of items of content executed or generated in the first device 100a or the second device 100b at the time when the first user and the second user met each other.

Figure 23:
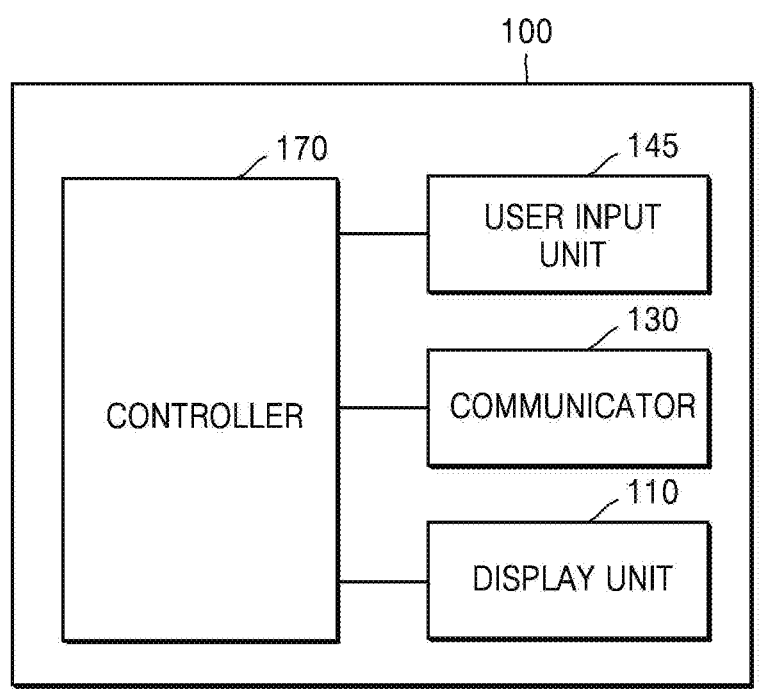
FIG. 23 illustrates a block diagram of a device, according to an embodiment of the present disclosure.

FIG. 23 illustrates a block diagram of a device according to an embodiment of the present disclosure.

Referring to FIG. 23, the device 100 may include a user input device 145, a communicator 130, a display unit 110, and a controller 170.

The user input device 145 may receive an input from a user.

The communicator 130 may exchange data with the recommendation server 1000, a communication server, or an external server.

The display unit 110 may display information on a screen.

The controller 170 may generally control a configuration of the device 100 including the user input device 145, the communicator 130, and the display unit 110.

The user input device 145 may receive a first user's input for selecting the second user from a list of users so as to communicate with the second user.

When the first user's input for selecting the second user is received, the controller 170 may request the recommendation server 1000 for a list of a plurality of items of content related to an operation of the first device 100a which was performed when the first user and the second user met each other.

The communicator 130 may receive, from the recommendation server 1000, the list of the plurality of items of content related to the operation of the first device 100a which was performed when the first user and the second user met each other.

The display unit 110 may display the received list of the plurality of items of content.

The communicator 130 may receive, from the recommendation server 1000, identification information of an application to execute content.

The controller 170 may determine a plurality of applications to execute content that may be shared with the second user. The display unit 110 may display a list of a plurality of applications, in such a manner that the identification information of the application to execute the content may be displayed first in the list, wherein the content is related to the operation of the first device 100a which was performed when the first user and the second user met each other.

The user input device 145 may receive a first user's input for selecting, from the list of the plurality of applications, the application to execute the content related to the operation of the first device 100a which was performed when the first user and the second user met each other.

When the first user's input for selecting the application is received, the display unit 110 may display a list of a plurality of items of content executable by using the selected application, in such a manner that the identification information of the content related to the operation of the first device 100a which was performed when the first user and the second user met each other may be displayed first in the list.

The user input device 145 may receive a first user's input for requesting the content to be shared with the second user. The controller 170 may request the recommendation server 1000 for sharing of the content between the first user and the second user.

Figure 24:
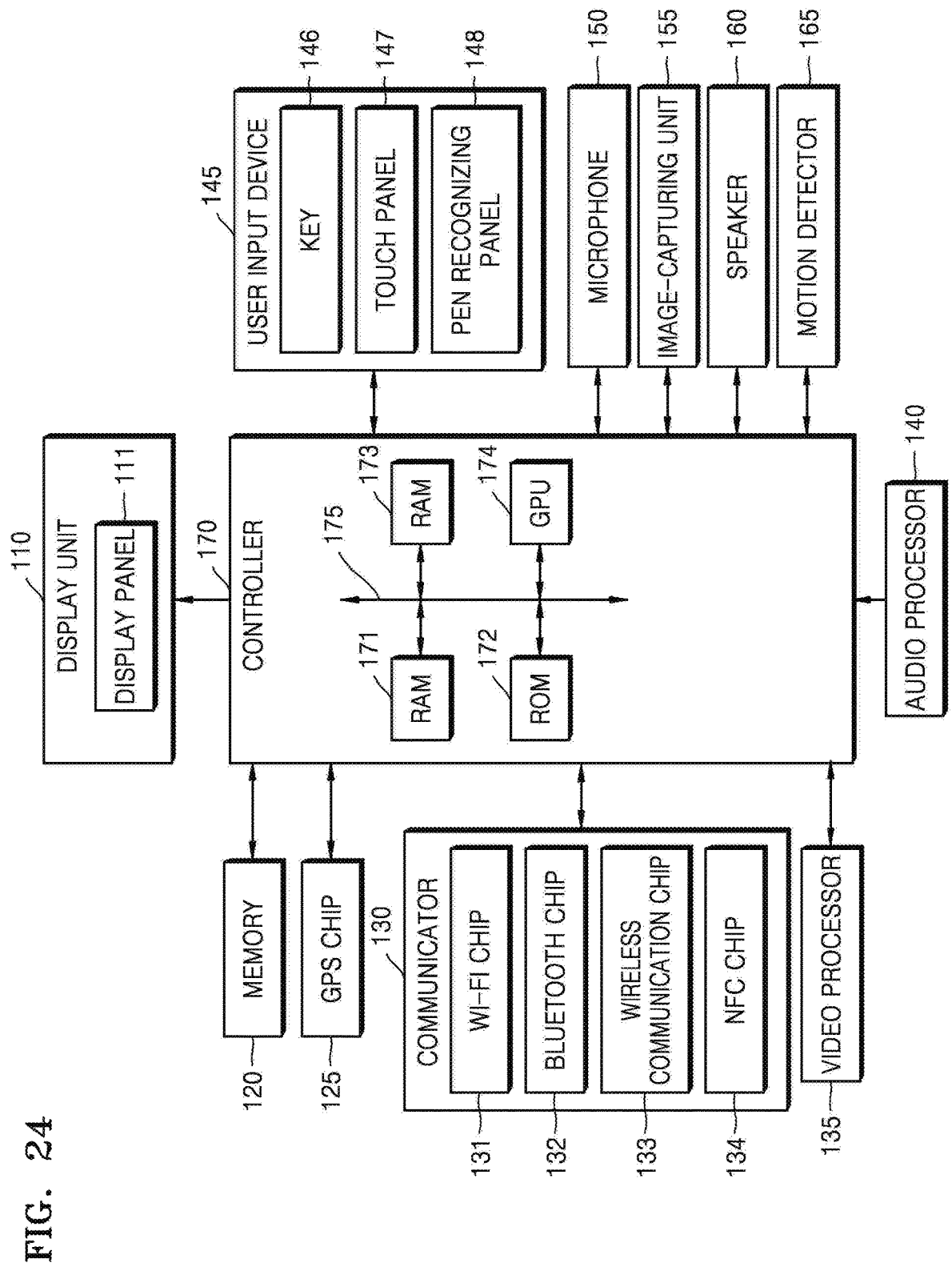
FIG. 24 illustrates a block diagram of a device, according to an embodiment of the present disclosure.

FIG. 24 illustrates a block diagram of a device according to an embodiment of the present disclosure.

Referring to FIG. 24, a configuration of the device 100 may be applied to various types of a device, such as a mobile phone, a tablet personal computer (PC), a personal digital assistant (PDA), a moving picture experts group phase 1 or phase 2 (MPEG-1 or MPEG-2) audio layer 3 (MP3) player, a kiosk, an electronic photoframe, a navigation device, a digital television (TV), a smart watch, a wristwatch, or a wearable device, such as smart glasses, head-mounted display (HMD), and the like.

Referring to FIG. 24, the device 100 may include the communicator 130, the user input device 145, the display unit 110, and the controller 170, and may further include at least one of a memory 120, a global positioning system (GPS) chip 125, a video processor 135, an audio processor 140, a microphone 150, an image-capturing unit 155, a speaker 160, and a motion detector 165.

The display unit 110 may include a display panel 111 and a controller (not shown) that controls the display panel 111. The display panel 111 may be embodied as various displays including a liquid crystal display (LCD) display, an organic light-emitting diode (OLED) display, an active matrix OLED (AMOLED) display, a plasma display panel (PDP), and the like. The display panel 111 may be formed to be flexible, transparent, and/or wearable. The display panel 111 may be combined with a touch panel 147 of the user input device 145, and thus may be provided as a touchscreen (not shown). For example, the touchscreen may include an integrated module having a stack structure containing the display panel 111 and the touch panel 147.

The memory 120 may include at least one of an internal memory (not shown) and an external memory (not shown).

The internal memory may include at least one of a volatile memory (e.g., a dynamic random-access memory (DRAM), a static RAM (SRAM), a synchronous dynamic RAM (SDRAM), and the like), a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, and the like), a hard disk drive (HDD), and a solid-state drive (SSD). According to the present embodiment, the controller 170 may load a command or data, which is received from at least one of the non-volatile memory and another element, to the volatile memory, and may process the command or the data. In addition, the controller 170 may store, in the non-volatile memory, data that is received from or is generated by another element.

The external memory may include at least one of a compact flash (CF) memory, a secure digital (SD) memory, a micro-SD memory, a mini-SD memory, an extreme digital (xD) memory, and a memory stick.

The memory 120 may store various programs and data used in operations of the device 100. For example, the memory 120 may temporarily or semi-permanently store a portion of contents to be displayed on a lock screen.

The controller 170 may control the display unit 110 to display a portion of contents which is stored in the memory 120. In other words, the controller 170 may display, on the display unit 110, the portion of the contents which is stored in the memory 120. Alternatively, when a user's gesture is performed in a region of the display unit 110, the controller 170 may perform a control operation that corresponds to the user's gesture.

The controller 170 may include at least one of a RAM 171, a ROM 172, a central processing unit (CPU) 173, a graphics processing unit (GPU) 174, and a bus 175. The RAM 171, the ROM 172, the CPU 173, and the GPU 174 may be connected to each other via the bus 175.

The CPU 173 accesses the memory 120, and performs a booting operation by using an operating system (O/S) stored in the memory 120. In addition, the CPU 173 performs various operations by using the various programs, a plurality of items of content, a plurality of items of data, and the like, which are stored in the memory 120.

The ROM 172 stores a command set for booting up a system. For example, when a turn-on command is input to the device 100, and power is supplied to the device 100, the CPU 173 may copy the O/S stored in the memory 120 to the RAM 171, according to the command stored in the ROM 172, may execute the O/S, and thus may boot up the system. When the booting operation is completed, the CPU 173 copies the various programs stored in the memory 120 to the RAM 171, and performs the various operations by executing the programs copied to the RAM 171. When the device 100 is booted up, the GPU 174 displays a user interface screen in a region of the display unit 110. Specifically, the GPU 174 may generate a screen that displays an electronic document including various objects, such as content, an icon, a menu, and the like. The GPU 174 calculates coordinate values of the objects that are to be displayed according to a layout of the user interface screen, and calculates attribute values of shapes, sizes, or colors of the objects. Then, the GPU 174 may generate user interface screens with various layouts including the objects based on the calculated attribute values. The user interface screen generated by the GPU 174 may be provided to the display unit 110 and thus may be displayed in areas of the display unit 110.

The GPS chip 125 may receive a GPS signal from a GPS satellite and may calculate a current position of the device 100. In a case where a navigation program is used or a current position of the user is required, the controller 170 may calculate a position of the user by using the GPS chip 125.

The communicator 130 may communicate with various external devices according to various types of communication methods. The communicator 130 may include at least one of a Wi-Fi chip 131, a Bluetooth chip 132, a wireless communication chip 133, and a near field communication (NFC) chip 134. The controller 170 may communicate with the various external devices by using the communicator 130.

The Wi-Fi chip 131 and the Bluetooth chip 132 may perform communication by using Wi-Fi and Bluetooth, respectively. If the Wi-Fi chip 131 or the Bluetooth chip 132 is used, the Wi-Fi chip 131 or the Bluetooth chip 132 may first transmit and receive various types of connection information including a service set identification (SSID), a session key, and the like, may establish a connection for communication by using the connection information, and then may transmit and receive various types of information. The wireless communication chip 133 may indicate a chip that performs communication according to various communication standards, such as the Institute of Electrical and Electronics Engineers (IEEE), ZigBee, $3^{rd}$ generation (3G), 3rd Generation Partnership Project (3GPP), LTE, and the like. The NFC chip 134 indicates a chip that operates in using NFC by using a 13.56 MHz band from among various radio frequency-identification (RF-ID) frequency bands, such as 135 kHz, 13.56 MHz, 433 MHz, 860 through 960 MHz, 2.45 GHz, and the like.

The video processor 135 may process video data included in content received by using the communicator 130 or may process video data included in content stored in the memory 120. The video processor 135 may perform various image processing, such as decoding, scaling, noise filtering, frame rate conversion, resolution conversion, and the like on the video data.

The audio processor 140 may process audio data included in content received by using the communicator 130 or may process audio data included in content stored in the memory 120. The audio processor 140 may perform various processing, such as decoding, amplification, noise filtering, and the like on the audio data.

When a reproducing program for multimedia content is executed, the controller 170 may reproduce the multimedia content by driving the video processor 135 and the audio processor 140. The speaker 160 may output audio data generated in the audio processor 140.

The user input device 145 may receive an input of various instructions from a user. The user input device 145 may include at least one of a key 146, a touch panel 147, and a pen recognizing panel 148.

The key 146 may be of various types, such as a mechanical button, a wheel, and the like, that may be formed in a front portion, a side portion, a rear portion, and the like, of an external surface of a body of the device 100.

The touch panel 147 may detect a touch input by the user and may output a value of a touch event that corresponds to a signal generated by the detected touch input. When the touch panel 147 is combined with the display panel 111 and thus is formed as a touchscreen, the touchscreen may be configured as a capacitive touchscreen, a resistive touchscreen, or a piezoelectric touchscreen by using various types of touch sensors. The capacitive touchscreen may calculate touch coordinates by detecting a small amount of electricity generated when a body part of the user touches the surface of the capacitive touchscreen, which is coated with a dielectric material. The resistive touchscreen may include two embedded electrode plates and may calculate touch coordinates by detecting a flow of current that occurs when the user touches the resistive touchscreen which causes upper and lower plates of a touched point to contact each other. The touch event that occurs on the touchscreen may be mainly generated by a finger of a person but may also be generated by an object formed of a conductive material capable of changing capacitance.

The pen recognizing panel 148 may detect a proximity input or a touch input of a touch pen (e.g., a stylus pen or a digitizer pen) which is performed by a user, and may output a detected pen proximity event or a detected pen touch event. The pen recognizing panel 148 may be an electromagnetic resonance (EMR)-type pen recognizing panel, and may detect the touch input or the proximity input according to changes in a strength of an electromagnetic field, which occur when the touch pen approaches or touches the touchscreen. Specifically, the pen recognizing panel 148 may include an electromagnetic induction coil sensor (not shown) having a grid structure, and an electric signal processor (not shown) for sequentially providing an alternating current (AC) signal having a determined frequency to each loop coil of the electromagnetic induction coil sensor. When a pen having an internal resonance circuit is positioned near a loop coil of the pen recognizing panel 148, a magnetic field transmitted from the loop coil generates a current in the resonance circuit in the pen, based on mutual electrostatic induction. Due to the current, an induction field is generated from a coil forming the resonance circuit in the pen, and the pen recognizing panel 148 detects the induction field from the loop coil capable of receiving a signal, and thus detects the touch input or the proximity input by the pen. The pen recognizing panel 148 may be arranged to occupy a preset area below the display panel 111, e.g., may have a size capable of covering a display region of the display panel 111.

The microphone 150 may receive an input of a user's voice or other sound and may convert the user's voice or other sound to audio data. The controller 170 may use the user's voice, which is input via the microphone 150, in a call-related operation or may convert the user's voice to the audio data and may store the audio data in the memory 120.

The image-capturing unit 155 may capture a still image or a moving picture according to a control by the user. The image-capturing unit 155 may be plural in number and include a front camera, a rear camera, and the like.

If the image-capturing unit 155 and the microphone 150 are formed, the controller 170 may perform a control operation according to a user's voice input via the microphone 150 or a user's motion recognized by the image-capturing unit 155. For example, the device 100 may operate in a motion control mode or a voice control mode. If the device 100 operates in the motion control mode, the controller 170 may activate the image-capturing unit 155 and may capture an image of the user, may trace a change in motions of the user, and may perform a control operation corresponding thereto. If the device 100 operates in the voice control mode (i.e., a voice recognition mode), the controller 170 may analyze a user's voice input via the microphone 150, and may perform a control operation according to the analyzed user's voice.

The motion detector 165 may detect movement of a body of the device 100. The device 100 may rotate or may tilt in various directions. Here, the motion detector 165 may detect a movement characteristic, such as a rotation direction, a rotation angle, a tilted angle, and the like, by using at least one of various sensors including a magnetic sensor, a gyroscope sensor, an acceleration sensor, and the like.

Although not illustrated in FIG. 24, the present embodiment may further include a universal serial bus (USB) port for connecting the device 100 and a USB connector, various external input ports including a headset, a mouse, a local area network (LAN), and the like, for connection with various external terminals, a digital multimedia broadcasting (DMB) chip for receiving and processing a DMB signal, various sensors, and the like.

Names of the elements of the device 100 may be changed. In addition, the device 100 according to the present embodiment may be embodied by including at least one of the elements, or may be embodied with more or less elements than the elements.

The one or more embodiments may be embodied as computer readable code/instructions on a recording medium, e.g., a program module to be executed in computers, which include computer-readable commands. The computer storage medium may include any usable medium that may be accessed by computers, volatile and non-volatile medium, and detachable and non-detachable medium. In addition, the computer storage medium may include a computer storage medium and a communication medium. The computer storage medium includes all volatile and non-volatile media, and detachable and non-detachable media which are technically implemented to store information including computer readable commands, data structures, program modules or other data. The communication medium includes computer-readable commands, a data structure, a program module, other data as modulation-type data signals, such as carrier signals, or other transmission mechanism, and includes other information transmission mediums.

It should be understood that the various embodiments described herein should be considered in a descriptive detect only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and then executed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A recommendation server comprising:
   a communicator; and
   a processor configured to:
   based on, by a first device, receiving an input of a first user to communicate with a second device of a second user for a call, receive, via the communicator from the first device, a request for a list of a plurality of items of content related to an operation of the first device performed when the first user and the second user met,
   in response to receiving the request, compare first user's activity information comprising first location information and first time information of the first device to second user's activity information comprising second location information and second time information of the second device, the first user's activity information being obtained from schedule information of the first user and meta-information of content generated in the first device, the second user's activity information being obtained from schedule information of the second user and meta-information of content generated in the second device,
   based on a result of the comparing, determine a time when the first user and the second user were in a same location,
   based on the determined time, determine the list of the plurality of items of content related to the operation of the first device performed at the time when the first user and the second user met,
   transmit, via the communicator to the first device, the list of the plurality of items of content for causing the first device to display the list of the plurality of items of content on a phone call screen of the first device, and
   based on receiving an input of the first user selecting one of the plurality of items of content by the first device, receive, via the communicator from the first device, a request for transmitting the selected content to the second device for causing the second device to display the selected content on a phone call screen of the second device,
   wherein the list of the plurality of items of content comprises a plurality of thumbnails of photos, and the plurality of thumbnails of photos are displayed by the first device in an order of generation time of the photos based on meta-information of each of the photos.

2. The recommendation server of claim 1, wherein the processor is further configured to provide, to the first device, identification information of an application to execute the plurality of items of content.

3. The recommendation server of claim 1, wherein the first user's activity information further comprises at least one of identification information of content that was executed in the first device, identification information of an application that executed the content, or information about a location where the content was executed.

4. The recommendation server of claim 1,
   wherein the communicator is further configured to receive, from the first device, a request for sharing the plurality of items of content between the first user and the second user, and
   wherein the processor is further configured to provide the content to the second device, in response to the request.

5. The recommendation server of claim 1, wherein the communicator is further configured to transmit, to the second device, the list of the plurality of items of content.

6. The recommendation server of claim 1, wherein the processor is further configured to:
   determine a number of times contact occurred between the first user and the second user based on information about the second user which is stored in the first device, and
   determine the second user as a user to share the plurality of items of content, when the number of times contact occurred is equal to or greater than a reference.

7. The recommendation server of claim 1, wherein the comparing of the first user's activity information to the second user's activity information is used to determine at least one particular time when the first user and the second user were in a same location at a same time.

8. The recommendation server of claim 1, wherein the first location information obtained from the meta-information of content comprises global positioning satellite (GPS) location information captured when the content is generated in the first device.

9. A first device comprising:
   a communicator;
   a display;
   a user input device; and
   a controller configured to:
   transmit first user's activity information comprising first location information and first time information, the first location information and the first time information being obtained from schedule information of a first user and meta-information of content generated in the first device of the first user, receive an input of the first user to communicate with a second device of a second user for a call, in response to receiving the input, transmit, to a recommendation server, a request for a list of a plurality of items of content related to an operation of the first device performed at a time when the first user and the second user met, based on the transmitting of the request, receive, via the communicator from the recommendation server, the list of the plurality of items of content, the plurality of items of content being generated in the first device at the time when the first user and the second user met;

control the display to display, on a phone call screen of the first device, the list of the plurality of items of content, and in response to receiving an input of the first user selecting one of the plurality of items of content, transmit a request for transmitting the selected content to the second device for causing the second device to display the selected content on a phone call screen of the second device, wherein the plurality of items of content comprises content generated in the first device at the time when the first user and the second user met, wherein the list of the plurality of items of content comprises a plurality of thumbnails of photos, and the plurality of thumbnails of photos are displayed on the display in an order of generation time of the photos based on meta-information of each of the photos, and wherein, based on the transmitting of the request for the list of the plurality of items of content, the recommendation server is configured to:

compare the first user's activity information, which comprises the first location information and the first time information obtained from the schedule information of the first user and the meta-information of content generated in the first device, to second user's activity information comprising second location information and second time information obtained from schedule information of the second user and meta-information of content generated in the second device of the second user, and based on a result of the comparing, determine the list of the plurality of items of content.

10. The first device of claim 9, wherein the communicator is further configured to receive, from the recommendation server, identification information of an application to execute the content.

11. The first device of claim 9, wherein the first user's activity information comprises at least one of identification information of content that was executed in the first device, identification information of an application that executed the content, information about a location where the content was executed, or the schedule information of the first user.

12. The first device of claim 9, wherein the controller is further configured to determine a plurality of applications configured to execute content that is sharable with the second user, and wherein the display is further configured to display a list of the plurality of applications, so that identification information of an application to execute the content is displayed first in the list.

13. The first device of claim 12, wherein the user input device is further configured to receive a first user's input for selecting, from the list of the plurality of applications, the application to execute the content of the first device which was performed at the time when the first user and the second user met each other, and wherein, when the first user's input for selecting the application is received, the display is further configured to display the list of the plurality of items of content executable by using the application, so that identification information of the content of the first device which was captured at the time when the first user and the second user met each other is displayed first in the list.

14. The first device of claim 13, wherein the user input device is further configured to receive an input, by the first user, for requesting sharing of the content with the second user, and wherein the controller is further configured to request the recommendation server to share the content between the first user and the second user.

15. A method performed by a recommendation server, the method comprising:

based on, by a first device receiving an input of a first user to communicate with a second device of a second user for a call, receiving, from the first device, a request for a list of a plurality of items of content related to an operation of the first device performed when the first user and the second user met;

in response to receiving the request, comparing first user's activity information comprising first location information and first time information of the first device to second user's activity information comprising second location information and second time information of the second device, the first user's activity information being obtained from schedule information of the first user and meta-information of content generated in the first device, the second user's activity information being obtained from schedule information of the second user and meta-information of content generated in the second device;

based on a result of the comparing, determining a time when the first user and the second user were in a same location;

based on the determined time, determining the list of the plurality of items of content related to the operation of the first device performed at the time when the first user and the second user met;

transmitting, to the first device, the list of the plurality of items of content for causing the first device to display the list of the plurality of items of content on a phone call screen of the first device; and based on receiving an input of the first user selecting one of the plurality of items of content by the first device, receiving, from the first device, a request for transmitting the selected content to the second device for causing the second device to display the selected content on a phone call screen of the second device, wherein the list of the plurality of items of content comprising a plurality of thumbnails of photos, and the plurality of thumbnails of photos are displayed by the first device in an order of generation time of the photos based on meta-information of each of the photos.

16. A method performed by a first device, the method comprising:

transmitting first user's activity information comprising first location information and first time information, the first location information and the first time information being obtained from schedule information of a first user and meta-information of content generated in the first device of the first user;

receiving an input of the first user to communicate with a second device of a second user for a call;

in response to receiving the input, transmitting, requesting to a recommendation server, a request for a list of a plurality of items of content related to an operation of the first device performed when the first user and the second user met;

based on the transmitting of the request, receiving, from the recommendation server, the list of the plurality of items of content, the plurality items of content being generated in the first device at a time when the first user and the second user met;

displaying the list of the plurality of items of content on a phone call screen of the first device; and in response to receiving an input of the first user selecting one of the plurality of items of content, transmitting a request for transmitting the selected content to the second device for causing the second device to display the selected content on a phone call screen of the second device, wherein the plurality of items of content comprises content generated in the first device at the time when the first user and the second user met, wherein the list of the plurality of items of content comprises a plurality of thumbnails of photos, and the plurality of thumbnails of photos are displayed on a display of the first device in an order of generation time of the photos based on meta-information of each of the photos, and wherein, based on the first device transmitting the request for the list of the plurality of items of content, the recommendation server is configured to:

compare the first user's activity information, which comprises the first location information and the first time information obtained from the schedule information of the first user and the meta-information of content generated in the first device, to second user's activity information comprising second location information and second time information obtained from schedule information of the second user and meta-information of content generated in the second device of the second user, and based on a result of the comparing, determine the list of the plurality of items of content.

17. A non-transitory computer-readable recording medium having recorded thereon a program for executing the method according to claim 15.

* * * * *